United States Patent
Sano et al.

(10) Patent No.: US 9,879,123 B2
(45) Date of Patent: Jan. 30, 2018

(54) FIBER-REINFORCED POLYPROPYLENE RESIN COMPOSITION, MOLDING MATERIAL AND PREPREG

(71) Applicant: TORAY INDUSTRIES, INC., Tokyo (JP)

(72) Inventors: Kentaro Sano, Masaki (JP); Noriyuki Hirano, Masaki (JP); Masato Honma, Masaki (JP); Atsuki Tsuchiya, Oe (JP)

(73) Assignee: Toray Industries, Inc., Tokyo (JP)

( * ) Notice: Subject to any disclaimer, the term of this patent is extended or adjusted under 35 U.S.C. 154(b) by 557 days.

(21) Appl. No.: 14/372,078

(22) PCT Filed: Jan. 17, 2013

(86) PCT No.: PCT/JP2013/050745
§ 371 (c)(1),
(2) Date: Jul. 14, 2014

(87) PCT Pub. No.: WO2013/108811
PCT Pub. Date: Jul. 25, 2013

(65) Prior Publication Data
US 2014/0356612 A1    Dec. 4, 2014

(30) Foreign Application Priority Data

Jan. 20, 2012  (JP) ................................ 2012-009917
Jan. 20, 2012  (JP) ................................ 2012-009918
(Continued)

(51) Int. Cl.
*C08J 5/04*     (2006.01)
*D06M 15/55*    (2006.01)
(Continued)

(52) U.S. Cl.
CPC ............... *C08J 5/042* (2013.01); *C08J 5/043* (2013.01); *C08J 5/06* (2013.01); *C08J 5/24* (2013.01);
(Continued)

(58) Field of Classification Search
CPC ..... C08J 5/042; C08J 5/043; C08J 5/04; C08J 5/06; C08J 5/08; C08J 5/24;
(Continued)

(56) References Cited

U.S. PATENT DOCUMENTS

| | | | | |
|---|---|---|---|---|
| 5,462,799 A | * | 10/1995 | Kobayashi | ............... D01F 11/14 |
| | | | | 423/447.1 |
| 2008/0242793 A1 | * | 10/2008 | Yano | ...................... C08K 3/04 |
| | | | | 524/496 |
| 2010/0311892 A1 | * | 12/2010 | Mori | ....................... C08L 23/10 |
| | | | | 524/502 |

FOREIGN PATENT DOCUMENTS

| | | |
|---|---|---|
| EP | 2 221 339 A1 | 8/2010 |
| JP | 03065311 A * | 3/1991 |
| WO | 2008/030600 A2 | 3/2008 |

OTHER PUBLICATIONS

Machine Translation of JP H03-065311A Mar. 1991.*
Supplementary Partial European Search Report dated May 22, 2015, in EP Application No. 13 73 9117.

* cited by examiner

*Primary Examiner* — Frank J Vineis
(74) *Attorney, Agent, or Firm* — Kuboveik & Kubovcik

(57) ABSTRACT

A molded article excellent in dynamic characteristics and water degradation resistance can be obtained by using a fiber-reinforced polypropylene resin composition including a carbodiimide-modified polyolefin (a), a polypropylene resin (b) and reinforcing fibers (c), wherein the content of the carbodiimide group contained in a resin component in
(Continued)

the fiber-reinforced polypropylene resin composition is 0.0005 to 140 mmol based on 100 g of a matrix resin component, and the reinforcing fibers (c) are sizing-treated with a polyfunctional compound (s); and a molding material using the fiber-reinforced polypropylene resin composition.

14 Claims, 6 Drawing Sheets

(30) Foreign Application Priority Data

| Jan. 20, 2012 | (JP) | ................................ | 2012-009919 |
|---|---|---|---|
| Jan. 20, 2012 | (JP) | ................................ | 2012-009920 |

(51) Int. Cl.
```
C08J 5/24      (2006.01)
C08L 23/08     (2006.01)
C08L 23/10     (2006.01)
C08J 5/06      (2006.01)
D06M 101/40    (2006.01)
C08L 23/26     (2006.01)
```

(52) U.S. Cl.
CPC ........... *C08L 23/0846* (2013.01); *C08L 23/10* (2013.01); *D06M 15/55* (2013.01); *C08J 2323/12* (2013.01); *C08J 2423/00* (2013.01); *C08J 2423/14* (2013.01); *C08J 2423/36* (2013.01); *C08L 23/26* (2013.01); *D06M 2101/40* (2013.01); *D10B 2101/06* (2013.01); *Y10T 428/249944* (2015.04); *Y10T 428/249948* (2015.04); *Y10T 428/2929* (2015.01)

(58) Field of Classification Search
CPC ................ C08J 2423/36; C08J 2323/00; C08J 2323/10; C08J 2323/12; C08J 2323/14; C08J 2423/00; C08J 2423/10; C08J 2423/12; C08J 2423/14; C08L 23/00; C08L 23/02; C08L 23/04; C08L 23/08; C08L 23/0846; C08L 23/10; C08L 23/12; C08L 23/26; Y10T 428/24994; Y10T 428/249942; Y10T 428/249944; Y10T 428/249945; Y10T 428/249946; Y10T 428/249948; Y10T 428/2929
USPC ........... 428/221, 297.4, 298.1, 298.7, 299.1, 428/299.4, 300.1, 423.1, 473.5, 500–523
See application file for complete search history.

FIBER-REINFORCED POLYPROPYLENE RESIN COMPOSITION, MOLDING MATERIAL AND PREPREG

TECHNICAL FIELD

The present invention relates to a fiber-reinforced polypropylene resin composition, a molding material suitable for injection molding, and a prepreg useful for obtaining a fiber-reinforced composite material.

BACKGROUND ART

Compositions including reinforcing fibers and a thermoplastic resin are lightweight and excellent in dynamic characteristics, and are therefore widely used in sporting goods applications, aerospace applications and general industrial applications. As reinforcing fibers that are used for these fiber-reinforced thermoplastic resin compositions, metallic fibers such as aluminum fibers and stainless steel fibers; organic fibers such as aramid fibers and PBO fibers; inorganic fibers such as silicon carbide fibers; and carbon fibers are used. From the viewpoint of a balance of specific strength, specific rigidity and lightness, carbon fibers are suitable, and among them polyacrylonitrile-based carbon fibers are particularly suitably used.

For molding a composition including reinforcing fibers and a thermoplastic resin, generally a molding material or a prepreg is produced by combining reinforcing fibers with a thermoplastic resin beforehand, and is used to mold the composition.

Particularly, a molding material processed in a pellet shape can be applied to molding methods excellent in economical efficiency and productivity, such as injection molding and stamping molding, and is useful as an industrial material. In recent years, attempts have been made to enhance performance by controlling arrangement of a matrix resin and reinforcing fibers for the pellet-shaped molding material.

Since a prepreg has good handling characteristics during lamination, a molding method is widely used in which a preform obtained by laminating prepregs is press-molded (molding method in which the preform is defoamed under applied pressure to be shaped).

The method for producing a prepreg is generally a method in which a reinforcing fiber base obtained by unidirectionally arranging or weaving continuous reinforcing fibers is impregnated with a resin to produce a prepreg. A molded article obtained by molding the prepreg using continuous reinforcing fibers has excellent dynamic characteristics, but is unsuitable for molding to a complex shape because reinforcing fibers are used in the form of a continuous body, and therefore a molded article using discontinuous reinforcing fibers has also been proposed.

In recent years, fiber-reinforced thermoplastic composite materials have increasingly received attention, and come into use in a variety of diverse applications. Molded articles excellent in dynamic characteristics have been required, and from an industrial viewpoint, higher economical efficiency and productivity have become necessary. For example, further lightness and economical efficiency have been desired, and polyolefin resins that are lightweight, particularly polypropylene resins, have come into use as a matrix resin.

However, the polypropylene resin is poor in interfacial adhesion with reinforcing fibers, and it is difficult to obtain a molded article excellent in dynamic characteristics. In particular, when fibers having poor surface reactivity, such as carbon fibers, are used as reinforcing fibers, it is particularly difficult to obtain a molded article excellent in dynamic characteristics. Thus, attempts have been made to improve interfacial adhesion between carbon fibers and polypropylene by surface modification or sizing treatment of carbon fibers, and modification of a matrix resin by addition of modified polypropylene.

Patent Document 1 discloses a molding material in which a high-molecular-weight thermoplastic resin is arranged so as to be in contact with a composite including a low-molecular-weight thermoplastic polymer and continuous reinforcing fibers. In the molding material, a low-molecular-weight material is used to impregnate continuous reinforcing fiber bundles while a high-molecular-weight material is used for a matrix resin to secure all of economic efficiency, productivity and dynamic characteristics. It is shown that when the molding material is molded by the injection molding method, the molded article obtained can have an increased fiber length of reinforcing fibers as compared to conventional ones, so that both good dynamic characteristics and excellent external appearance quality can be achieved.

Patent Document 2 proposes that a seal material having more isotropic characteristics is obtained by dispersing reinforcing fibers in the form of bundles. Patent Document 3 proposes that a seal material excellent in dynamic characteristics is obtained by uniformly dispersing carbon fibers.

Patent Document 4 proposes a prepreg and a preform which include reinforcing fibers having a specific fiber length and a specific two-dimensional orientation angle, and have a specific thickness, and it is disclosed that by using the prepreg, molding to a complex shape is possible, and a molded article extremely excellent in isotropy and dynamic characteristics can be obtained. Patent Document 5 proposes a prepreg having a linear notch over the entire surface of a prepreg layer, the notch forming an angle in a range of 2 to 25° in terms of an absolute value with respect to reinforcing fibers, wherein substantially all the reinforcing fibers are separated by the notch, and the fiber length of the reinforcing fibers separated by the notch is in a range of 10 to 100 mm, and it is disclosed that the prepreg is excellent in shape followability to a complex shape and can be molded in a short time, and the resulting molded article has excellent dynamic properties applicable to a structural material, reduced variation thereof and excellent dimensional stability. Each of Patent Documents 4 and 5 shows an example of using acid-modified polypropylene in combination when a polypropylene resin is used as a matrix resin.

Patent Document 6 discloses carbon fibers sizing-treated with a polyfunctional compound, and a polypropylene resin composition using a terpene resin, and it is shown that the resin composition is excellent in moldability and interfacial adhesion, so that a molded article excellent in flexural characteristics and impact resistance can be obtained.

Patent Documents 7 and 8 show that by adding maleic anhydride-modified polypropylene, a matrix resin is modified, and interfacial adhesion between carbon fibers and polypropylene is improved.

Patent Document 9 shows that by adding a polyolefin resin modified with a polycarbodiimide group for further improving dynamic characteristics, and a matrix resin is modified, dispersibility of carbon fibers is improved, so that a molded article excellent in flexural characteristics and impact resistance can be obtained.

PRIOR ART DOCUMENTS

Patent Documents

Patent Document 1: JP 10-138379 A
Patent Document 2: JP 2507565 B1
Patent Document 3: JP 6-99431 A
Patent Document 4: JP 2010-235779 A
Patent Document 5: JP 2009-286817 A
Patent Document 6: JP 2010-248482 A
Patent Document 7: JP 2009-114435 A
Patent Document 8: JP 2005-213478 A
Patent Document 9: JP 2009-069649 A

SUMMARY OF THE INVENTION

Problems to be Solved by the Invention

As shown above, studies on modification of fiber-reinforced polypropylene resins have been extensively conducted in recent years, and applications thereof have been expanded with performance enhancement of materials, but accordingly, previously unnoticed problems have become apparent. For example, in applications where there is a possibility of exposure to wind and rain for a long period of time because of the frequent outdoor use, such as those of outside plates of automobiles, water degradation resistance is required in addition to excellent dynamic characteristics, but a fiber-reinforced polypropylene resin using a polypropylene resin modified by a conventional technique has the problem that satisfactory water degradation resistance is not achieved. However, not many studies have been conducted heretofore on water degradation resistance of fiber-reinforced polypropylene resins probably because a polypropylene resin as a base material has almost no water absorption capacity, and studies for improving water degradation resistance of fiber-reinforced polypropylene resins have been scarcely conducted.

An object of the present invention is to provide a fiber-reinforced polypropylene resin composition which has good interfacial adhesion between reinforcing fibers and a matrix resin when a polypropylene resin is used as a matrix, so that a molded article excellent in dynamic characteristics can be produced, and a molded article excellent in water degradation resistance can be produced.

An object of another aspect of the present invention is to provide a molding material which has good dispersibility of reinforcing fibers in a molded article at the time of injection molding, and is excellent in adhesion between reinforcing fibers and a matrix resin, so that a molded article excellent in dynamic characteristics can be produced, and a molded article excellent in water degradation resistance can be produced.

An object of another aspect of the present invention is to provide a prepreg which can be molded into a complex shape such as a three-dimensional shape at the time of press-molding the prepreg, and is excellent in dynamic characteristics and water degradation resistance.

An object of another aspect of the present invention is to provide a prepreg with which a molded article extremely excellent in dynamic characteristics can be produced and a molded article excellent in water degradation resistance can be produced.

Solutions to the Problems

The present inventors have extensively conducted studies for achieving the above-mentioned objects, and resultantly found the following fiber-reinforced polypropylene resin compositions.

(1) A fiber-reinforced polypropylene resin composition including a carbodiimide-modified polyolefin (a), a polypropylene resin (b) and reinforcing fibers (c), the reinforcing fibers (c) sizing-treated with a polyfunctional compound (s), wherein the fiber-reinforced polypropylene resin composition satisfies the requirement (I) or (II):

(I) the content of the carbodiimide group contained in a matrix resin component in the fiber-reinforced polypropylene resin composition is 0.0005 to 140 mmol based on 100 g of the matrix resin component; or (II) the fiber-reinforced polypropylene resin composition contains 0.01 to 50 parts by mass of the component (a), 20 to 99 parts by mass of the component (b) and 1 to 80 parts by mass of the component (c) where the total of the component (b) and the component (c) is 100 parts by mass.

(2) The fiber-reinforced polypropylene resin composition according to (1), wherein the content of the carbodiimide group contained in 100 g of the carbodiimide-modified polyolefin (a) is 1 to 200 mmol.

(3) The fiber-reinforced polypropylene resin composition according to any one of (1) and (2), wherein the reinforcing fibers (c) are carbon fibers.

(4) The fiber-reinforced polypropylene resin composition according to any one of (1) to (3), wherein the polyfunctional compound (s) is a compound having a tri- or higher functional group.

(5) The fiber-reinforced polypropylene resin composition according to any one of (1) to (4), wherein the functional group in the polyfunctional compound (s) is at least one selected from an epoxy group, a carboxyl group, an amino group and a hydroxyl group.

(6) The fiber-reinforced polypropylene resin composition according to any one of (1) to (5), wherein the polyfunctional compound (s) is an aliphatic epoxy resin.

(7) The fiber-reinforced polypropylene resin composition according to any one of (1) to (6), wherein the polyfunctional compound (s) is polyethyleneimine.

(8) The fiber-reinforced polypropylene resin composition according to (3), wherein the surface oxygen concentration ratio O/C of the carbon fiber is 0.05 to 0.5 as measured by X-ray photoelectron spectroscopy.

(9) A molding material including the fiber-reinforced polypropylene resin composition according to (1) to (8), wherein the molding material contains a terpene resin (d) in addition to the component (a), the component (b), the component (c) and the component (s), a polypropylene resin component containing the component (a) and the component (b) is bonded to a composite containing the component (c) and the component (d), the SP value of the component (d) is 6.5 to 9, and the SP value of the component (d) is lower than the SP value of the component (s).

(10) The molding material according to (9), wherein the molding material contains 0.01 to 25 parts by mass of the component (d) where the total of the component (b) and the component (c) is 100 parts by mass.

(11) The molding material according to (9) or (10), wherein the component (d) is a resin selected from a polymer containing a monomer unit selected from α-pinene, β-pinene, dipentene and d-limonene and a hydrogenated terpene resin obtained by subjecting the polymer to a hydrogenation treatment.

(12) The molding material according to any one of (9) to (11), wherein the glass transition temperature of the component (d) is 30 to 100° C.

(13) The molding material according to any one of (9) to (13), wherein the number average molecular weight of the component (d) is 500 to 5000.

(14) The molding material according to any one of (9) to (13), wherein the melt viscosity of the component (d) at 190° C. is 0.05 to 1 Pa·s.

(15) The molding material according to any one of (9) to (14), wherein the molding material further contains 0.01 to 30 parts by mass of an elastomer as a component (e) where the total of the component (b) and the component (c) is 100 parts by mass.

(16) The molding material according to (15), wherein the component (e) is at least one selected from an olefin-based elastomer, a styrene-based elastomer, a urethane-based elastomer, an ester-based elastomer and an amide-based elastomer.

(17) The molding material according to (15) or (16), wherein the SP value of the component (e) is 6.5 to 9.5.

(18) The molding material according to (17) or (18), wherein the component (e) is an ethylene-α-olefin copolymer.

(19) The molding material according to any one of (9) to (18), wherein the porosity of the composite containing the component (c) and the component (d) is 20% or less in the molding material.

(20) The molding material according to any one of (9) to (19), wherein the component (c) is arranged almost in parallel in the axial center direction and the length of the component (c) is substantially equal to the length of the molding material.

(21) The molding material according to any one of (9) to (20), wherein the molding material has a core-sheath structure with the composite forming a core structure and the periphery of the composite being covered with a polypropylene resin component containing at least the component (a) and the component (b).

(22) The molding material according to anyone of (9) and (21), wherein the molding material is a long-fiber pellet.

(23) The molding material according to any one of (9) to (22), wherein the length of the long-fiber pellet is 1 to 50 mm.

(24) A prepreg including the fiber-reinforced polypropylene resin composition according to anyone of (1) to (8), wherein the reinforcing fibers (c) forma reinforcing fiber base.

(25) The prepreg according to (24), wherein the prepreg is sheet-shaped, and reinforcing fibers that form the reinforcing fiber base are discontinuous fibers.

(26) The prepreg according to claim 25, wherein the reinforcing fibers (c) are randomly dispersed in the in-plane direction of the prepreg.

(27) The prepreg according to (26), wherein the reinforcing fiber base includes 0 to 50% by mass of reinforcing fibers having a fiber length of more than 10 mm, 50 to 100% by mass of reinforcing fibers having a fiber length of 2 to 10 mm, and 0 to 50% by mass of reinforcing fibers having a fiber length of less than 2 mm.

(28) The prepreg according to (27), wherein the average value of two-dimensional orientation angles of reinforcing fibers that form the reinforcing fiber base is 10 to 80 degrees.

(29) The prepreg according to (28), wherein the distribution of fiber lengths of reinforcing fibers that form the reinforcing fiber base has at least two peaks, with one peak existing in a fiber length range of 5 to 10 mm and the other peak existing in a fiber length range of 2 to 5 mm.

(30) The prepreg according to any one of (27) to (29), wherein the tensile strength σ of the prepreg is 50 to 1000 MPa.

(31) The prepreg according to any one of (27) to (30), wherein the tensile strength σ satisfies the relationship of σMax≤σMin×2 where σMax is a maximum tensile strength and σMin is a minimum tensile strength in a measurement direction.

(32) The prepreg according to (24), wherein the reinforcing fibers that form the reinforcing fiber base are substantially discontinuous fibers.

(33) The prepreg according to (32), wherein reinforcing fibers that form the reinforcing fiber base are aligned in one direction.

Effects of the Invention

A molded article produced using a fiber-reinforced polypropylene resin composition has good interfacial adhesion between reinforcing fibers and a polypropylene resin, and is excellent in dynamic characteristics and excellent in water degradation resistance.

A molding material of the present invention has not only high dynamic characteristics and water degradation resistance, but also good dispersibility of reinforcing fibers in a molded article at the time of molding.

A prepreg of the present invention not only has high dynamic characteristics and water degradation resistance, but also can be molded into a complex shape such as a three-dimensional shape at the time of press molding when reinforcing fibers are discontinuous.

When the reinforcing fibers of the prepreg of the present invention are substantially continuous, a molded article extremely excellent in dynamic characteristics such as flexural characteristics in addition to water degradation resistance can be produced.

The resin composition, the molding material and the prepreg of the present invention includes a propylene resin, so that a molded article excellent in lightness can be produced. By using the resin composition, the molding material and the prepreg of the present invention, a complex-shaped member excellent in water degradation resistance can be designed and produced in accordance with required performance. The resin composition, the molding material and the prepreg of the present invention can be applied in a wide range of industrial fields including components and internal members of electric/electronic equipment, OA equipment, household electrical appliances, robots, two-wheeled vehicles or automobiles, and members, components and housings of aircrafts, etc.

EMBODIMENTS OF THE INVENTION

Figure 1:
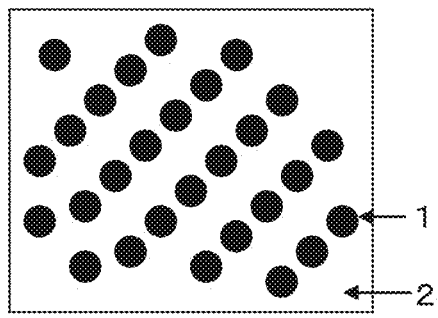
FIG. 1 is a schematic view showing one example of a form of a composite including reinforcing fibers (c) sizing-treated with a polyfunctional compound (s), and a terpene resin (d).

The fiber-reinforced polypropylene resin composition of the present invention includes a carbodiimide-modified polyolefin (a), a polypropylene resin (b) and reinforcing fibers (c). In the present invention, the reinforcing fibers (c) should be sizing-treated with a polyfunctional compound (s). In the present invention, it is important that the carbodiimide-modified polyolefin (a) is used in combination with the reinforcing fibers (c) sizing-treated with the polyfunctional compound (s) for achieving water degradation resistance. First, these components will be described.

<Carbodiimide-Modified Polyolefin (a)>

The carbodiimide-modified polyolefin (a) is obtained by reacting a carbodiimide group-containing compound (B) with a polyolefin resin (A) having a group reactive with a carbodiimide group. Specific methods include melting and kneading both the components.

An example will be shown below where the components are melted and kneaded. Examples of the method for melting and kneading the polyolefin resin (A) having a group reactive with a carbodiimide group and the carbodiimide group-containing compound (B) may include a method in which the polyolefin resin (A) having a group reactive with a carbodiimide group and the carbodiimide group-containing compound (B) are simultaneously or sequentially added in, for example, a Henschel mixer, a V-type blender, a tumbler blender, a ribbon blender or the like and kneaded, and the mixture is then melted and kneaded using a uniaxial extruder, a multiaxial extruder, kneader, a Banbury mixer or the like. Use of an apparatus excellent in kneading performance, such as a multiaxial extruder, a kneader or a Banbury mixer among the apparatuses described above, is preferred because a polymer composition in which the components are more uniformly dispersed and reacted can be obtained.

When the components are melted and kneaded using an extruder, the polyolefin resin (A) having a group reactive with a carbodiimide group and the carbodiimide group-containing compound (B) may be supplied from a hopper after being mixed, or one component may be supplied from a hopper with the other component being supplied from a supply port placed at any location between the vicinity of the hopper portion and the end of the extruder.

The temperature at which the above-mentioned components are melted and kneaded is the highest melting point of the melting points of the components to be mixed. Specifically, the components are melted and kneaded at a temperature in a range of preferably 150 to 300° C., more preferably 200 to 280° C., further preferably 230 to 270° C.

The carbodiimide-modified polyolefin (a) is excellent in fluidity at 190° C. or 230° C. The melt flow rate (MFR) of the carbodiimide-modified polyolefin (a) at 190° C. or 230° C. under a load of 2.16 Kg is in a range of preferably 0.01 to 400 g/10 minutes, more preferably 0.1 to 300 g/10 minutes, further preferably 1 to 200 g/10 minutes. The melt flow rate being in the above-mentioned range is preferred because reinforcement performance and dispersibility of reinforcing fibers are improved.

When the carbodiimide-modified polyolefin (a) is produced, a blending ratio, which ensures that the ratio of the molar number of the group reactive with a carbodiimide group in the polyolefin resin (A) having a group reactive with a carbodiimide group and the molar number of the carbodiimide group-containing compound (B) is 1:0.2 to 1.6, preferably 1:0.4 to 1.3, further preferably 1:0.7 to 1.1, is preferred because the reaction efficiency of the polyolefin resin (A) and the carbodiimide group-containing compound (B) is enhanced and the carbodiimide-modified polyolefin (a) excellent in fluidity is obtained.

The carbodiimide-modified polyolefin (a) has a carbodiimide group content of preferably 1 to 200 mmol, more preferably 5 to 150 mmol, further preferably 10 to 100 mmol based on 100 g of the carbodiimide-modified polyolefin (a). When the content of the carbodiimide group is excessively low, the reinforcement effect of reinforcing fibers and the effect of improving water degradation resistance improvement are poor. When the content of the carbodiimide group is excessively high, water degradation resistance is satisfactory, but molding processability is deteriorated, and economic efficiency is compromised because the reinforcement effect of reinforcing fibers and the effect of improving dispersibility are not significantly enhanced. From such a viewpoint, it is preferred that the blending amount of the carbodiimide group-containing compound (B) is adjusted so that the content of the carbodiimide group in the carbodiimide-modified polyolefin (a) is in the above-mentioned range when the carbodiimide-modified polyolefin (a) is produced.

Further, when the carbodiimide-modified polyolefin (a) is produced, it is also important to control a reaction of the group reactive with a carbodiimide group in the polyolefin resin (A) and the carbodiimide group in the carbodiimide group-containing compound (B). The rate of progression of the reaction of the group reactive with a carbodiimide group in the polyolefin resin (A) and the carbodiimide group in the carbodiimide group-containing compound (B) can be examined using by, for example, the following method.

Heat press sheets of the polyolefin resin (A) having a group reactive with a carbodiimide group and the carbodiimide-modified polyolefin (a) obtained from the reaction are each prepared, and the infrared absorption is then measured using an infrared absorption analyzer. From the obtained chart, absorbances at absorption bands (1790 cm$^{-1}$ when using maleic anhydride) originating from peaks in the polyolefin resin (A) having a group reactive with a carbodiimide group and the group reactive with a carbodiimide group in the carbodiimide-modified polyolefin (a) can be compared before and after the reaction to calculate a reaction rate using the following equation.

Reaction rate (%)=X/Y×100.

X=absorbance of group reactive with carbodiimide group in (A) before reaction–absorbance of group reactive with carbodiimide group in (a) after reaction.

Y=absorbance of group reactive with carbodiimide group in (A) before reaction.

For the carbodiimide-modified polyolefin (a), the reaction rate determined using the above-mentioned method is in a range of preferably 40 to 100%, more preferably 60 to 100%, further preferably 80 to 100%.

The carbodiimide-modified polyolefin (a) is produced by reaction of the carbodiimide group (N=C=N) of the carbodiimide group-containing compound (B) with the group reactive with a carbodiimide group in the polyolefin resin (A), and residues of the carbodiimide group bound with the polyolefin interact with reinforcing fibers to contribute to reinforcement performance and dispersibility. The amount of carbodiimide residues can be considered as a size of a peak resulting from breathing vibration of a N=C=N group at 2130 to 2140 cm$^{-1}$ in IR measurement.

The carbodiimide-modified polyolefin (a) may contain the polyolefin resin (A) having a group reactive with two or more carbodiimide groups, and contain two or more carbodiimide group-containing compounds (B).

To the carbodiimide-modified polyolefin (a) may be added a known process stabilizer, a heat resistance stabilizer, a heat-aging-resistant agent and the like as long as the purpose of the present invention is not impaired.

<Polyolefin Resin (A) Having Group Reactive with Carbodiimide Group>

The polyolefin resin (A) having a group reactive with a carbodiimide group can be obtained by introducing a compound reactive with a carbodiimide group into a polyolefin.

Examples of the compound reactive with a carbodiimide group include compounds having a group having active hydrogen having reactivity with a carbodiimide group, specifically compounds having a group derived from a carboxylic acid, an amine, an alcohol, a thiol or the like. Among them, compounds having a group derived from a carboxylic acid are suitably used, and particularly unsaturated carboxylic acids and/or derivatives thereof are preferred. Besides compounds having a group having active hydrogen, compounds having a group which is easily converted into a group having active hydrogen with water can be suitably used. Specific examples include compounds having an epoxy group or a glycidyl group. In the present invention, the compounds reactive with a carbodiimide group may be used alone, or in combination of two or more thereof.

When an unsaturated carboxylic acid and/or a derivative thereof is used as the compound reactive with a carbodiimide group, examples of the compound may include unsaturated compounds having one or more carboxylic acid group, unsaturated compounds having one or more carboxylic anhydride group, and derivatives thereof. Examples of the unsaturated group may include a vinyl group, a vinylene group and an unsaturated cyclic hydrocarbon group. Specific examples include unsaturated carboxylic acids such as acrylic acid, methacrylic acid, maleic acid, fumaric acid, tetrahydrophthalic acid, itaconic acid, citraconic acid, crotonic acid, isocrotonic acid, norbornenedicarboxylic acid and bicyclo[2,2,1]hepto-2-ene-5,6-dicarboxylic acid, and acid anhydrides thereof and derivatives thereof (e.g. an acid halides, an amide, an imide and an ester). Specific examples of the derivative may include malenyl chloride, malenyl imide, maleic anhydride, itaconic anhydride, citraconic anhydride, tetrahydrophthalic anhydride, bicyclo[2,2,1]hepto-2-ene-5,6-dicarboxylic anhydride, dimethyl maleate, monomethyl maleate, diethyl maleate, diethyl fumarate, dimethyl itaconate, diethyl citraconate, dimethyl tetrahydrophthalate, dimethyl bicyclo[2,2,1]hepto-2-ene-5,6-dicarboxylate, hydroxyethyl (meth)acryrate, hydroxypropyl (meth)acryrate, glycidyl (meth)acrylate, aminoethyl methacrylate and aminopropyl methacrylate.

Among them, maleic anhydride, (meth)acrylic acid, itaconic anhydride, citraconic anhydride, tetrahydrophthalic anhydride, bicyclo[2,2,1]hepto-2-ene-5,6-dicarboxylic anhydride, hydroxyethyl (meth)acrylate, glycidyl methacrylate and aminopropyl methacrylate are preferred. Further, dicarboxylic anhydrides such as maleic anhydride, itaconic anhydride, citraconic anhydride, tetrahydrophthalic anhydride and bicyclo[2,2,1]hepto-2-ene-5,6-dicarboxylic anhydride are especially preferred. The compound reactive with a carbodiimide group is most preferably a maleic anhydride.

As the method for introducing a compound reactive with a carbodiimide group into a polyolefin, various methods can be employed, and examples may include a method in which a compound reactive with a carbodiimide group is graft-copolymerized with a polyolefin main chain and a method in which an olefin and a compound reactive with a carbodiimide group are radical-copolymerized. The case of graft copolymerization and the case of radical copolymerization will be described, respectively, in detail below.

<Graft Copolymerization>

The polyolefin resin (A) having a group reactive with a carbodiimide group can be obtained by graft copolymerizing a compound reactive with a carbodiimide group with a polyolefin main chain.

The polyolefin to be used as a polyolefin main chain is a polymer having as a principal component an aliphatic α-olefin, a cyclic olefin, a nonconjugated diene and an aromatic olefin with a carbon number of 2 to 20, preferably an α-olefin with a carbon number of 2 to 10, further preferably an α-olefin with a carbon number of 2 to 8. These olefins as a principal component of the polyolefin main chain may be used alone or as a combination of two or more thereof. Here, the amount of the principal component is normally 50 mol % or more, preferably 60 mol % or more, further preferably 70 mol % or more in terms of a content of the monomer unit in the polyolefin. As an olefin as the principal component, ethylene, propylene, 1-butene, 4-methyl-1-pentene, 3-methyl-1-butene, 1-hexene, 1-octene, tetracyclododecene, norbornene and styrene can be suitably used, and among them, propylene is especially preferred. They can be used for both the isotactic structure and syndiotactic structure, and there is no particular limitation on stereoregularity.

The density of a polyolefin to be used for graft modification is normally 0.8 to 1.1 g/cm$^3$, preferably 0.8 to 1.05 g/cm$^3$, further preferably 0.8 to 1 g/cm$^3$. The melt flow rate (MFR) of the polyolefin at 190° C. or 230° C. under a load of 2.16 kg according to ASTM D1238 is normally 0.01 to 500 g/10 minutes, preferably 0.05 to 300 g/10 minutes, further preferably 0.1 to 100 g/10 minutes. When the density and MFR of the polyolefin are in the above-mentioned range, the graft copolymer after modification has a similar density and MFR, resulting in easy handling.

The crystallinity degree of a polyolefin to be used for graft modification is normally 2% or more, preferably 5%, further preferably 10%. When the crystallinity degree is in the above-mentioned range, handling of the graft copolymer after modification is improved.

The number average molecular weight (Mn) of a polyolefin to be used for graft modification is preferably 5,000 to 500,000, further preferably 10,000 to 100,000 as measured by gel permeation chromatography (GPC). When the number average molecular weight (Mn) is in the above-mentioned range, handling is improved. In the case of an ethylene-based polyolefin, the number average molecular weight can be determined in terms of polyethylene when the amount of a comonomer is less than 10 mol %, and determined in terms of ethylene-propylene (based on an ethylene content of 70 mol %) when the amount of a comonomer is 10 mol % or more. In the case of propylene-based polyolefin, the number average molecular weight can be determined in terms of polypropylene when the amount of a comonomer is less than 10 mol %, and determined in terms of propylene-ethylene (based on a propylene content of 70 mol %) when the amount of a comonomer is 10 mol % or more.

The above-mentioned polyolefin can be produced using any of previously known methods. For example, polymerization can be performed using a titanium catalyst, a vanadium catalyst, a metallocene catalyst or the like. The polyolefin may be in the form of any of a resin and an elastomer, and can be used for both the isotactic structure and syndiotactic structure, and there is no particular limitation on stereoregularity. A commercially available resin can also be used as it is.

When the polyolefin resin (A) having a group reactive with a carbodiimide group is obtained by graft copolymerization, a compound reactive with a carbodiimide group and other ethylenically unsaturated monomers etc. as necessary are graft-copolymerized with the polyolefin as a graft main chain in the presence of a radical initiator.

The method for grafting a compound reactive with a carbodiimide group to a polyolefin main chain is not particularly limited, and a known graft polymerization method such as a solution method or a melting and kneading method can be employed.

<Radical Copolymerization>

The polyolefin resin (A) having a group reactive with a carbodiimide group can also be obtained by radical-copolymerizing an olefin and a compound reactive with a carbodiimide group. As an olefin, one identical to the olefin for forming the polyolefin as a graft main chain can be employed. The compound reactive with a carbodiimide group is as described above.

The method for radical-copolymerizing an olefin and a compound reactive with a carbodiimide group is not particularly limited, and a known radical copolymerization can be employed.

Irrespective of which copolymerization method such as graft copolymerization or radical copolymerization is employed, the polyolefin resin (A) having a group reactive with a carbodiimide group is preferably one that satisfies the following requirement.

The content of the group reactive with a carbodiimide group in the polyolefin resin (A) having a group reactive with a carbodiimide group is preferably 0.1 to 10% by mass, more preferably 0.1 to 3% by mass, further preferably 0.1 to 2% by mass. When the content of the group reactive with a carbodiimide group is excessively high beyond the above-mentioned range, the group reactive with a carbodiimide group is crosslinked by the carbodiimide group-containing compound (B), so that it is difficult to produce the carbodiimide-modified polyolefin (a). When the content of the group reactive with a carbodiimide group is below the above-mentioned range, the carbodiimide-modified polyolefin (a) can be produced, but the bond part between the carbodiimide group-containing compound (B) as a backbone of the carbodiimide-modified polyolefin (a) and the polyolefin resin (A) is reduced, so that reinforcement performance and dispersibility of reinforcing fibers in the molding material are deteriorated.

For preventing crosslinking of the polyolefin copolymer (A), it is preferred that the number average molecular weight of the polyolefin resin (A) is small and the molar ratio of (molar number of group reactive with carbodiimide group)/(molar number of molecular chain of polyolefin copolymer (A)) is low. This means that when the number of groups reactive with a carbodiimide group, which are present on one molecular chain in the polyolefin resin (A), is one rather than two or more, where possible, the carbodiimide group (N═C═N) of the carbodiimide group-containing compound (B) can react with a carbodiimide group in the polyolefin resin (A) to form a bond without causing crosslinking and gelation.

By controlling the number average molecular weight (Mn) of the polyolefin resin (A) having a group reactive with a carbodiimide group and the content of the group reactive with a carbodiimide group, deterioration of production stability due to occurrence of crosslinking can be prevented in production of the carbodiimide-modified polyolefin (a), and reinforcement performance and dispersibility of reinforcing fibers can be sufficiently improved when a fiber-reinforced polypropylene resin composition is prepared using the carbodiimide-modified polyolefin (a). That is, it is preferred that the polyolefin resin (A) having a group reactive with a carbodiimide group satisfies the following formula (1):

$$0.1 < Mn/\{(100-M) \times f/M\} < 6 \qquad (1)$$

wherein f: molecular weight (g/mol) of group reactive with carbodiimide group;

M: content (wt %) of group reactive with carbodiimide group; and

Mn: number average molecular weight of polyolefin resin (A) having group reactive with carbodiimide group.

From the viewpoint of production stability such that crosslinking does not occur, it is further preferred to satisfy the following formula (2), and it is most preferred to satisfy the formula (3).

$$0.3 < Mn/\{(100-M) \times f/M\} < 4 \qquad (2)$$

$$0.5 < Mn/\{(100-M) \times f/M\} < 2.5 \qquad (3)$$

When the number average molecular weight (Mn) of polyolefin resin (A) having a group reactive with a carbodiimide group and the group reactive with a carbodiimide group satisfies the above relationship, the carbodiimide-modified polyolefin (a) can be stably produced without causing crosslinking.

When the polyolefin resin (A) having a group reactive with a carbodiimide group is obtained by graft polymerization, crosslinking tends to easily occur during production as compared to a resin having a large α-olefin copolymerization amount, such as an ethylene-butene copolymer, if the polyolefin as a graft main chain is a resin having a high ethylene content, such as linear low-density polyethylene. Thus, for producing the polyolefin resin (A) by using as a graft main chain a resin with a high ethylene content while suppressing crosslinking, it is preferred to perform adjustment so that the number of groups reactive with a carbodiimide group, which are present on one molecular chain in the polyolefin resin (A), is one wherever possible.

When the polyolefin as a graft main chain is a resin, such as polypropylene, the molecular weight of which is easily reduced by thermal decomposition, a phenomenon is hard to occur in which the viscosity is increased by crosslinking. Thus, when a resin which is easily thermally decomposed is used as a graft main chain, the carbodiimide-modified polyolefin (a) may be produced without causing an increase in viscosity even if the number of groups reactive with a carbodiimide group, which are present on one molecular chain in the polyolefin resin (A), is two or more.

The melt flow rate (MFR) of the polyolefin resin (A) having a group reactive with a carbodiimide group at 190° C. or 230° C. under a load of 2.16 kg according to ASTM D1238 is preferably 0.01 to 500 g/10 minutes, more preferably 0.05 to 300 g/10 minutes. When the melt flow rate is in the above-mentioned range, the carbodiimide-modified polyolefin (a) excellent in effect of improving reinforcement performance and dispersibility of reinforcing fibers is obtained.

The density of the polyolefin resin (A) having a group reactive with a carbodiimide group is preferably 0.8 to 1.1 $g/cm^3$, more preferably 0.8 to 1.05 $g/cm^3$, further preferably 0.8 to 1 $g/cm^3$.

<Carbodiimide Group-Containing Compound (B)>

The carbodiimide group-containing compound (B) is preferably a polycarbodiimide having a repeating unit represented by the following general formula (4).

$$-N=C=N-R_1- \quad (4)$$

wherein $R_1$ represents a divalent organic group.

The method for synthesis of a polycarbodiimide is not particularly limited, and a polycarbodiimide can be synthesized by, for example, reacting an organic polyisocyanate in the presence of a catalyst that promotes a carbodiimidization reaction of an isocyanate group.

The polystyrene-equivalent number average molecular weight (Mn) of the carbodiimide group-containing compound (B) determined by gel permeation chromatography (GPC) is preferably 400 to 500,000, more preferably 1,000 to 10,000, further preferably 2,000 to 4,000. The number average molecular weight (Mn) being in the above-mentioned range is preferred because the carbodiimide-modified polyolefin (a) excellent in effect of improving reinforcement performance and dispersibility of reinforcing fibers is obtained.

To the carbodiimide group-containing compound (B) may be added a monocarbodiimide, or carbodiimide group-containing compounds can be used alone or in mixture of two or more thereof.

A commercially available carbodiimide group-containing compound can also be used as it is. Examples of the commercially available carbodiimide-group containing compound include CARBODILITE (registered trademark) HMV-8CA and CARBODILITE (registered trademark) LA1 manufactured by Nisshinbo Industries Inc. and Stabaxol (registered trademark) P and Stabaxol (registered trademark) P400 manufactured by Rhein Chemie Corporation.

The content of the carbodiimide group in the carbodiimide group-containing compound (B) and the obtained carbodiimide-modified polyolefin (a) can be measured by $^{13}C$-NMR, IR, a titration method or the like, and can be determined as a carbodiimide equivalent. A peak is observed at 130 to 142 ppm in $^{13}C$-NMR, and a peak is observed at 2130 to 2140 $cm^{-1}$ in IR.

For example, $^{13}C$-NMR measurement is performed in the following manner. That is, 0.35 g of a sample is dissolved in 2.0 ml of hexachlorobutadiene under heating. The solution is filtered with a glass filter (G2), 0.5 ml of deuterated benzene is then added, and the mixture is added in a NMR tube having an inner diameter of 10 mm. $^{13}C$-NMR measurement is performed at 120° C. using a NMR measurement apparatus Model GX-500 manufactured by JEOL Ltd. The number of times of integration is 10,000 or more.

For example, IR measurement is performed in the following manner. That is, a sample is heat-pressed at 250° C. for 3 minutes to prepare a sheet, and the infrared absorption spectrum of the sheet is then measured by a transmission method using an infrared spectrophotometer (manufactured by JASCO Corporation, FT-IR 410 Model). For measurement conditions, the resolution is 2 $cm^{-1}$ and the number of times of integration is 32.

The infrared absorption spectrum in the transmission method is inversely proportional to the thickness of a sample as shown by Lambert-Beer's law, and the absorbance itself does not indicate a concentration of the carbodiimide group in the sample. Thus, for measuring the carbodiimide group content, it is necessary that the thicknesses of samples to be measured be equalized, or the peak intensity of the carbodiimide group be normalized using an internal standard peak.

When the carbodiimide group content of the carbodiimide-modified polyolefin (a) is measured in IR measurement, IR measurement is performed using a sample whose concentration of the carbodiimide group is known, a calibration curve is prepared using a ratio of an absorbance at a peak appearing at 2130 to 2140 $cm^{-1}$ and an absorbance at an internal standard peak, and the measured value of the sample is substituted in the calibration curve to determine a concentration.

As the internal standard peak, a peak originating from the polypropylene backbone may be used, or internal standard substances may be mixed such that the concentration in the sample is constant, followed by using the sample for measurement.

<Polypropylene Resin (b)>

The polypropylene resin (b) to be used in the present invention is so called an unmodified polypropylene resin, and is a homopolymer of propylene or a copolymer of propylene and at least one selected from an α-olefin, a conjugated diene, a nonconjugated diene and so on.

Examples of the α-olefin include α-olefins with a carbon number of 2 to 12 other than propylene, such as ethylene, 1-butene, 3-methyl-1-butene, 4-methyl-1-pentene, 3-methyl-1-pentene, 4-methyl-1-hexene, 4,4-dimethyl-1-hexene, 1-nonene, 1-octene, 1-heptene, 1-hexene, 1-decene, 1-undecene and 1-dodecene. Examples of the conjugated diene or nonconjugated diene include butadiene, ethylidene norbornane, dicyclopentadiene and 1,5-hexadiene. One or more of these other monomers may be selected and used.

Examples of the backbone structure of the polypropylene resin (b) may include homopolymers of propylene, and random copolymers or block copolymers containing propylene and one or more of the other monomers. Examples of those that are preferred include polypropylene, ethylene-propylene copolymers, propylene-1-butene copolymers and ethylene-propylene-1-butene copolymers. The polypropylene resin (b) may contain a copolymerization component other than those described above as long as the effect of the present invention is not impaired.

<Reinforcing Fibers (c)>

The reinforcing fiber (c) to be used in the present invention is not particularly limited, and for example, high-strength and high-elasticity fibers such as carbon fibers, glass fibers, aramid fibers, alumina fibers, silicon carbide fibers, boron fibers and metal fibers can be used. They may be used alone or in combination of two or more thereof. Among them, carbon fibers such as PAN-based carbon fibers, pitch-based carbon fibers, rayon-based carbon fibers are preferably used. From the viewpoint of a balance between the strength and the elastic modulus of a molded article obtained, PAN-based carbon fibers are further preferred. For the purpose of imparting conductivity, reinforcing fibers covered with a metal such as nickel, copper or ytterbium can also be used.

Further, the carbon fiber has a surface oxygen concentration (O/C) that is preferably 0.05 to 0.5, more preferably 0.08 to 0.4, further preferably 0.1 to 0.3, the surface oxygen concentration (O/C) being a ratio of the number of atoms between oxygen (O) and carbon (C) of the surface of the fiber as measured by X-ray photoelectron spectroscopy. When the surface oxygen concentration is 0.05 or more, the amount of functional groups of the surface of the carbon fiber can be secured, so that strong adhesion with the thermoplastic resin can be achieved. The upper limit of the surface oxygen concentration ratio is not particularly limited, but a surface oxygen concentration ratio of 0.5 or less may be shown as an example in view of a balance between handling characteristics and productivity of carbon fibers.

The surface oxygen concentration ratio of the carbon fiber is determined in accordance with the following process by X-ray photoelectron spectroscopy. First, a carbon fiber bundle freed of a sizing agent etc. deposited on the surfaces of carbon fibers using a solvent is cut into 20 mm, and the carbon fiber is spread and arranged on a copper sample support, and the inside of a sample chamber is then held at $1 \times 10^8$ Torr. The kinetic energy value (K.E.) of the primary peak of C1s is adjusted to 1202 eV as a correction value of a peak associated with charge during measurement using AlKα1, 2 as an X ray source. A C1s peak area is determined by drawing linear baseline in a range of 1191 to 1205 eV as K.E. A $O_{1S}$ peak area is determined by drawing linear baseline in a range of 947 to 959 eV as K.E. The surface oxygen concentration ratio is calculated as a ratio of the number of atoms from a ratio of the O1s peak area to the C1s peak area using a sensitivity correction value specific to an apparatus. Model ES-200 manufactured by Kokusai Electric Inc. is used as an X-ray photoelectron spectroscopy apparatus, and the sensitivity correction value is set to 1.74.

Means for controlling the surface oxygen concentration ratio [O/C] to 0.05 to 0.5 is not particularly limited, and for example, methods such as an electrolytic oxidation process, a chemical solution oxidation process and a gas phase oxidation process can be employed, with the electrolytic oxidation process being preferred in particular.

The average fiber diameter of reinforcing fibers is not particularly limited, but is preferably in a range of 1 to 20 μm, more preferably in a range of 3 to 15 μm. The number of monofilaments in the case of the reinforcing fiber bundle is not particularly limited, and is in a range of 100 to 350,000, preferably in a range of 1,000 to 250,000 in particular. From the viewpoint of productivity of reinforcing fibers, the number of monofilaments is preferably large, and is preferably in a range of 20,000 to 100,000.

<Reinforcing Fiber Base>

The reinforcing fibers (c) in the fiber-reinforced polypropylene resin composition of the present invention may be contained in the form of a reinforcing fiber base. The reinforcing fiber base means one obtained by processing reinforcing fibers in the form of a sheet, a cloth, a web or the like. The form or shape of the reinforcing fiber base is not particularly limited as long as there are gaps between reinforcing fibers for impregnation of a resin, and for example, reinforcing fibers may be mixed with organic fibers, an organic compound or an inorganic compound, or reinforcing fibers may be sealed together, or reinforcing fibers may be bonded to a resin component.

Examples of the preferred form of the reinforcing fiber base include a chopped strand mat obtained by processing chopped strands in the form of a nonwoven fabric; a reinforcing fiber nonwoven fabric obtained by dispersing reinforcing fibers substantially in the form of monofilaments to form a nonwoven fabric; a bundle obtained by aligning continuous fibers in one direction; a cloth composed of continuous fibers; and a base obtained by making a large number of notches in a cloth composed of continuous fibers, so that impregnation of a resin is facilitated.

A base may be shown as a preferred shape in which reinforcing fibers are sufficiently opened and reinforcing fibers are sealed together with an organic compound in the form of a nonwoven fabric obtained by a dry method or a wet method for facilitating two-dimensional orientation of reinforcing fibers. The reinforcing fibers (c) that form the reinforcing fiber base are preferably continuous fibers from the viewpoint of the dynamic characteristics of a molded article.

In the present invention, the reinforcing fibers (c) should be sizing-treated with a polyfunctional compound (s).

<Polyfunctional Compound (s)>

The polyfunctional compound (s) is not particularly limited, and a compound having two or more functional groups, such as an epoxy group, a carboxyl group, an amino group and a hydroxy group, per molecule. They may be used alone or in combination of two or more thereof. When a compound having less than two functional groups per molecule is used, adhesion between reinforcing fibers and a matrix resin and water degradation resistance are deteriorated. Therefore, the number of functional groups is essentially two or more, and is further preferably three or more, per molecule. That is, as the polyfunctional compound, a compound having a tri- or higher functional group is preferably used.

Examples of the specific polyfunctional compound include polyfunctional epoxy resins, polyethyleneimine, acid-modified polypropylene, neutralized products of acid-modified polypropylene, aminoethylated acryl polymers and polyvinyl alcohol.

Examples of the polyfunctional epoxy resin include bisphenol A-type epoxy resins, bisphenol F-type epoxy resins, aliphatic epoxy resins and phenol novolak type epoxy resins. Among them, aliphatic epoxy resins which easily exhibit adhesion with a matrix resin are preferred. Usually, when having a large number of epoxy groups, an epoxy resin tends to have a structure with low toughness because the crosslinking density after the crosslinking reaction increases. Therefore, even though the epoxy resin exists as a sizing agent between reinforcing fibers and a matrix resin, peeling easily occurs because the resin is fragile, so that a strength as a fiber-reinforced composite material may not be exhibited. However, an aliphatic epoxy resin has a flexible backbone, and therefore tends to have a structure with high toughness although the crosslinking density is high. Existence of the aliphatic epoxy resin between reinforcing fibers and a matrix resin is preferred because the aliphatic epoxy resin is flexible, so that peeling is hard to occur, and therefore a strength as a fiber-reinforced composite material is easily improved. When the aliphatic epoxy resin is used in combination with the carbodiimide-modified polyolefin (a), water degradation resistance is improved.

Specific examples of the aliphatic epoxy resin include diglycidyl ether compounds such as ethylene glycol diglycidyl ether, polyethylene glycol diglycidyl ether, propylene glycol diglycidyl ether, polypropylene glycol diglycidyl ether, 1,4-butanediol diglycidyl ether, neopentyl glycol diglycidyl ether, polytetramethylene glycol diglycidyl ether and polyalkylene glycol diglycidyl ethers; and polyglycidyl ether compounds such as glycerol polyglycidyl ether, diglycerol polyglycidyl ether, polyglycerol polyglycidyl ether, sorbitol polyglycidyl ether, arabitol polyglycidyl ether, trimethylolpropane polyglycidyl ether, trimethylolpropane glycidyl ether, pentaerythritol polyglycidyl ether and polyglycidyl ethers of aliphatic polyhydric alcohols.

Among aliphatic epoxy resins, aliphatic polyglycidyl ether compounds having a large number of glycidyl groups having high reactivity are preferred. Among them, glycerol polyglycidyl ether, diglycerol polyglycidyl ether, polyethylene glycol glycidyl ether and polypropylene glycol glycidyl ether are further preferred. The aliphatic polyglycidyl ether compound is preferred because flexibility, the crosslinking density and compatibility with a matrix resin are well balanced, so that adhesion is effectively improved.

Polyethylene imine is also preferred because adhesion with a matrix resin is easily exhibited. Polyethylene imine has a flexible backbone, and existence of polyethylene imine between reinforcing fibers and a matrix resin is preferred because polyethylene imine is flexible, so that peeling is hard to occur, and therefore a strength as a fiber-reinforced composite material is easily improved. Polyethylene imine is water-soluble, and therefore is easily added to the surfaces of reinforcing fibers uniformly when added to reinforcing fibers as an aqueous solution.

Examples of the acid-modified polypropylene and neutralized product of acid-modified polypropylene include those having a polymer main chain composed principally of a hydrocarbon such as propylene and a side chain containing a carboxyl group formed from an unsaturated carboxylic acid or a metal salt or ammonium salt thereof. The polymer main chain may be a random copolymer obtained by copolymerizing propylene and an unsaturated carboxylic acid, or may be a graft copolymer obtained by grafting an unsaturated carboxylic acid to propylene. A copolymerization component capable of being copolymerized, such as an α-olefin, a conjugated diene or a nonconjugated diene may also be copolymerized. The acid-modified polypropylene and the neutralized product of acid-modified polypropylene are preferred because they are flexible while having a large number of functional groups per molecule, and have good compatibility with a matrix resin because the backbone is polypropylene similar to the matrix resin, so that adhesion is easily improved.

Examples of the unsaturated carboxylic acid include acrylic acid, methacrylic acid, maleic acid, fumaric acid, itaconic acid, crotonic acid, isocrotonic acid, citraconic acid, allylsuccinic acid, mesaconic acid, glutaconic acid, nadic acid, methylnadic acid, tetrahydrophthalic acid and methyltetrahydrophthalic acid. Particularly, maleic acid, acrylic acid or methacrylic acid is preferred because it is easily copolymerized. Only one unsaturated carboxylic acid or two or more unsaturated carboxylic acids may be used for copolymerization with propylene or graft copolymerization with propylene. Preferably, the neutralized product of acid-modified polypropylene has at least some of carboxyl groups neutralized with a metal cation such as that of Na, K, Li, Mg, Zn, Ca, Cu, Fe, Ba or Al or an ammonium ion.

The amount of oxycarbonyl groups is preferably 0.05 to 5 millimol equivalent per 1 g of the acid-modified polypropylene or neutralized product of acid-modified polypropylene because two or more functional groups are present. The content of oxycarbonyl groups is more preferably 0.1 to 4 millimol equivalent, further preferably 0.3 to 3 millimol equivalent. Examples of the method for analyzing a content of an oxycarbonyl group as described above include a method in which a metal species forming a salt is quantitatively detected by ICP emission spectrometry in the case of the neutralized product. Mention is also made of a method in which the quantity of carbonyl carbon is determined using IR, NMR and elementary analysis. When the amount of oxycarbonyl groups is less than 0.05 millimol equivalent, it tends to be difficult to exhibit adhesion, and when the amount of oxycarbonyl groups is more than 5 millimol equivalent, the acid-modified polypropylene or neutralized product of acid-modified polypropylene may be fragile.

Here, the reinforcing fibers (c) being sizing-treated with the polyfunctional compound (s) means that the polyfunctional compound (s) is deposited on the surfaces of the reinforcing fibers (c). By adding the polyfunctional compound to reinforcing fibers as a sizing agent, adhesion of the surfaces of the reinforcing fibers and composite overall characteristics can be effectively improved even if the amount of the addition is small.

For obtaining the above-mentioned effect, it is preferred that the sizing agent exists at an interface between reinforcing fibers and a matrix resin in the fiber-reinforced polypropylene resin composition. Accordingly, it may be preferred that the polyfunctional compound (s) is deposited on the entire periphery of the reinforcing fibers to cover the reinforcing fibers. However, even if a part of reinforcing fibers is not covered, the effect of the present invention may be exhibited as long as sufficient adhesion is secured at the surrounding covered part.

The deposition amount of the sizing agent is preferably 0.01% by mass to 10% by mass (inclusive), more preferably 0.05% by mass to 5.0% by mass (inclusive), further preferably 0.1% by mass to 2% by mass (inclusive) based on the mass of only reinforcing fibers. When the deposition amount is less than 0.01% by mass, the adhesion improvement effect is hard to be exhibited probably because the ratio of sizing agent non-deposited areas increases, and when the deposition amount is more than 10% by mass, the properties of the matrix resin may be deteriorated.

To the sizing agent may be added other components such as a bisphenol-type epoxy compound, a linear low-molecular-weight epoxy compound, polyethylene glycol, polyurethane, polyester, an emulsifier or a surfactant for the purpose of adjusting the viscosity, improving abrasion resistance, improving resistance to fluff, improving collectability, and improving high-order processability, etc.

The step of adding a sizing agent to reinforcing fibers (c) is not particularly limited, and for example, the sizing agent may be added in the process of production/processing, for example a step of producing reinforcing fibers or a step of processing reinforcing fibers into a reinforcing fiber base, or the produced reinforcing fibers or the processed reinforcing fiber base may be sizing-treated separately.

Examples of means for adding a sizing agent include a method in which reinforcing fibers are immersed in a sizing solution via a roller, a method in which reinforcing fibers are brought into contact with a sizing solution-deposited roller, and a method in which a sizing solution is atomized and sprayed. Either a batch system or a continuous system may be used, but a continuous system is preferred because it is high in productivity and is capable of reducing variations. At this time, preferably the concentration of a sizing solution, the temperature and the thread tension etc. are controlled so that the sizing agent is uniformly deposited while the deposition amount of a sizing agent effective component with respect to reinforcing fibers falls within a proper range. Further, it is more preferred to ultrasonically vibrate reinforcing fibers when the sizing agent is added.

The drying temperature and drying time after addition of the sizing agent are adjusted according to the deposition amount of the sizing agent. For fully removing a solvent used for addition of the sizing agent, reducing the time taken for drying, and preventing heat degradation of the sizing agent, the drying time is preferably 150° C. to 350° C. (inclusive), more preferably 180° C. to 250° C. (inclusive).

Examples of the solvent to be used for the sizing agent include water, methanol, ethanol, dimethylformamide, dimethylacetamide and acetone, but water is preferred from the viewpoint of easy handling and disaster prevention. Therefore, when a compound which is insoluble or hardly soluble in water is used as a sizing agent, it is preferred to disperse the compound in water by adding an emulsifier or a surfactant. Specific examples of the emulsifier or surfactant that can be used include styrene-maleic anhydride copolymers, olefin-maleic anhydride copolymers and formalin condensates of naphthalene sulfonic acid salts; anionic emulsifiers such as sodium polyacrylate and cationic emulsifiers such as polyvinyl imidazoline; and nonionic emulsifiers such as nonylphenol ethylene oxide adducts, polyvinyl alcohol, polyoxyethylene ether ester copolymers and sorbitan ester ethylene oxide adducts. Nonionic emulsifiers having a small interaction are preferred because the adhesion effect of the polyfunctional compound is hard to be impaired.

The fiber-reinforced polypropylene resin composition of the present invention may contain fillers and additives in addition to the essential components (a), (b), (c) and (s) as long as the purpose of the present invention is not impaired. Either the filler or the additive refers to a component to be used for improving various kinds of characteristics of a fiber-reinforced polypropylene resin composition and a molded product obtained from the fiber-reinforced polypropylene resin composition. The filler means a solid component other than reinforcing fibers, which exists while being incompatible with a matrix resin in the fiber-reinforced polypropylene resin composition. The additive means a component other than the matrix resin and compatible with the matrix resin.

Examples of the filler include inorganic fillers and organic fillers. Examples of the inorganic filler include calcium oxide, magnesium oxide, calcium hydroxide, magnesium hydroxide, aluminum hydroxide, calcium carbonate, magnesium carbonate, calcium silicate, magnesium silicate, calcium sulfate, barium sulfate, calcium sulfite, talc, mica, clay, dolomite and basic magnesium carbonate. Examples of the organic filler include particulate heat-cured resins, wood flours, cork powders, chaff powders, refined pulps, straw, paper, cotton, rayon, staple fibers, cellulose and coconut shell powders.

Examples of the additive include impregnation aids, elastomers, flame retardants, conductivity imparting agents, nucleating agents, ultraviolet absorbers, antioxidants, vibration damping agents, antibacterial agents, insect repellents, deodorants, coloration inhibitors, heat stabilizers, mold release agents, antistatic agents, plasticizers, lubricants, colorants, pigments, dyes, foaming agents, antifoamers and coupling agents.

In the first invention in the present invention, the content of the carbodiimide group contained in a matrix resin component in the fiber-reinforced polypropylene resin composition is necessarily 0.0005 to 140 mmol, preferably 0.001 to 100 mmol, further preferably 0.01 to 60 mmol based on 100 g of the matrix resin component. When the content of the carbodiimide group is less than 0.0005 mmol based on 100 g of the matrix resin component, water degradation resistance cannot be achieved, and the molded article obtained has poor dynamic characteristics. When the content of the carbodiimide group is more than 140 mmol based on 100 g of the matrix resin component, economic efficiency is compromised because the strength improvement effect is not significantly enhanced in view of the content of the carbodiimide group.

Here, the matrix resin refers to a component composed of an organic substance other than reinforcing fibers and a filler in the fiber-reinforced polypropylene resin composition. For example, as for constituent components essential in the present invention, a mixture of the component (a), the component (b) and the component (s) is the matrix resin component. When the fiber-reinforced polypropylene resin composition of the present invention contains an additive composed of an organic substance in addition to the essential components, a component defined as the matrix resin component includes the additive composed of an organic substance.

The content of the carbodiimide group contained in a matrix resin component in the fiber-reinforced polypropylene resin composition can also be calculated from the composition of raw materials used. When the content of the carbodiimide group is determined from the fiber-reinforced polypropylene resin composition, the matrix resin component can be dissolved and separated to perform measurement by IR, $^{13}$C-NMR, a titration method or the like as described above.

In the second invention in the present invention, it is necessary that the content of each component in the fiber-reinforced polypropylene resin composition be 0.01 to 50 parts by mass for the carbodiimide-modified polyolefin (a), 20 to 99 parts by mass for the polypropylene resin (b) and 1 to 80 parts by mass for the reinforcing fibers (c) sizing-treated with the polyfunctional compound (s) where the total of the component (b) and the component (c) is 100 parts by mass. The effect of the present invention can also be achieved when the content of each component in the fiber-reinforced polypropylene resin composition is in the above-mentioned range. The content of the carbodiimide-modified polyolefin (a) is preferably 0.05 to 30 parts by mass, further preferably 0.1 to 20 parts by mass. The content of the polypropylene resin (b) is preferably 30 to 95 parts by mass, further preferably 50 to 90 parts by mass. The content of the sizing-treated reinforcing fibers (c) is preferably 5 to 70 parts by mass, further preferably 10 to 50 parts by mass.

When the content of the carbodiimide-modified polyolefin (a) is less than 0.01 parts by mass, water degradation resistance cannot be obtained, and the molded article obtained has poor dynamic characteristics. When the content of the carbodiimide-modified polyolefin (a) is more than 50 parts by mass, economic efficiency is compromised because the effect of improving the dynamic characteristics of the molded article obtained is not significantly enhanced in view of the content of the carbodiimide-modified polyolefin.

When the content of reinforcing fibers (c) sizing-treated with a polyfunctional compound is less than 1 part by mass, the dynamic characteristics of the molded article obtained may be insufficient, and when the content is more than 80 parts by mass, fluidity at the time of molding processing may be deteriorated, and impregnation of the matrix resin component to reinforcing fibers may be insufficient, resulting in deterioration of dynamic characteristics.

The carbodiimide-modified polyolefin (a) has a carbodiimide group content of preferably 1 to 200 mmol, more preferably 5 to 150 mmol, further preferably 10 to 100 mmol per 100 g of the modified polyolefin.

Of course, when the requirements of both the first invention and the second invention are satisfied, the effect of the present invention can be further enhanced.

The fiber-reinforced polypropylene resin composition of the present invention can be suitably used as a molding material such as a pellet-shaped molding material, a sheet-shaped molding material or a prepreg. The aspect of the molding material is diversified, and can be selected from the viewpoint of moldability, dynamic characteristics and handling characteristics. Although not particularly limited, particularly preferred aspects of the molding material will be described in detail below.

The prepreg of the present invention is a prepreg including the fiber-reinforced polypropylene resin composition of the present invention, with the reinforcing fibers (c) being present as a reinforcing fiber base. That is, in the prepreg of the present invention, a reinforcing fiber base is impregnated with a polypropylene resin composition containing the component (a) and the component (b). The prepreg includes a resin-semi-impregnated base which is integrated while a reinforcing fiber base is not fully impregnated with a resin (semipreg: hereinafter, referred to as a semi-impregnated prepreg in some cases) in addition to one in which a reinforcing fiber base is fully impregnated with a resin. Preferably, the prepreg is in the form of a sheet.

In this specification, unless otherwise specified, the fiber refers to a reinforcing fiber in the fiber or the terminology including fiber (e.g. "fiber direction" etc.).

<Molding Material of First Preferred Aspect>

As one preferred aspect of the method for using the fiber-reinforced polypropylene resin composition of the present invention, the following molding material is shown as an example. That is, the first preferred aspect is a molding material containing a terpene resin (d) in addition to the component (a), the component (b), the component (c) and the component (s), wherein a polypropylene resin component containing the component (a) and the component (b) is bonded to a composite containing the component (c) and the component (d). Further, the SP value of the component (d) is 6.5 to 9, and the SP value of the component (d) is lower than the SP value of the polyfunctional compound (s).

In the present invention, it is important that the carbodiimide-modified polyolefin (a) is used in combination with the reinforcing fibers (c) sizing-treated with the polyfunctional compound for achieving water degradation resistance, and fiber dispersibility during molding is improved by including the terpene resin (d). First, these components will be described.

<Terpene Resin (d)>

The terpene resin (d) is a homopolymer of a terpene monomer or a copolymer of a terpene monomer and an aromatic monomer etc. Polymerization is usually performed in the presence of a Friedel-Crafts catalyst in an organic solvent.

The terpene resin (d) is a thermoplastic polymer having a low melt viscosity. The terpene resin (d) is preferred because it has a melt viscosity lower than that of a polypropylene resin component composed of at least the component (a) and the component (b) (hereinafter, the polypropylene rein component composed of at least the component (a) and the component (b) is referred to as the present polypropylene resin component), so that in a step of molding to a final shape, such as injection molding or press molding, the viscosity of the molten molding material can be reduced to improve moldability. At this time, moldability can be effectively improved because the terpene resin (d) has good compatibility with the present propylene resin component.

Examples of the terpene resin include polymers of a terpene monomer and copolymers of a terpene monomer and an aromatic monomer. Examples of the terpene monomer include monocyclic monoterpenes such as α-pinene, β-pinene, dipenetene, d-limonene, myrcene, alloocimene, ocimene, α-phellandrene, α-terpinene, γ-terpinene, terpinolene, 1,8-cineole, 1,4-cineole, α-terpineol, β-terpineol, γ-terpineol, sabinene, para-menthadienes and carenes. Examples of the aromatic monomer include styrene and α-methylstyrene.

Among them, terpene resins including a monomer unit selected from α-pinene, β-pinene, dipenetene and d-limonene are preferred because they have good compatibility with the polypropylene-based resin, and homopolymers of these monomers are more preferred. Hydrogenated terpene resins obtained by subjecting the above-mentioned terpene resin to a hydrogenation treatment are preferred because they have better compatibility with the present polypropylene-based resin.

The glass transition temperature of the terpene resin (d) is preferably 30 to 100° C. This is because when the glass transition temperature is in the above-described range, the handling characteristics of the molding material of the present invention are improved. When the glass transition temperature is lower than 30° C., the material may not be quantitatively introduced because the terpene resin (d) becomes semi-solid or liquid during molding processing. When the glass transition temperature is higher than 100° C., moldability may not be improved because the terpene resin (d) is quickly solidified during molding processing.

The number average molecular weight of the terpene resin (d) is preferably 500 to 5000. When the number average molecular weight is less than 500, the mechanical characteristics of the molded article may be impaired because the mechanical strength of the terpene resin is low. When the number average molecular weight is more than 5000, moldability may not be improved because the viscosity of the terpene resin increases. When molding processing and kneading are performed using the molding material of the present invention, the number average molecular weight of the component (d) is lowered to ensure that the component (d) easily flows and moves through the inside of a mixture of the component (a), the component (b), the component (c) and the component (d). The number average molecular weight can be measured using gel permeation chromatography (GPC).

Here, the terpene resin (d) should be compatible with the present polypropylene resin component for effectively improving moldability of the molding material. The SP value of the present polypropylene resin component depends on types and blending ratios of the component (a) and the component (b) to be used, but this value is usually about 8 to 9, and therefore the SP value of the terpene resin (d) should be 6.5 to 9.5. The SP value of the terpene resin (d)

is more preferably 7.5 to 9. When the SP value falls out of the range of 6.5 to 9.5, the terpene resin tends to be hardly compatible with the present polypropylene resin component as a matrix resin, so that moldability is hard to be improved.

Here, the SP value is a solubility parameter, and it is empirically known that the solubility increases as the SP values of the two components become closer to each other. Several methods for determination of a SP value are known, but the same determination method may be used in comparison. Specifically, use of the Fedors method is desirable (see "Foundation/Application and Calculation of SP Value", 31 Mar. 2005, first edition, publisher: Akitoshi Taniguchi, published by JOHOKIKO CO., LTD., pages 66 to 67).

The SP value of the terpene resin (d) should be lower than the SP value of the polyfunctional compound (s). When the SP value of the terpene resin (d) is higher than the SP value of the polyfunctional compound, interfacial adhesion cannot be improved because the SP value of the terpene resin (d) is closer to the SP value of the polyfunctional compound (s) than the SP value of the present propylene resin component, so that the polyfunctional compound (s) added to the surfaces of the reinforcing fibers (c) is replaced by the terpene resin (d).

Here, in the molding material of the present aspect, a composite including the reinforcing fibers (c) sizing-treated with the polyfunctional compound (s), and the terpene resin (d) is formed. The form of the composite is as shown in FIG. 1, where gaps between monofilaments of the reinforcing fiber bundle (c) are filled with the terpene resin (d). That is, the reinforcing fibers (c) sizing-treated with the polyfunctional compound (s) are dispersed like islands in the sea of the terpene resin (d).

When the molding material of the present aspect is injection-molded, the terpene resin (d) melted and kneaded in a cylinder of an injection molding machine diffuses to the present propylene resin component to help dispersion of the reinforcing fibers (c) sizing-treated with the polyfunctional compound (s) in the present propylene resin component and help impregnation of the present propylene resin component to the reinforcing fibers (c) sizing-treated with the polyfunctional compound (s). That is, the terpene resin (d) serves as so called an impregnation aid and a dispersion aid.

The step of adding the terpene resin (d) to the reinforcing fibers (c) is not particularly limited, and a known method such as a method comprising adding an oil solution, a sizing agent or a matrix resin to fiber bundles can be used. Specific examples may include a method in which the surface of a heated rotating roll is coated with a film of the molten terpene resin (d) having a fixed thickness, and the reinforcing fibers (c) sizing-treated with the polyfunctional compound (s) are driven while being in contact with the surface of the roll to deposit a predetermined amount of the terpene resin (d) per unit length of fiber bundles. Coating of the terpene resin (d) on the surface of the roll can be performed by applying the concept of a known coating apparatus such as a reverse roll, positive rotation roll, kiss roll, spray, curtain or extrusion coating apparatus. The apparatus for coating a roll is described in detail in documents such as "Introduction to Coating Apparatus and Operation Technique" written by Yuzi Harazaki" (United Engineering Center) etc.

In the step of impregnation of the terpene resin (d), the terpene resin (d) is impregnated to the inside of a fiber bundle of the reinforcing fibers (c) by performing operations such that at a temperature at which the terpene resin (d) is melted, the reinforcing fibers (c) with the terpene resin (d) deposited thereon are tensioned by a roll or a bar, repeatedly widened and focused, or pressurized or vibrated. Specific examples may include a method in which a fiber bundle is caused to pass through gaps between a plurality of heated rolls or bars so as to be contact with the surfaces thereof, so that widening or the like is performed.

The melt viscosity of the terpene resin (d) is preferably 0.05 to 1 Pa·s at 190° C. The melt viscosity is more preferably 0.1 to 0.5 Pa·s. When the melt viscosity is less than 0.05 Pa·s, the mechanical characteristics of the molded article may be deteriorated because the mechanical strength of the terpene resin is low. When the melt viscosity is more than 5 Pa·s, moldability may not be improved because the viscosity of the terpene-based resin increases. When molding processing or kneading is performed using the molding material of the present aspect, the melt viscosity of the component (d) is lowered to ensure that the component (d) easily flows and moves through the inside of a mixture of the components (a), (b), (c) and (d).

The content of the terpene resin (d) in the molding material is preferably 0.01 to 25 parts by mass where the total of the component (b) and the component (c) is 100 parts by mass. The content of the terpene resin (d) is more preferably 0.5 to 20 parts by mass, further preferably 1 to 15 parts by mass. When the content of the terpene resin (d) is less than 0.01 parts by mass, dispersibility of reinforcing fibers may be insufficient, and when the content is more than 25 parts by mass, the dynamic characteristics of the molded product may be deteriorated.

It is also preferred that the molding material of the present aspect contains an elastomer (e) in addition to the components (a) to (d). In the present invention, the elastomer is generally a polymer having a glass transition temperature lower than room temperature, with molecules being partially bound with one another by covalent bonding/ionic bonding/van der Waals force/entanglement.

Examples of the elastomer (e) include olefin-based elastomers, styrene-based elastomers, urethane-based elastomers, ester-based elastomers and amide-based elastomers. Specific examples of the olefin-based elastomers include ethylene-α-olefin copolymers, ethylene-propylene-ethylidene norbornane copolymers, and ethylene-propylene non-conjugated diene terpolymers such as ethylene-propylene-hexadiene copolymers. Specific examples of the styrene-based elastomer include random copolymers and block copolymers of styrene-butadiene, styrene-isoprene-styrene, styrene-butadiene-styrene, styrene-ethylene-butadiene-styrene, styrene-ethylene-propylene-styrene, hydrogenated products of the block copolymers and acrylonitrile-butadiene-styrene copolymers. Among them, ethylene-α-olefin copolymers are preferred as olefin-based elastomers because they have good compatibility with polypropylene, so that impact resistance can be effectively improved. One or more of these elastomers may be selected and used.

The SP value of the present polypropylene resin component depends on types and blending ratios of the component (a) and the component (b) to be used, but this value is usually about 8 to 9, and therefore the SP value of the elastomer (e) is preferably 6.5 to 9.5, more preferably 7 to 9. When the SP value of the component (e) falls out of the range of 6.5 to 9.5, moldability may be deteriorated because the component (e) tends to be hardly compatible with the present polypropylene resin component, so that the viscosity of the molten molding material tends to increase in a step of molding to a final shape, such as injection molding or press molding.

When the elastomer (e) is included, the content of the component (e) is preferably 0.01 to 30 parts by mass, more preferably 0.5 to 20 parts by mass, further preferably 1 to 15 parts by mass where the total of the component (b) and the component (c) is 100 parts by mass. When the content of the elastomer (e) is more than 30 parts by mass, the dynamic characteristics of the molded product may be deteriorated.

Figure 2:
FIG. 2 is a schematic view showing one example of a preferred aspect of a molding material of the present invention.

In the molding material of the present aspect, the present polypropylene resin component is bonded to a composite containing the component (c) and the component (d) (hereinafter, simply referred to as a composite). As a preferred aspect of the molding material, the component (c) is arranged almost in parallel in the axial center direction of the molding material and the length of the component (c) is substantially equal to the length of the molding material as shown in FIG. 2.

The term "arranged almost in parallel" mentioned herein refers to a state in which the axis line of the major axis of the reinforcing fiber bundle and the axis line of the major axis of the molding material are directed in the same direction, and the angle of deviation between the axis lines is preferably 20° or less, more preferably 10° or less, further preferably 5° or less. The term "substantially equal length" means that for example in a pellet-shaped molding material, the content of reinforcing fibers having a length equal to or less than 50% of the pellet total length is 30% by mass or less in reinforcing fibers. Further, the content of reinforcing fibers having a length equal to or less than 50% of the pellet total length is preferably 20% by mass or less. The pellet total length is a length in the reinforcing fiber orientation direction. When the reinforcing fibers (c) have a length substantially equal to that of the molding material, the length of reinforcing fibers in the molded article obtained by using the molding material can be increased, and therefore excellent dynamic characteristics can be obtained.

Figure 3:
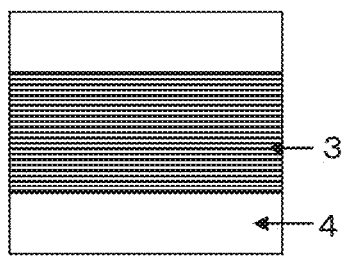
FIG. 3 is a schematic view showing one example of shape of a cross section in the axial center direction in a preferred aspect of the molding material of the present invention.
Figure 4:
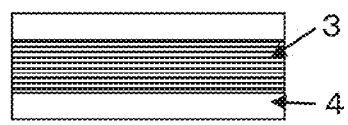
FIG. 4 is a schematic view showing one example of shape of a cross section in the axial center direction in a preferred aspect of the molding material of the present invention.
Figure 5:
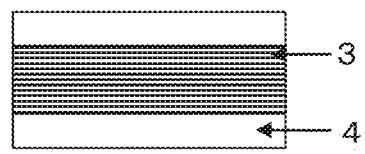
FIG. 5 is a schematic view showing one example of shape of a cross section in the axial center direction in a preferred aspect of the molding material of the present invention.
Figure 6:
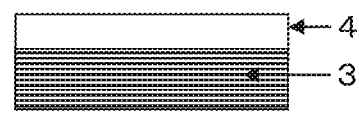
FIG. 6 is a schematic view showing one example of shape of a cross section in the axial center direction in a preferred aspect of the molding material of the present invention.
Figure 7:
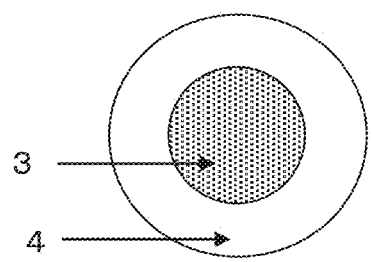
FIG. 7 is a schematic view showing one example of shape of a cross section in the orthogonal direction in a preferred aspect of the molding material of the present invention.
Figure 8:
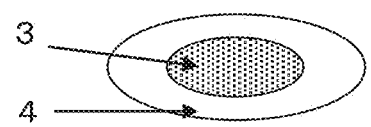
FIG. 8 is a schematic view showing one example of shape of a cross section in the orthogonal direction in a preferred aspect of the molding material of the present invention.
Figure 9:
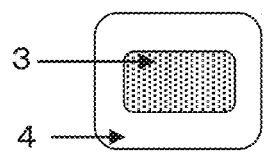
FIG. 9 is a schematic view showing one example of shape of a cross section in the orthogonal direction in a preferred aspect of the molding material of the present invention.
Figure 10:
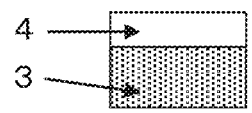
FIG. 10 is a schematic view showing one example of shape of a cross section in the orthogonal direction in a preferred aspect of the molding material of the present invention.
Figure 11:
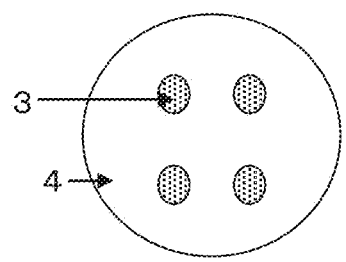
FIG. 11 is a schematic view showing one example of shape of a cross section in the orthogonal direction in a preferred aspect of the molding material of the present invention.

FIGS. 3 to 6 schematically show an example of a shape of a cross section in the axial center direction of the molding material in the present aspect, and FIGS. 7 to 10 schematically show an example of a shape of a cross section in the orthogonal direction of the molding material in the present aspect. The phrase "the present polypropylene resin component is bonded to a composite containing the component (c) and the component (d)" means that a composite 3 containing the component (c) and the component (d) and the present polypropylene resin component 4 are in contact with each other as shown in FIGS. 3 to 10. The shape of the cross section of the molding material is not limited to that shown in the figures as long as the present polypropylene resin component is bonded to the present composite, but a configuration is preferred in which at the cross section in the axial center direction, the present composite as a core material is arranged so as to be sandwiched in a layered state by the present polypropylene resin component as shown in FIGS. 3 to 5. A configuration is preferred in which at the cross section in the orthogonal direction, a core-sheath structure is provided such that the present polypropylene resin component covers the periphery of the present composite as a core as shown in FIGS. 7 to 9. When the two or more present composites are arranged so as to be covered with the present polypropylene resin component as shown in FIG. 11, it is desirable that the number of the present composites is about 2 to 6.

At or around a boundary between the present composite and the present polypropylene resin components, the present polypropylene resin component may penetrate into a part of the present composite to get compatible with the terpene resin (d) in the present composite or impregnate reinforcing fibers.

It is preferred that the molding material maintains almost the same cross-sectional shape and is continuous in the axial center direction. Such a continuous molding material may be cut to a certain length depending on a molding method.

The molding material of the present aspect can be formed into a final molded article by kneading the present composite and the present polypropylene resin component using a method such as, for example, injection molding or press molding. From the viewpoint of the handling characteristics of the molding material, it is important that the present composite and the present polypropylene resin component maintain the above-mentioned shape without being separated from each other before molding is performed. When the present composite and the present polypropylene resin component are separated from each other, the dynamic characteristics of the molded article obtained may be varied due to classification during transportation of the material until molding, during handling and in the molding step, fluidity may be reduced to cause clogging of a mold, or blocking may occur in the molding step because the present composite and the present polypropylene resin component are very different in shape (size and aspect ratio), specific gravity and mass.

Thus, it is preferred that as shown in FIGS. 7 to 9, the present polypropylene resin component is arranged so as to cover the periphery of the present composite, i.e. a core-sheath structure with the present composite forming a core structure and the present polypropylene resin component covering the periphery of the present composite is provided. With the above-mentioned arrangement, the present composite is covered with the present polypropylene resin component to be strongly integrated, so that a material excellent in handling characteristics can be obtained.

The reinforcing fibers (c) are desired to be fully impregnated with the terpene resin (d) and a part of the present polypropylene resin component as described above, but it is practically difficult, and the composite often has a certain number of voids. Particularly, the number of voids increases when the void content of the component (c) in the composite is high, but the effect of promoting impregnation and fiber dispersion is exhibited even when a certain number of voids are present. However, when the void content of the composite is more than 20%, the effect of promoting impregnation and fiber dispersion is reduced, and therefore the void content is preferably 20% or less. The void content is more preferably 15% or less. The void content can be determined by measuring the composite according to the test method in ASTM D2734 (1997), or calculated from the total area of composite portions and the total area of void portions using the following equation after a composite part is observed at the cross section of the molding material.

Void content (%)=total area of void portions/(total area of composite portions+total area of void portions)×100.

The shape of the molding material of the present aspect has been described above by taking as an example a molding material including components (a) to (d), but when a component (e) is included in addition to the components (a) to (d), it is preferred that the present polypropylene resin component contains the component (e). In this case, for example, the symbol 4 in FIGS. 3 to 11 denotes component (a)+component (b)+component (e).

Preferably, the molding material of the present aspect is cut to a length of 1 to 50 mm, and used. By cutting the molding material to the above-mentioned length, fluidity and handling characteristics during molding can be sufficiently enhanced. Examples of the particularly preferred aspect as a molding material cut to an appropriate length as described above may include long-fiber pellets for injection molding. Here, the long-fiber refers to a pellet-shaped molding material in which the length of the reinforcing fiber (c) is substantially equal to the length of the molding material as described above.

The molding material of the present aspect can also be used in a continuous form with a long length depending on a molding method. For example, as a thermoplastic yarn prepreg, the molding material can be wound around a mandrel while being heated to obtain a roll-shaped molded article etc. Examples of the above-mentioned molded article include liquefied natural gas tanks. Also, a plurality of molding materials of the present aspect can be aligned in one direction, heated and fused to prepare a unidirectional thermoplastic prepreg as described in detail in the third preferred aspect shown later.

<Discontinuous Fiber Prepreg of Second Preferred Aspect>

As one preferred aspect of the method for using the fiber-reinforced polypropylene resin composition of the present invention, the following prepreg is shown as an example. That is, the second preferred aspect is a prepreg including the above-mentioned fiber-reinforced polypropylene resin composition, wherein reinforcing fibers (c) are contained as a reinforcing fiber base, and the reinforcing fibers (c) in the prepreg are discontinuous. In the second preferred aspect, it is important that the reinforcing fibers (c) are discontinuous fibers for achieving formativeness to a complex shape in press molding. Here, the discontinuous fiber refers to a reinforcing fiber having a fiber length of less than 100 mm.

Examples of the preferred form of the reinforcing fiber base in a prepreg using discontinuous fibers include a base obtained by making a large number of notches in a cloth composed of continuous fibers, so that impregnation of a resin is facilitated; a chopped strand mat obtained by processing chopped strands in the form of a nonwoven fabric; and a reinforcing fiber nonwoven fabric obtained by dispersing reinforcing fibers substantially in the form of monofilaments to form a nonwoven fabric. A base may be shown as a preferred base in which reinforcing fibers are sufficiently opened and reinforcing fibers are sealed together with an organic compound in the form of a nonwoven fabric obtained by a dry method or a wet method for facilitating two-dimensional orientation of reinforcing fibers.

In a prepreg using discontinuous fibers, it is preferred that the reinforcing fiber base is impregnated with the polypropylene resin from the viewpoint of the handling characteristics of the prepreg. The impregnation rate is preferably 30 to 100%, more preferably 40 to 100%, further preferably 50 to 100%. When the impregnation rate is in a preferred range, a prepreg excellent in handing characteristics and moldability is obtained.

The method for measuring an impregnation rate is not particularly limited, and the impregnation rate can be measured using, for example, the easy and convenient method shown below. Examples may include a method in which the cross section of a prepreg is first observed, and a total area of voids is calculated from a microphotograph and divided by an area of a reinforcing fiber base; a method in which an impregnation rate is determined from a ratio ($hc0/h0$) of a thickness $h0$ of a prepreg at 23° C. and a thickness $hc0$ of the prepreg at 23° C. after being press-molded; and a method in which an impregnation rate is determined from a ratio of a theoretical density determined from the use ratios of materials and a bulk density of a prepreg. Here, the method of observing the cross section of a prepreg in the thickness direction, and measuring an area of void portions at the cross section and an area of the whole cross section to calculate an impregnation rate will be described in detail. That is, the prepreg is embedded in a thermosetting resin such as an epoxy, a surface corresponding to the end of the cross section of the prepreg is polished, an area having a width of about 500 to 1000 µm is observed with an optical microscope or an electronic microscope, and an area of regions impregnated with a resin and an area of regions unimpregnated with a resin are determined in the contrast ratio, and a resin impregnation rate is calculated from the following equation.

$$\text{Resin impregnation rate (\%)}=100\times(\text{total area of regions impregnated with resin})/(\text{cross-sectional area of observed region of prepreg}).$$

The bulk density of the prepreg can be determined from a volume and a mass of the prepreg at 23° C. The bulk density of the prepreg is preferably 0.8 to 1.5, more preferably 0.9 to 1.4, further preferably 1.0 to 1.3. When the bulk density is in a preferred range, the molded article obtained can secure sufficient lightness. Similarly, the basis weight of the prepreg is 10 to 500 $g/m^2$, more preferably 30 to 400 $g/m^2$, further preferably 100 to 300 $g/m^2$.

In the prepreg of the present aspect, reinforcing fibers may be oriented or may be randomly dispersed in the in-plane direction, but it is preferred that reinforcing fibers are randomly dispersed for suppressing variations in dynamic characteristics of the molded article.

Here, when reinforcing fibers are randomly dispersed, it is preferred that the reinforcing fiber base include, in terms of the fiber length of reinforcing fibers, 0 to 50% by mass of reinforcing fibers having a fiber length of more than 10 mm, 50 to 100% by mass of reinforcing fibers having a fiber length of 2 to 10 mm, and 0 to 50% by mass of reinforcing fibers having a fiber length of less than 2 mm. When the content of reinforcing fibers having a length of more than 10 mm is more than 50% by mass, thickness expansion in the lamination step or the molding step may increase to impair handling characteristics. When the content of reinforcing fibers having a length of less than 2 mm is more than 50% by mass, not only the dynamic characteristics of the molded article may be deteriorated, but also moldability may be impaired because sufficient strength cannot be secured in a prepreg or a preform obtained by laminating the prepreg. In view of these points, it is preferred that the reinforcing fiber base contains 80 to 100% by mass of reinforcing fibers having a fiber length of 3 to 8 mm. Reinforcing fibers are more preferred in which the distribution of fiber lengths has at least two peaks, with one peak existing in a fiber length range of 5 to 10 mm and the other peak existing in a fiber length range of 2 to 5 mm. When the distribution of fiber lengths is in a more preferred range, reinforcing fibers to secure dynamic characteristics and reinforcing fibers to secure the handling characteristics of a preform in the lamination step and the molding step can be used in combination, so that both types of characteristics can be easily achieved.

Examples of the method for measuring the fiber length of reinforcing fibers include a method in which a reinforcing fiber is extracted directly from a reinforcing fiber base, and a method in which a solvent that dissolves only a resin of a prepreg is used to dissolve the resin, the remaining reinforcing fibers are removed by filtration and measured by microscopic observation (dissolution method). When a solvent that dissolves a resin is absent, for example a method is available in which at a temperature in a range where reinforcing fibers are not oxidized to loose weight, only the resin is burned out to separate reinforcing fibers, and measurement is performed by microscopic observation (burnout method). The fiber length can be measured by randomly selecting 400 reinforcing fibers and measuring the lengths thereof to the order of 1 μm with an optical microscope. When comparing the method of extracting a reinforcing fiber directly from a reinforcing fiber base and the method of extracting a reinforcing fiber from a prepreg by a burnout method or a dissolution method, there is no particular difference in obtained result as long as conditions are appropriately selected.

When reinforcing fibers are dispersed in the in-plane direction, reinforcing fibers may be dispersed in the form of bundles like a chopped strand mat, or may be dispersed in the form of monofilaments, but it is preferred that reinforcing fibers are dispersed substantially in the form of monofilaments for enhancing the isotropy of the molded article.

Figure 12:
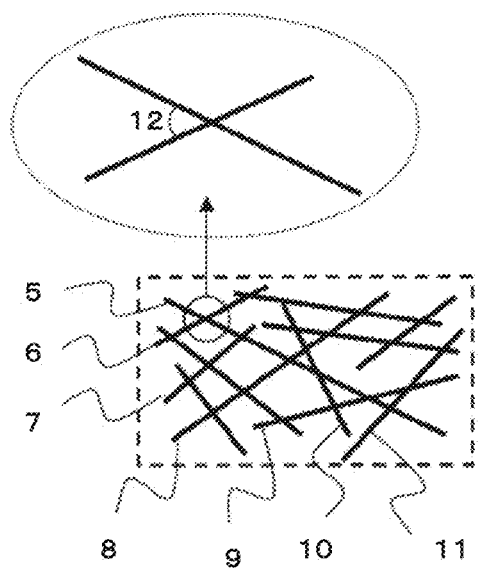
FIG. 12 is a schematic view showing one example of a dispersion state of reinforcing fibers in a discontinuous fiber prepreg.

Here, for the state in which monofilaments are randomly dispersed, the orientation of fibers can be organized with a two-dimensional orientation angle. For the two-dimensional orientation angle, a two-dimensional orientation angle formed by a reinforcing fiber monofilament (i) and a reinforcing fiber monofilament (j) crossing the reinforcing fiber monofilament (i) in the present invention will be described with reference to the drawings. FIG. 12 is a schematic view showing a dispersion state of reinforcing fibers when only reinforcing fibers of one example of the prepreg of the present invention are observed from the plane direction. When attention is given to a reinforcing fiber monofilament 5, the reinforcing fiber monofilament 5 crosses reinforcing fiber monofilaments 6 to 11. Here, the "crossing" means a state in which the reinforcing fiber monofilament (i) given attention in the observed two-dimensional plane is observed to cross the other reinforcing fiber monofilament (j). Here, it is not necessarily required that the reinforcing fiber 5 be in contact with reinforcing fibers 6 to 11 in an actual prepreg. The two-dimensional orientation angle is defined as an angle 12, which is not less than 0 degree and not more than 90 degrees, of two angles formed by two reinforcing fiber monofilaments crossing each other.

The method for specifically measuring an average value of two-dimensional orientation angles from a prepreg is not particularly limited, and examples thereof may include a method in which the orientation of reinforcing fibers is observed from the surface of a prepreg. In this case, it is preferred that the surface of the prepreg is polished to expose fibers because reinforcing fibers are more easily observed. A method may also be shown as an example in which the orientation of reinforcing fibers is observed using light passing through a prepreg. In this case, it is preferred that the prepreg is thinly sliced because reinforcing fibers are more easily observed. Further, a method may be shown as an example in which a prepreg is observed with X-ray CT transmission and an image of the orientation of reinforcing fibers is photographed. In the case of reinforcing fibers having high X-ray permeability, it is preferred that a tracer fiber is mixed in reinforcing fibers or a tracer agent is applied to reinforcing fibers because reinforcing fibers are more easily observed.

When it is difficult to perform measurement with the above-mentioned methods, a method may be shown as an example in which a resin is removed while the structure of reinforcing fibers is not collapsed, and the orientation of reinforcing fibers is then observed. Measurement can be performed by sandwiching a prepreg between two stainless steel meshes as shown in, for example, FIG. 13(*a*), providing fixation by a screw etc. to prevent movement of the prepreg, then burning out a resin component, and observing the reinforcing fiber base obtained (FIG. 13(*b*)) with an optical microscope or an electronic microscope.

An average value of two-dimensional orientation angles is measured in accordance with the following procedures I and II.

I. Two-dimensional orientation angles between the randomly selected reinforcing fiber monofilament (i) (reinforcing fiber monofilament 5 in FIG. 12) and all the reinforcing fiber monofilaments (j) (reinforcing fiber monofilaments 6 to 11 in FIG. 1) crossing the reinforcing fiber monofilament (i) are measured, and an average value thereof is determined. When there are a large number of reinforcing fiber monofilaments (j) crossing the reinforcing fiber monofilament (i), 20 reinforcing fiber monofilaments (j) may be randomly selected to perform measurement.

II. The measurement in the procedure I is repeated total five times with attention given to another reinforcing fiber monofilament, and the average value thereof is defined as an average value of two-dimensional orientation angles.

The average value of two-dimensional orientation angles of reinforcing fibers is preferably 10 to 80 degrees, more preferably 20 to 70 degrees, further preferably 30 to 60 degrees, and an angle closer to 45 degrees, an ideal angle, is more preferred. When the average value of two-dimensional orientation angles is less than 10 degrees or more than 80 degrees, two-dimensional isotropy may be degraded as compared to a prepreg with reinforcing fibers dispersed in the form of monofilaments because a large number of reinforcing fibers exist in the form of bundles.

The two-dimensional orientation angle can be made closer to an ideal angle by dispersing and two-dimensionally arranging reinforcing fibers when a reinforcing fiber base is produced. For enhancing the dispersibility of reinforcing fibers, a method comprising providing a fiber opening bar, a method comprising vibrating the fiber opening, a method comprising finning the aperture of a card, and a method comprising adjusting the rotation speed of the card, etc. may be shown as an example in the case of the dry method. In the case of the wet method, a method comprising adjusting stirring conditions at the time of dispersing reinforcing fibers, a method comprising reducing the concentration, a method comprising adjusting the solution viscosity and a method comprising suppressing a vortex flow at the time of transferring a dispersion liquid, etc. may be shown as an example.

For two-dimensionally arranging reinforcing fibers, a method comprising using static electricity at the time of integrating reinforcing fibers, a method comprising using rectified air, and a method comprising adjusting the take-over speed of a conveyor, etc. may be shown as an example in the case of the dry method. In the case of the wet method, a method comprising preventing reaggregation of dispersed reinforcing fibers by ultrasonic waves or the like, a method comprising adjusting a filtration rate, a method comprising adjusting the mesh diameter of a conveyor, and a method comprising adjusting the take-over speed of a conveyor, etc. may be shown as an example.

Figure 14:
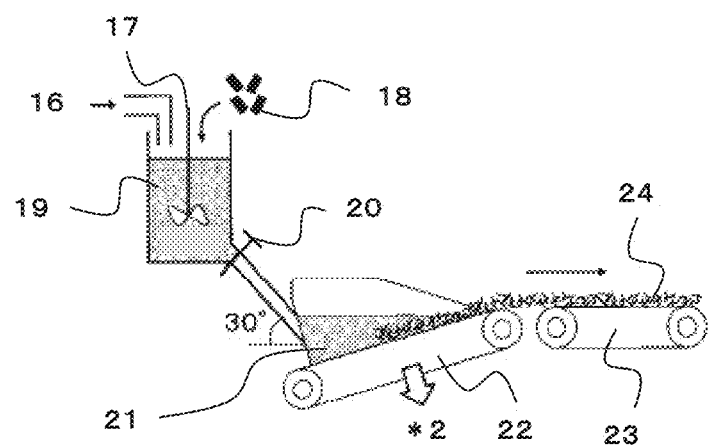
FIG. 14 is a schematic view showing one example of an apparatus for producing a sheet making base.

These methods are not particularly limited, and the above-mentioned purposes can also be achieved by controlling other production conditions while checking the state of the reinforcing fiber base. Particularly when a reinforcing fiber base is produced by the wet method, an apparatus for producing a sheet-making base illustrated in, for example, FIG. 14 may be shown as an example. By increasing the concentration of fibers to be added, the basis weight of the reinforcing fiber base obtained can be increased. Further, the basis weight can also be adjusted by adjusting the flow rate (flow) of a dispersion liquid and the speed of a mesh conveyor. For example, by increasing the flow rate of the dispersion liquid with the speed of the mesh conveyor kept constant, the basis weight of the reinforcing fiber base obtained can be increased. Conversely, by decreasing the flow rate of the dispersion liquid with the speed of the mesh conveyor kept constant, the basis weight of the reinforcing fiber base obtained can be decreased. Further, by adjusting the speed of the mesh conveyor with respect to the flow rate of the dispersion liquid, the orientation of fibers can be controlled. For example, by increasing the speed of the mesh conveyor with respect to the flow rate of the dispersion liquid, fibers in the reinforcing fiber base obtained are easily oriented in the take-over direction of the mesh conveyor. A reinforcing fiber base can be produced while various kinds of parameters are adjusted as described above.

The method for producing a prepreg by impregnating a reinforcing fiber base with a matrix is not particularly limited, and a known method may be used. Impregnation can be performed preferably by pressurization and/or heating, and more preferably by both pressurization and heating in parallel. Pressurization and/or heating can be performed while the matrix resin is kept in contact with the reinforcing fiber base. For example, two sheets of cloth, nonwoven fabric or film of the thermoplastic resin are provided, arranged, respectively, on upper and lower surfaces of the reinforcing fiber base, and pressurized and/or heated from both the surfaces by a pressing device.

The thickness h0 of the prepreg at a temperature of 23° C. is preferably 0.03 to 1 mm, more preferably 0.05 to 0.8 mm, further preferably 0.1 to 0.6 mm from the viewpoint of handling characteristics in a step of laminating prepregs into a preform. When the thickness h0 is less than 0.03 mm, the prepreg may be broken, and when the thickness h0 is more than 1 mm, formativeness may be deteriorated.

For the thickness measurement part, two points X and Y in the prepreg are determined so that the straight line distance XY is the longest in the plane of the prepreg. Next, each division point other than both ends XY when the straight line XY is equally divided into 10 or more lengths is defined as a thickness measurement point. An average value of thicknesses at the measurement points is defined as a thickness of the prepreg.

A prepreg having a high tensile strength σ can be subjected to a high-speed and economically efficient lamination step and molding step. The tensile strength σ of the prepreg is preferably 50 MPa or more for securing handling characteristics in the lamination step. When the tensile strength σ is less than 50 MPa, there may be the problem that the prepreg is broken in operations during lamination or molding. The upper limit of the tensile strength σ is not particularly limited, but generally a tensile strength σ of 1000 MPa or less may be shown as an example.

As an index of the isotropy of the prepreg, the tensile strength σ preferably satisfies σMax≤σMin×2, more preferably σMax≤σMin×1.8, further preferably σMax≤σMin×1.5 in the relationship between the maximum tensile strength σMax and the minimum tensile strength σMin in a measurement direction. It is preferred that a difference between σMax and σMin, i.e. the isotropy of the tensile strength σ is high, because the economic load in the lamination step can be reduced.

The tensile strength of the prepreg is determined by cutting out a test piece from the prepreg, and measuring tensile characteristics in accordance with the ISO 527-3 method (1995). The test piece is measured in four directions: 0-, +45-, −45- and 90-degree directions with a certain direction of the prepreg set to a 0-degree direction. For each direction, the number of measurements is n=5 or more, and for each direction, an average value of the measurement results is defined as a tensile strength in the direction. Of tensile strengths in each measurement direction, the largest value is defined as σMax and the smallest value is defined as σMin.

<Continuous Fiber Prepreg of Third Preferred Aspect>

As one preferred aspect of the fiber-reinforced polypropylene resin composition of the present invention, the following prepreg is shown as an example. That is, the third preferred aspect is a prepreg including the above-mentioned fiber-reinforced polypropylene resin composition, wherein reinforcing fibers (c) are present as a reinforcing fiber base, and the reinforcing fibers forming the reinforcing fiber base are substantially continuous fibers. The continuous fiber mentioned here refers to a reinforcing fiber having a fiber length of 100 mm or more. The "substantially continuous fiber" means that in the reinforcing fiber base, the content of continuous fibers is 90% by mass or more in reinforcing fibers.

In this aspect, it is important that reinforcing fibers are substantially continuous fibers for exhibiting extremely excellent dynamic characteristics. The reinforcing fiber base that forms a prepreg is not particularly limited for its form and shape as long as reinforcing fibers are substantially continuous fibers, and for example, the reinforcing fiber base may be one with continuous fiber bundles aligned in one direction, or may be a woven cloth composed of continuous fibers, namely a reinforcing fiber cloth. One with continuous fiber bundles aligned in one direction may be shown as a preferred shape because it is relatively easily impregnated with a resin and can be continuously produced.

In the prepreg using continuous fibers according to the present invention, it is preferred that reinforcing fibers are impregnated with a polypropylene resin from the viewpoint of the handling characteristics of the prepreg. The impregnation rate is preferably 30 to 100%, more preferably 40 to 100%, further preferably 50 to 100%. When the impregnation rate is in a preferred range, a prepreg excellent in handling characteristics and moldability is obtained.

Such a continuous fiber prepreg is particularly suitably used in fields where lightness, high strength, elastic modulus and impact resistance are required, for examples the field of automotive members.

The fiber-reinforced polypropylene resin composition, the molding material and the prepreg of the present invention can be processed into a product of final shape using various kinds of known molding methods.

Examples of the application of molded articles obtained using the fiber-reinforced polypropylene resin composition, the molding material and the prepreg of the present invention include electric/electronic device components such as "housings, trays, chassis, interior members and cases thereof for personal computers, displays, OA devices, mobile phones, personal digital assistants, facsimile machines, compact discs, portable MDs, portable radio cassettes, PDAs (personal digital assistants such as electronic notebooks), video cameras, digital video cameras, optical devices, audios, air conditioners, lighting devices, entertainment articles, toy articles and other home electric appliances", civil engineering/building material components such as "posts, panels and reinforcement materials", "suspension, accelerator and steering components such as various kinds of members, various kinds of frames, various kinds of hinges, various kinds of arms, various kinds of axles, various kinds of bearings for axles, various kinds of beams, propeller shafts, wheels and gear boxes", "outside plate and body components such as hoods, roofs, doors, fenders, trunk lids, side panels, rear end panels, upper back panels, front bodies, under bodies, various kinds of pillars, various kinds of members, various kinds of frames, various kinds of beams, various kinds of supports, various kinds of rails and various kinds of hinges", "exterior components such as bumpers, bumper beams, malls, under covers, engine covers, straightening vanes, spoilers, cowl louvers and aero parts", "interior components such as instrument panels, seat frames, door trims, pillar trims, handles and various kinds of modules", structural components for automobiles and two-wheeled vehicles such as "fuel system, exhaust system and intake system components such as motor components, CNG tanks, gasoline tanks, fuel pumps, air intakes, intake manifolds, carburetor main bodies, carburetor spacers, various kinds of pipes and various kinds of valves", components for automobiles and two-wheeled vehicles such as "others, alternator terminals, alternator connectors, IC regulators, potentiometer bases for light dyers, engine cooling water joints, thermostat bases for air conditioners, warm air flow control valves, brush holders for radiator motors, turbine vanes, wiper motor related components, distributors, starter switches, starter relays, window washer nozzles, air conditioner panel switch boards, coils for fuel related electromagnetic valves, battery trays, AT brackets, headlamp supports, pedal housings, protectors, horn terminals, step motor rotors, lamp sockets, lamp reflectors, lamp housings, brake pistons, noise shields, spare tire covers, solenoid bobbins, engine oil filters, ignition system cases, scuff plates, fascias", and aircraft components such as "landing gear pods, winglets, spoilers, edges, ladders, elevators, failings and ribs". In view of dynamic characteristics, the molded article is suitably used for housings for electric/electronic devices, panels for civil engineering/building materials, structural components for automobiles and components for aircrafts. In the case of electric/electronic devices, it is more preferred that carbon fibers having conductivity are used for reinforcing fibers because an electromagnetic wave shielding property is imparted.

EXAMPLES

The present invention will be described further in detail below by way of Examples.
(Methods for Measurement of Various Kinds of Characteristics)
First, methods for measurement of various kinds of characteristics, which are used in Reference Examples, Examples and Comparative Examples, will be described.
(1) Measurement of Properties of Modified-Polypropylene
<Melt Flow Rate (MFR)>
Measurement was performed at 230° C. under a load of 2.16 kg according to ASTM D1238.
<Number Average Molecular Weight (Mn)>
The number average molecular weight (Mn) was measured by gel permeation chromatography (GPC). Measurement was performed as described below using as a measurement apparatus a gel permeation chromatograph Model: Alliance GPC-2000 manufactured by WATERS. As separation columns, two columns of TSKgel GMH6-HT and two columns of TSKgel GMH6-HTL were used. In each of these columns, the column size was 7.5 mm (diameter)×300 mm (length), and the column temperature was 140° C. As a mobile phase, o-dichlorobenzene (manufactured by Wako Pure Chemical Industries, Ltd.) with 0.025% by mass of BHT (manufactured by Takeda Pharmaceutical Company Limited.) added thereto as an antioxidant was used to cause movement at 1.0 ml/minute. The sample concentration was 15 mg/10 mL, the sample injection amount was 500 microliters, and a differential refractometer was used as a detector. The molecular weight was calculated in terms of standard polystyrene. For the standard polystyrene, one manufactured by TOSOH CORPORATION was used for a molecular weight of $Mw<1000$ and $Mw>4\times10^6$, and one manufactured by Pressure Chemical Company was used for a molecular weight of $1000 \leq Mw \leq 4\times10^6$.

In measurement of the molecular weight of maleic anhydride-modified polypropylene, a molecular weight determined with standard polystyrene as described above was converted into that of PP using a general calibration method. For the Mark-Houwink coefficients of PS and PP used for conversion, values described in the document (J. Polym. Sci., Part A-2, 8, 1803 (1970), Makromol. Chem., 177, 213 (1976)) were used.
<Carbodiimide Group Content>
The carbodiimide group content of carbodiimide-modified polypropylene (a) was determined in the following manner: a sample was heat-pressed at 250° C. for 3 minutes to prepare a sheet, and the infrared absorption spectrum of the sheet was then measured by a transmission method using an infrared spectrophotometer (manufactured by JASCO Corporation, FT-IR 410 Model), and substituted in the calibration curve described below. For measurement conditions, the resolution was 2 $cm^{-1}$ and the number of times of integration was 32.

CARBODILITE (registered trademark) HMV-8CA was melted and mixed in a predetermined concentration with later-described PP1 (polypropylene) beforehand, and a sample for IR measurement was prepared in the same manner as described above, and used for preparation of a calibration curve. Infrared absorption spectra of samples having different concentrations were measured, an absorbance at 2120 $cm^{-1}$ originating from the carbodiimide group was normalized by dividing the absorbance by an absorbance at 1357 $cm^{-1}$ (C—H deformation vibration) originating from the polypropylene backbone as an internal standard, so that a calibration curve was prepared.

(2) Measurement of Properties of Carbon Fibers
<Measurement of Strand Tensile Strength and Tensile Elastic Modulus of Carbon Fibers>
A carbon fiber bundle was impregnated with a resin of the following composition, and the resin was cured at a temperature of 130° C. for 35 minutes, followed by conducting a tensile test according to JIS R7601 (1986). Six strands were measured, and an average value thereof was determined for each of the strand tensile strength and the strand elastic modulus.

[Resin Composition] (manufacturer etc. shown in the parenthesis)

| | |
|---|---|
| 3,4-epoxycyclohexylmethyl-3,4-epoxycyclohexyl carboxylate (ERL-4221, manufactured by Union Carbide Corporation) | 100 parts by mass |
| Boron trifluoride monoethylamine (manufactured by Stella Chemifa Corporation) | 3 parts by mass |

| Acetone (manufactured by Wako Pure Chemical Industries, Ltd.) | 4 parts by mass |

<Measurement of O/C>

The surface oxygen concentration ratio of the carbon fiber was determined in accordance with the following process by X-ray photoelectron spectroscopy. First, a carbon fiber bundle was cut into 20 mm, and the carbon fiber was spread and arranged on a copper sample support, and the inside of a sample chamber was then held at $1\times10^8$ Torr. Measurement was performed using AlKa 1, 2 as an X ray source. The kinetic energy value (K.E.) of the primary peak of C1s was adjusted to 1202 eV as a correction value of a peak associated with charge during measurement. A C1s peak area was determined by drawing linear baseline in a range of 1191 to 1205 eV as K.E. A O1s peak area was determined by drawing linear baseline in a range of 947 to 959 eV as K.E. O/C was calculated as a ratio of the number of atoms from a ratio of the O1s peak area to the C1s peak area using a sensitivity correction value specific to an apparatus. Model ES-200 manufactured by Kokusai Electric Inc. was used as an X-ray photoelectron spectroscopy apparatus, and the sensitivity correction value is set to 1.74.

(3) Measurement of Properties of Terpene Resin

<Measurement of Number Average Molecular Weight of Terpene Resin>

The number average molecular weight (Mn) of the terpene resin was measured by gel permeation chromatography (GPC). For the GPC column, one filled with a polystyrene-crosslinked gel was used. Measurement was performed at 150° C. using chloroform as a solvent. The molecular weight was calculated in terms of standard polystyrene.

<Measurement of Melt Viscosity of Terpene Resin>

The melt viscosity of the terpene resin was measured using a viscoelasticity measurement device. Measurement was performed at 190° C. at 0.5 Hz using a 40 mm parallel plate.

<Measurement of Glass Transition Temperature of Terpene Resin>

The glass transition temperature of the terpene resin was measured by differential scanning calorimetry (DSC). Measurement was performed at a temperature elevation rate of 40° C./min using an aluminum sample pan.

(4) Measurement of Properties of Composite of Reinforcing Fiber Bundle and Terpene Resin <Void Content of Composite>

The void content (%) of the composite was calculated in accordance with the test method in ASTM D2734 (1997). Assessment on the void content of the composite was performed based on the following criteria, and samples rated A to C were considered acceptable.

A: 0 to less than 5%
B: not less than 5% and less than 20%
C: not less than 20% and less than 40%
D: not less than 40%

(5) Measurement of Properties of Molded Article Obtained Using Fiber-reinforced Propylene Resin Composition and Molding Material <Evaluation of Fiber Dispersibility of Molded Article>

A molded article of 100 mm×100 mm×2 mm was molded, and the number of undispersed reinforcing fiber bundles existing on each of front and back surfaces was visually counted. Evaluation was performed for 50 molded articles, and in view of the total number of the undispersed reinforcing fiber bundles, assessment on fiber dispersibility was performed based on the following criteria, and samples rated A to C were considered acceptable.

A: the number of undispersed reinforcing fiber bundles is not more than 1.
B: the number of undispersed reinforcing fiber bundles is not less than 1 and less than 5.
C: the number of undispersed reinforcing fiber bundles is not less than 5 and less than 10.
D: the number of undispersed reinforcing fiber bundles is not less than 10.

<Flexural Test of Molded Article>

In accordance with ASTM D-790 (1997), a supports span was set at 100 mm using a three-point flexural test tool (indenter: 10 mm and supporting point: 10 mm), and a flexural strength and a flexural elastic modulus were measured at a cross head speed of 5.3 mm/minute. "Instron (registered trademark)" Universal Tester Model 4201 (manufactured by Instron Ltd.) was used as a tester. The test piece was left standing for 24 hours in a constant-temperature and constant-humidity chamber adjusted to 50% RH at a temperature of 23° C., and then subjected to a characteristic evaluation test. Six molded articles were measured, and an average value thereof was determined as a flexural strength. Assessment on the flexural strength was performed based on the following criteria, and samples rated A to C were considered acceptable.

A: not less than 150 MPa
B: not less than 130 MPa and less than 150 MPa
C: not less than 100 MPa and less than 130 MPa
D: less than 100 MPa <Immersion of Molded Article in Hot Water and Measurement of Water Absorption Rate>

A test piece (thickness: 3.2 mm) for mold-notched Izod impact test was provided, and dried in a vacuum dryer, and a dry mass W1 (g) was measured. A constant-temperature water bath filled with purified water was adjusted to 85° C., the dried test piece was immersed therein for 1 week, and a water-absorbing mass W2 (g) was measured. A water absorption rate (%) was calculated in accordance with the following equation using the obtained masses W1 and W2.

$$\text{(water absorption rate)} = (W2-W1)/W1 \times 100$$

For the water absorption rate, 10 molded test pieces were measured, and an average value thereof was determined.

<Izod Impact Test of Molded Article>

The mold-notched Izod impact test was conducted in accordance with ASTM D256 (1993). The Izod impact strength (J/m) was conducted using apiece having a thickness of 3.2 mm. As the test piece, a dry sample and a water-absorbing sample prepared in accordance with the method described in <Immersion of Molded Article in Hot Water and Measurement of Water Absorption Rate> were used, 10 test pieces were measured for each sample, and an average value thereof was calculated. Assessment for the Izod impact test was performed based on the following criteria, and samples rated A to C were considered acceptable.

A: not less than 250 J/m
B: not less than 200 J/m and less than 250 J/m
C: not less than 150 J/m and less than 200 J/m
D: less than 150 J/m The strength retention rate (%) during water absorption was calculated from a ratio of the impact strength of a water-absorbing sample and the impact strength of a dry sample.

(strength retention rate)=(impact strength of water-absorbing sample)/(impact strength of dry sample)×100

Assessment on the strength retention rate was performed based on the following criteria, and samples rated A and B were considered acceptable.
A: not less than 90%
B: not less than 70% and less than 90%
C: not less than 50% and less than 70%
D: less than 50%

<Evaluation of Interfacial Adhesion of Molded Article>

For the water-absorbing sample, the breakage surface of a broken sample after the Izod impact test was observed with a SEM (scanning electron microscope), random five reinforcing fibers were selected, and whether or not a resin component was deposited on the surface of the reinforcing fiber was determined by visual inspection. Assessment was performed based on the following criteria.
A: the resin is deposited on almost the whole (90% or more) of the surface of the reinforcing fiber.
B: the resin is deposited on not less than 50% and less than 90% of the surface of the reinforcing fiber.
C: the resin is deposited on less than 50% of the surface of the reinforcing fiber.

(6) Method for Calculation of Sp Value of Compound

The SP value of each compound was calculated from the molecular formula using the equation shown below.

$$\sigma(\text{SP value}) = (\Sigma E\text{coh}/\Sigma V)^{1/2}$$

Here, Ecoh is a cohesive energy, and V is a molar volume. Each of these values had been proposed by Fedors as a constant dependent on a functional group, and was employed as such.

(7) Measurement of Properties of Prepreg

<Fiber Mass Content (Wf) of Reinforcing Fiber in Prepreg>

A mass W1 of a prepreg was measured, the prepreg was then heated in the air at 500° C. for 1 hour to burn out a resin component, a mass W2 of remaining reinforcing fibers was measured, and Wf was calculated in accordance with the following equation.

$$Wf(\%) = 100 \times W2/W1$$

<Evaluation of Length of Reinforcing Fibers Contained in Prepreg>

A prepreg was heated in the air at 500° C. for 1 hour to burn out a matrix resin component. Four hundred remaining reinforcing fibers were randomly selected, and the lengths thereof were measured to the order of 1 μm with an optical microscope to measure the fiber length. Further, the frequency of reinforcing fibers was counted at the interval of 0.25 mm with the length divided into ranges of less than 0.25 mm, not less than 0.25 mm and less than 0.5 mm, not less than 0.5 mm and less than 0.75 mm, and so on.

<Measurement of Two-Dimensional Orientation Angle of Reinforcing Fibers in Prepreg>

Figure 13:
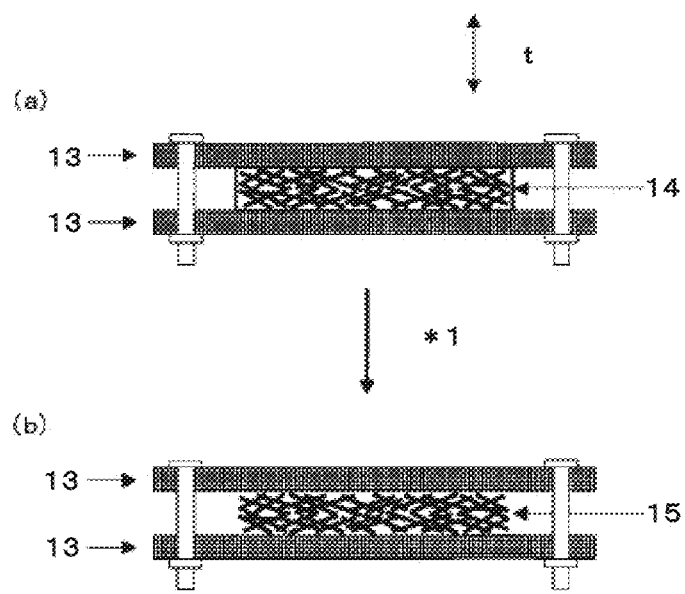
FIG. 13 is a schematic view showing one example of a burnout tool for measurement of a two-dimensional orientation angle of the discontinuous fiber prepreg.

As shown in FIG. 13, a prepreg was sandwiched between two stainless steel meshes (plane weave shape having 50 meshes per 2.5 cm), and a screw was adjusted to provide fixation to prevent movement of the prepreg. This was heated in the air at 500° C. for 1 hour to burn out a resin component. The stainless steel mesh was removed, the obtained reinforcing fiber base was observed with a microscope, one reinforcing fiber monofilament (i) was randomly selected, and a dimensional orientation angle between the reinforcing fiber monofilament (i) and another reinforcing fiber monofilament crossing the reinforcing fiber monofilament (i) was measured by image observation. For the orientation angle, an angle, which was not less than 0° and not more than 90° (acute angle side), of two angles formed by two reinforcing fiber monofilaments crossing each other was employed. Per reinforcing fiber monofilament (i) selected, 20 two-dimensional orientation angles were measured. Total five reinforcing fiber monofilaments were selected, similar measurement was performed, and an average value thereof was defined as a two-dimensional orientation angle.

<Thickness of Prepreg>

Under the measurement condition of 23° C., two points X and Y were determined so that the straight line distance XY was the longest in a prepreg, a thickness was measured at each division point other than both ends XY when the straight line XY was equally divided into 10 lengths, and an average value thereof was defined as a thickness of the prepreg.

<Resin Impregnation Rate of Prepreg>

The cross section in the thickness direction of a prepreg was observed and measured in the following manner. The prepreg was embedded in an epoxy resin, a surface corresponding to the end of the cross section of the prepreg was polished, an area of the prepreg having a thickness×width of 500 μm was photographed at a magnification of 400 using a super-depth color 3D shape measurement microscope VK-9500 (controller unit)/VK-9510 (measurement unit) (manufactured by KEYENCE CORPORATION). In the photographed image, an area of regions impregnated with a resin and an area of regions unimpregnated with a resin were determined, and a resin impregnation rate was calculated from the following equation:

resin impregnation rate (%)=100×(total area of regions impregnated with resin)/(area at thickness×width of 500 μm in prepreg).

<Measurement of Tensile Strength σ, σMax and σMin of Prepreg>

Test pieces were cut out from a prepreg, and tensile characteristics were measured in accordance with the ISO 527-3 method (1995). The test pieces were prepared such that test pieces were cut out, respectively, in four directions: 0°, +45°, −45° and 90° directions with a certain direction of the prepreg set to a 0° direction. Five test pieces were measured for each of the directions, and an average value thereof was defined as a tensile strength in the direction. As a measurement apparatus, "Instron (registered trademark)" Universal Tester Model 5565 (manufactured by Instron Japan Company Ltd.) was used. Of tensile strengths σ in each measurement direction which were measured as described above, the largest value was defined as σMax and the smallest value was defined as σMin.

(8) Measurement of Properties of Molded Article Obtained Using Discontinuous Fiber Prepreg <Method for Molding of Molded Article Used in Flexural Test>

A discontinuous prepreg was cut out to a size of 200 mm×200 mm, and dried at 120° C. for 1 hour. Eight sheets of the prepreg were laminated, press-molded at a temperature of 200° C. and a pressure of 30 MPa for 5 minutes, and cooled to 50° C. while the pressure was maintained, thereby obtaining a flat plate-shaped molded article having a thickness of 1.1 mm.

<Preparation of Dry Sample and Water-Absorbing Sample>

A flexural strength test piece having a length of 50±1 mm and width of 25±0.2 mm was cut out from a molded article obtained by molding a discontinuous fiber prepreg. The flexural test piece was dried in a vacuum dryer to obtain a dry sample. A constant-temperature water bath filled with purified water was adjusted to 85° C., and the dried test piece was immersed therein for 1 week to obtain a water-absorbing sample.

<Flexural Test of Molded Article>

The flexural strength was measured using a three-point flexural test tool in accordance with ASTM D790 (1997). "Instron (registered trademark)" Universal Tester Model 4201 (manufactured by Instron Ltd.) was used as a tester. As test pieces, a dry sample and a water-absorbing sample prepared in accordance with the method described in <Preparation of Dry Sample and Water-Absorbing Sample> were used, and 10 test pieces were tested for each sample, and an average value thereof was calculated. Assessment on the flexural strength was performed based on the following criteria, and samples rated A to C were considered acceptable.

A: not less than 300 MPa
B: not less than 270 MPa and less than 300 MPa
C: not less than 240 MPa and less than 270 MPa
D: less than 240 MPa The strength retention rate (%) during water absorption was calculated from a ratio of the flexural strength of a water-absorbing sample and the flexural strength of a dry sample.

(strength retention rate)=(flexural strength of water-absorbing sample)/(flexural strength of dry sample)×100

Assessment on the strength retention rate was performed based on the following criteria, and samples rated A and B were considered acceptable.

A: not less than 95%
B: not less than 90% and less than 95%
C: not less than 80% and less than 90%
D: less than 80%

(9) Measurement of Properties of Molded Article Obtained Using Continuous Fiber Prepreg <Method for Molding Molded Article Used in 0° Flexural Test and Cutting of Sample>

A continuous fiber prepreg was dried at 120° C. for 1 hour. The prepreg was laid in a 30 cm×30 cm mold while being aligned such that reinforcing fibers are arranged in one direction, and the prepreg is press-molded at a temperature of 200° C. and a pressure of 30 MPa for 5 minutes, and cooled to 50° C. while the pressure was maintained, thereby obtaining a flat plate-shaped molded article having a thickness of 3 mm. A 0° flexural strength test piece having a length of 130±1 mm and width of 25±0.2 mm was cut out from the obtained unidirectional article in a direction parallel to a direction of carbon fiber.

<Preparation of Dry Sample and Water-Absorbing Sample>

A test piece for flexural test was cut out from the molded article using the method described above, and dried in a vacuum dryer to obtain a dry sample. A constant-temperature water bath filled with purified water was adjusted to 85° C., and the dried test piece was immersed therein for 1 week to obtain a water-absorbing sample.

<0° Flexural Test of Molded Product>

In accordance with ASTM D-790 (1997), a supports span was set at 100 mm using a three-point flexural test tool (indenter: 10 mm and supporting point: 10 mm), and a flexural strength was measured at a cross head speed of 5.3 mm/minute. "Instron (registered trademark)" Universal Tester Model 4201 (manufactured by Instron Ltd.) was used as a tester. As test pieces, a dry sample and a water-absorbing sample prepared in accordance with the method described in <Preparation of Dry Sample and Water-Absorbing Sample> were used, and 10 test pieces were tested for each sample, and an average value thereof was calculated. Assessment on the flexural strength was performed based on the following criteria, and samples rated A to C were considered acceptable.

A: not less than 1250 MPa
B: not less than 1150 MPa and less than 1250 MPa
C: not less than 1000 MPa and less than 1150 MPa
D: less than 1000 MPa The strength retention rate (%) during water absorption was calculated from a ratio of the flexural strength of a water-absorbing sample and the flexural strength of a dry sample.

(strength retention rate)=(flexural strength of water-absorbing sample)/(flexural strength of dry sample)×100

Assessment on the strength retention rate was performed based on the following criteria, and samples rated A and B were considered acceptable.

A: not less than 95%
B: not less than 90% and less than 95%
C: not less than 80% and less than 90%
D: less than 80%

(Raw Material and Preparation Thereof)

Raw materials used in Reference Examples, Examples and Comparative Examples are shown below. For all the raw materials, commercially available products were used unless otherwise specified.

<Polyolefin>

PP1: Polypropylene (random PP)
(trade name: F327, manufactured by Prime Polymer Co., Ltd., MFR (230° C.): 7 g/10 minutes)
PP2: Polypropylene (block PP)
(trade name: J707G, manufactured by Prime Polymer Co., Ltd., MFR (230° C.): 30 g/10 minutes)
PP3: Polypropylene (homo PP)
(trade name: J106G, manufactured by Prime Polymer Co., Ltd., MFR (230° C.): 15 g/10 minutes)

<Sizing Agent>

(s)-1: Glycerol triglycidyl ether (functional group: epoxy group, number of functional groups: 3)
(s)-2: Bisphenol A-type epoxy resin (epoxy group, number of functional groups: 2)
(jER 828 manufactured by Japan Epoxy Resins Co., Ltd.)
(s)-3: Acid-modified polypropylene (carboxyl group, number of functional groups: 5)
(acid-modified polypropylene emulsion manufactured by Maruyoshi Chemical Co., Ltd.)
(s)-4: Polyglycerol polyglycidyl ether (epoxy group, number of functional groups: 5)
("DENACOL (registered trademark)" EX-521 manufactured by Nagase ChemteX Corporation).
(s)-5: Aminoethylated acryl polymer (amino group, number of functional groups: 75)
("POLYMENT" SK-1000 (registered trademark) manufactured by Nippon Shokubai Co., Ltd.)
(s)-6: Polyvinyl alcohol (hydroxyl group, number of functional groups: 500)
(polyvinyl alcohol manufactured by Wako Pure Chemical Industries, Ltd., Mw: 22,000)
(s)-7: Polyethylene imine (amino group, number of functional groups: 28)

(polyethylene imine manufactured by Sigma-Aldrich Co. Ltd., Mn: 1,200)

(s)'-1: Polybutene (no functional group, number of functional groups: 0) ("EMUWET" (registered trademark) 200E manufactured by NOF CORPORATION)

<Reinforcing Fiber>

Carbon fibers used were prepared in accordance with Reference Examples 7 to 9 shown later. For the glass fiber, GF-1: glass fiber (240 TEX manufactured by Nitto Boseki Co., Ltd., total number of monofilaments: 1600) was used.

<Terpene Resin>

(d)-1: Terpene resin ("YS Resin" (registered trademark) PX1250 resin manufactured by Yasuhara Chemical Co., LTD: resin formed of a polymer polymerized using α-pinene and β-pinene as principal components)

(d)-2: Hydrogenated terpene resin ("Clearon" (registered trademark) P-105 resin manufactured by Yasuhara Chemical Co., LTD: resin formed of a polymer obtained by hydrogenation reaction of a polymer polymerized using d-limonene as a principal component)

<Elastomer>

(e)-1: Ethylene-α-olefin copolymer (CX 5505 manufactured by Sumitomo Chemical Company, Limited)

(e)-2: Styrene-ethylene-butadiene-styrene copolymer ("Tuftec" (registered trademark) H1052 manufactured by Asahi Kasei Corporation)

<Production of Polyolefin Resin Having Group Reactive with Carbodiimide Group>

Reference Example 1

One part by mass of maleic anhydride (manufactured by Wako Pure Chemical Industries, Ltd., hereinafter abbreviated as MAH) and 0.25 parts by mass of 2,5-dimethyl-2,5-bis (tert-butylperoxy)hexine-3 (manufactured by NOF CORPORATION, trade name: PERHEXINE (registered trademark) 25B) were mixed with 100 parts by mass of PP1 (F327 manufactured by Prime Polymer Co., Ltd.), and the mixture was extruded at a cylinder temperature of 220° C., a screw rotation number of 200 rpm and a discharge rate of 80 g/minute using a twin screw kneader (TEX-30 manufactured by The Japan Steel Works, Ltd., L/D=40, using a vacuum vent) to obtain maleic acid-modified polypropylene (hereinafter, abbreviated as MAH-PP1). The obtained MAH-PP1 was dissolved in xylene, and the obtained xylene solution was pored into acetone to reprecipitate and refine MAH-PP1. The grafted amount of maleic anhydride was 0.7% by mass when measured by IR. The number average molecular weight (Mn) was Mn: 28,000 when measured by GPC. For MAH-PP1, the value of Mn/{(100–M)×f/M} is 2.0.

In the formula,
  f: molecular weight of maleic anhydride (98 g/mol);
  M: content of maleic anhydride (0.7 wt %); and
  Mn: number average molecular weight of MAH-PP1 (28,000).

Reference Example 2

Maleic anhydride-modified polypropylene (hereinafter, abbreviated as MAH-PP2) was obtained in the same manner as in Reference Example 1 except that the amount of MAH was changed to 0.05 parts by mass, the amount of PERHEXINE 25B was changed to 0.02 parts by mass and the cylinder temperature of the twin screw kneader was changed to 260° C. in production of the maleic acid-modified polypropylene in Reference Example 1. The grafted amount of maleic anhydride in the obtained MAH-PP2 was 0.03% by mass when measured by IR. The number average molecular weight (Mn) was Mn: 29,000 when measured by GPC. For MAH-PP2, the value of Mn/{(100–M)×f/M} is 0.09.

In the formula,
  f: molecular weight of maleic anhydride (98 g/mol);
  M: content of maleic anhydride (0.03 wt %);
  Mn: number average molecular weight of MAH-PP2 (29,000).

Reference Example 3

Hundred parts by mass of PP3 (J106G manufactured by Prime Polymer Co., Ltd.), 30 parts by mass of MAH and 5 parts by mass of dicumyl peroxide (manufactured by NOF CORPORATION, trade name: PERCUMYL (registered trademark) D) were mixed, and the mixture was reacted in a toluene solution for 5 hours to obtain maleic acid-modified polypropylene (hereinafter, abbreviated as MAH-PP3). The grafted amount of maleic anhydride in the obtained MAH-PP3 was 5.0% by mass when measured by IR. The number average molecular weight (Mn) was Mn: 18,000 when measured by GPC. For MAH-PP3, the value of Mn/{(100–M)×f/M} is 10.

In the formula,
  f: molecular weight of maleic anhydride (98 g/mol);
  M: content of maleic anhydride (5.0 wt %);
  Mn: number average molecular weight of MAH-PP2 (18,000).

<Production of Carbodiimide-Modified Polypropylene>

Reference Example 4

Hundred parts by mass of the MAH-PP1 produced in Reference Example 1 was mixed with 8.8 parts by mass of a carbodiimide group-containing compound (manufactured by Nisshinbo Industries Inc., trade name: CARBODILITE (registered trademark) HMV-8CA, carbodiimide group equivalent: 278, number average molecular weight: 2500), and the mixture was extruded at a cylinder temperature of 250° C., a screw rotation number of 200 rpm and a discharge rate of 80 g/minute using a twin screw kneader (TEX-30 manufactured by The Japan Steel Works, Ltd., L/D=40, using a vacuum vent) to obtain carbodiimide-modified polypropylene (hereinafter, abbreviated as CDI-PP1). The MFR (230° C., load: 2.16 kg) of the obtained CDI-PP1 was 130 g/10 minutes. According to IR analysis, the reaction rate was 100% because a maleic acid peak disappeared, and the carbodiimide group content was 27 mmol/100 g.

Reference Example 5

Carbodiimide-modified polypropylene (hereinafter, abbreviated as CDI-PP2) was obtained by mixing 100 parts by mass of the MAH-PP2 produced in Reference Example 2 and 0.25 parts by mass of a carbodiimide group-containing compound and extruding the mixture using a twin screw kneader in the same manner as in Reference Example 4. The obtained CDI-PP2 had a carbodiimide group content of 0.09 mmol/100 g.

Reference Example 6

Carbodiimide-modified polypropylene (hereinafter, abbreviated as CDI-PP3) was obtained by mixing 100 parts by mass of the MAH-PP3 produced in Reference Example 3 and 150 parts by mass of a carbodiimide group-containing compound and extruding the mixture using a twin screw kneader in the same manner as in Reference Example 4. The extruded resin appeared to be slightly gelled. The obtained CDI-PP3 had a carbodiimide group content of 220 mmol/ 100 g.

(Production of Carbon Fibers)

Reference Example 7

A copolymer having polyacrylonitrile as a principal component was subjected to spinning, a firing treatment and a surface oxidation treatment to obtain continuous carbon fibers (hereinafter, abbreviated as CF-1) with a total monofilament number of 12,000. The characteristics of the continuous carbon fibers were as follows.
Monofilament diameter: 7 μm
Mass per unit length: 0.8 g/m
Specific gravity: 1.8
Surface oxygen concentration ratio [O/C]: 0.06
Strand tensile strength: 4900 MPa
Tensile elastic modulus: 230 GPa Reference Example 8

A copolymer having polyacrylonitrile as a principal component was subjected to spinning, a firing treatment and a surface oxidation treatment to obtain continuous carbon fiber (hereinafter, abbreviated as CF-2) with a total monofilament number of 12,000. The characteristics of the continuous carbon fibers were as follows.
Monofilament diameter: 7 μm
Mass per unit length: 0.8 g/m
Specific gravity: 1.8
Surface oxygen concentration ratio [O/C]: 0.12
Strand tensile strength: 4900 MPa
Tensile elastic modulus: 230 GPa Reference Example 9

A copolymer having polyacrylonitrile as a principal component was subjected to spinning, a firing treatment and a surface oxidation treatment to obtain continuous carbon fiber (hereinafter, abbreviated as CF-3) with a total monofilament number of 12,000. The characteristics of the continuous carbon fibers were as follows.
Monofilament diameter: 7 μm
Mass per unit length: 0.8 g/m
Specific gravity: 1.8
Surface oxygen concentration ratio [O/C]: 0.03
Strand tensile strength: 4900 MPa
Tensile elastic modulus: 230 GPa <Addition of Sizing to Reinforcing Fibers>

Reference Example 10

A sizing agent mother liquid was prepared by dissolving or dispersing a sizing agent in water such that the concentration of the sizing agent was 2% by mass, a sizing agent was added to the reinforcing fibers prepared in Reference Examples 7 to 9 by an immersion method, and the reinforcing fibers were dried at 230° C. The deposition amount was 1.0% by mass.

(Preparation of Reinforcing Fiber Base)

Reference Example 11

The CF-1 obtained in Reference 7 was cut to a length of 6 mm by using a cartridge cutter to obtain chopped carbon fibers. A dispersion liquid with a concentration of 0.1% by mass, which included water and a surfactant (manufactured by Nacalai Tesque, Inc., Polyoxyethylene Lauryl Ether (trade name)), was prepared, and a sheet making base was produced from the dispersion liquid and the chopped carbon fibers using a sheet making base production apparatus in FIG. 14. The production apparatus includes a cylindrical container including an opening cock in the lower part of the container as a dispersion tank and having a diameter of 1000 mm, and a linear transportation unit (inclination angle: 30°) that connects the dispersion tank and a sheet making tank. An opening on the upper surface of the dispersion tank is provided with a stirrer, and chopped carbon fibers and a dispersion liquid (dispersion medium) can be introduced from the opening. The sheet making tank is a tank including on the bottom a mesh conveyor having a sheet making surface with a width of 500 mm, and connects to the mesh conveyor a conveyor capable of carrying a carbon fiber base (sheet making base). Sheet making was performed with the carbon fiber concentration in the dispersion liquid set to 0.05% by mass. The carbon fiber base obtained by sheet making was dried in a drying furnace at 200° C. for 30 minutes. The obtained carbon fiber base (hereinafter, referred to as a base-1) had a width of 500 mm and a basis weight of 50 g/m².

Reference Example 12

The CF-1 obtained in Reference 7 was cut to lengths of 3 mm and 6 mm by using a cartridge cutter to obtain chopped carbon fibers. A carbon fiber base was prepared in the same manner as in Reference Example 11 except that chopped carbon fibers obtained by mixing chopped carbon fibers having a length of 6 mm and chopped carbon fibers having a length of 3 mm were used during sheet making at a mass ratio of 1:1. The obtained carbon fiber base (hereinafter, referred to as a base-2) had a width of 500 mm and a basis weight of 50 g/m².

<Addition of Sizing to Reinforcing Fiber Base>

Reference Example 13

A sizing agent mother liquid was prepared by dissolving or dispersing a sizing agent in water, a sizing agent was added to the reinforcing fiber base prepared in Reference Example 11 or Reference Example 12 by an immersion method, and the reinforcing fiber base was dried at 230° C. The concentration of the sizing agent mother liquid was adjusted so that the deposition amount of the sizing agent was 1.0% by mass based on the mass of reinforcing fibers.

(Preparation of Resin Sheet)

Reference Example 14

Carbodiimide group-modified polypropylene CDI-PP1 prepared in accordance with Reference Example 4 and unmodified polypropylene (PP2) were mixed such that the concentration of the former was 10% by mass and the concentration of the latter was 90% by mass, and the mixture was pressed under conditions of 200° C. and 3 MPa, and then cooled to prepare a polypropylene resin sheet (hereinafter, referred to as a resin sheet-1) having a length of 1000 mm, a width of 1000 mm and a thickness of 0.05 mm.

Reference Example 15

Carbodiimide group-modified polypropylene CDI-PP1 prepared in accordance with Reference Example 4 and unmodified polypropylene (PP2) were mixed such that the concentration of the former was 5% by mass and the concentration of the latter was 95% by mass, and the mixture was pressed under conditions of 200° C. and 3 MPa, and then cooled to prepare a polypropylene resin sheet (hereinafter, referred to as a resin sheet-2) having a length of 1000 mm, a width of 1000 mm and a thickness of 0.05 mm.

Reference Example 16

Carbodiimide group-modified polypropylene CDI-PP1 prepared in accordance with Reference Example 4 and unmodified polypropylene (PP2) were mixed such that the concentration of the former was 20% by mass and the concentration of the latter was 80% by mass, and the mixture was pressed under conditions of 200° C. and 3 MPa, and then cooled to prepare a polypropylene resin sheet (hereinafter, referred to as a resin sheet-3) having a length of 1000 mm, a width of 1000 mm and a thickness of 0.05 mm.

Reference Example 17

Carbodiimide group-modified polypropylene CDI-PP1 prepared in accordance with Reference Example 4 and unmodified polypropylene (PP2) were mixed such that the concentration of the former was 30% by mass and the concentration of the latter was 70% by mass, and the mixture was pressed under conditions of 200° C. and 3 MPa, and then cooled to prepare a polypropylene resin sheet (hereinafter, referred to as a resin sheet-4) having a length of 1000 mm, a width of 1000 mm and a thickness of 0.05 mm.

Reference Example 18

Carbodiimide group-modified polypropylene CDI-PP2 prepared in accordance with Reference Example 5 and unmodified polypropylene (PP2) were mixed such that the concentration of the former was 10% by mass and the concentration of the latter was 90% by mass, and the mixture was pressed under conditions of 200° C. and 3 MPa, and then cooled to prepare a polypropylene resin sheet (hereinafter, referred to as a resin sheet-5) having a length of 1000 mm, a width of 1000 mm and a thickness of 0.05 mm.

Reference Example 19

Carbodiimide group-modified polypropylene CDI-PP3 prepared in accordance with Reference Example 6 and unmodified polypropylene (PP2) were mixed such that the concentration of the former was 10% by mass and the concentration of the latter was 90% by mass, and the mixture was pressed under conditions of 200° C. and 3 MPa, and then cooled to prepare a polypropylene resin sheet (hereinafter, referred to as a resin sheet-6) having a length of 1000 mm, a width of 1000 mm and a thickness of 0.05 mm.

Reference Example 20

Acid-modified polypropylene MAH-PP1 prepared in accordance with Reference Example 1 and unmodified polypropylene (PP2) were mixed such that the concentration of the former was 10% by mass and the concentration of the latter was 90% by mass, and the mixture was pressed under conditions of 200° C. and 3 MPa, and then cooled to prepare a polypropylene resin sheet (hereinafter, referred to as a resin sheet-7) having a length of 1000 mm, a width of 1000 mm and a thickness of 0.05 mm.

Reference Example 21

Acid-modified polypropylene MAH-PP1 prepared in accordance with Reference Example 1 and unmodified polypropylene (PP2) were mixed such that the concentration of the former was 20% by mass and the concentration of the latter was 80% by mass, and the mixture was pressed under conditions of 200° C. and 3 MPa, and then cooled to prepare a polypropylene resin sheet (hereinafter, referred to as a resin sheet-8) having a length of 1000 mm, a width of 1000 mm and a thickness of 0.05 mm.

<Preparation and Evaluation of Molded Article>
(Studies Using Resin Composition)

Example 1

CF-1 obtained in accordance with Reference Example 7 was sizing-treated in accordance with Reference Example 10 using (s)-1 (glycerol triglycidyl ether) as a polyfunctional compound. The obtained continuous carbon fiber bundle was cut to 6.4 mm using a cartridge cutter. Using Twin Screw Extruder Model TEX-30α (screw diameter: 30 mm, L/D=32) manufactured by The Japan Steel Works, Ltd., 3 parts by mass of CDI-PP1 prepared in accordance with Reference Example 1 and Reference Example 4 as a component (a) and 80 parts by mass of PP2 as a component (b) were mixed and supplied from a main hopper. Then, from a side hopper at the downstream of the main hopper, the cut carbon fiber bundle as a component (c) was supplied while the amount thereof was adjusted to 20 parts by mass using a mass feeder, and the carbon fiber bundle was sufficiently kneaded with a rotation number of 150 rpm at a barrel temperature of 220° C., and degassed by a vacuum vent at the downstream. The molten resin was discharged from a die slot (diameter: 5 mm), and the obtained strand was cooled, and then cut into a pellet shape using a cutter.

The content of the carbodiimide group contained in a matrix resin component in the pellet, which was calculated from the composition of the raw materials used, was 0.97 mmol based on 100 g of the resin component.

Next, from the pellet-shaped molding material obtained in the extrusion step, a test piece (molded article) for evaluation of characteristics was molded at a cylinder temperature of 220° C. and a mold temperature of 60° C. using Injection Molding Machine Model J350EIII manufactured by The Japan Steel Works, Ltd.

The flexural strength, the Izod impact strength of the dry sample, the water absorption rate, the Izod impact strength of the water-absorbing sample and the interfacial adhesion of the water-absorbing sample were evaluated in accordance with the above-described methods for evaluation of a molded article using the obtained test piece (molded article) for evaluation of characteristics. The evaluation results are shown in Table 1.

Example 2

A pellet was obtained in the same manner as in Example 1 except that as a polyfunctional compound, (s)-2 (bisphenol A-type epoxy resin) was used in place of (s)-1, and molding evaluation was performed. The content (calculated value) of the carbodiimide group contained in the resin component in the pellet and the characteristic evaluation results are described in Table 1.

Example 3

A pellet was obtained in the same manner as in Example 1 except that as a polyfunctional compound, (s)-3 (acid-modified polypropylene) was used in place of (s)-1, and molding evaluation was performed. The content (calculated value) of the carbodiimide group contained in the resin component in the pellet and the characteristic evaluation results are described in Table 1.

Example 4

A pellet was obtained in the same manner as in Example 1 except that as a polyfunctional compound, (s)-4 (polyglycerol polyglycidyl ether) was used in place of (s)-1, and molding evaluation was performed. The content (calculated value) of the carbodiimide group contained in the resin component in the pellet and the characteristic evaluation results are described in Table 1.

Example 5

A pellet was obtained in the same manner as in Example 1 except that as a polyfunctional compound, (s)-5 (aminoethylated acryl polymer) was used in place of (s)-1, and molding evaluation was performed. The content (calculated value) of the carbodiimide group contained in the resin component in the pellet and the characteristic evaluation results are described in Table 1.

Example 6

A pellet was obtained in the same manner as in Example 1 except that as a polyfunctional compound, (s)-6 (polyvinyl alcohol) was used in place of (s)-1, and molding evaluation was performed. The content (calculated value) of the carbodiimide group contained in the resin component in the pellet and the characteristic evaluation results are described in Table 1.

Example 7

A pellet was obtained in the same manner as in Example 1 except that as a polyfunctional compound, (s)-7 (polyethyleneimine) was used in place of (s)-1, and molding evaluation was performed. The content (calculated value) of the carbodiimide group contained in the resin component in the pellet and the characteristic evaluation results are described in Table 1.

Example 8

CF-2 obtained in accordance with Reference Example 8 was sizing-treated in accordance with Reference Example 10 using (s)-1 (glycerol triglycidyl ether) as a polyfunctional compound. The obtained continuous carbon fiber bundle was cut to 6.4 mm using a cartridge cutter. Using Twin Screw Extruder Model TEX-30α (screw diameter: 30 mm, L/D=32) manufactured by The Japan Steel Works, Ltd., 3 parts by mass of CDI-PP1 prepared in accordance with Reference Example 1 and Reference Example 4 as a component (a) and 80 parts by mass of PP2 as a component (b) were mixed and supplied from a main hopper. Then, from a side hopper at the downstream of the main hopper, the cut carbon fiber bundle as a component (c) was supplied while the amount thereof was adjusted to 20 parts by mass using a mass feeder, and the carbon fiber bundle was sufficiently kneaded with a rotation number of 150 rpm at a barrel temperature of 220° C., and degassed by a vacuum vent at the downstream. The molten resin was discharged from a die slot (diameter: 5 mm), and the obtained strand was cooled, and then cut into a pellet shape using a cutter.

Next, from the pellet-shaped molding material obtained in the extrusion step, a test piece (molded article) for evaluation of characteristics was molded at a cylinder temperature of 220° C. and a mold temperature of 60° C. using Injection Molding Machine Model J350EIII manufactured by The Japan Steel Works, Ltd.

The flexural strength, the Izod impact strength of the dry sample, the water absorption rate, the Izod impact strength of the water-absorbing sample and the interfacial adhesion of the water-absorbing sample were evaluated in accordance with the above-described methods for evaluation of a molded article using the obtained test piece (molded article) for evaluation of characteristics. The content (calculated value) of the carbodiimide group contained in the resin component in the pellet and the evaluation results are shown in Table 1.

Example 9

A pellet was obtained in the same manner as in Example 8 except that as a polyfunctional compound, (s)-2 (bisphenol A-type epoxy resin) was used in place of (s)-1, and molding evaluation was performed. The content (calculated value) of the carbodiimide group contained in the resin component in the pellet and the characteristic evaluation results are described in Table 1.

Example 10

A pellet was obtained in the same manner as in Example 8 except that as a polyfunctional compound, (s)-3 (acid-modified polypropylene) was used in place of (s)-1, and molding evaluation was performed. The content (calculated value) of the carbodiimide group contained in the resin component in the pellet and the characteristic evaluation results are described in Table 1.

Example 11

A pellet was obtained in the same manner as in Example 8 except that as a polyfunctional compound, (s)-4 (polyglycerol polyglycidyl ether) was used in place of (s)-1, and molding evaluation was performed. The content (calculated value) of the carbodiimide group contained in the resin component in the pellet and the characteristic evaluation results are described in Table 1.

Example 12, Example 13, Example 14 and Example 15

A pellet was obtained in the same manner as in Example 1 except that the content of CDI-PP1 as the component (a) was changed to 5 parts by mass, 10 parts by mass, 20 parts by mass and 40 parts by mass, respectively, and molding evaluation was performed. The content (calculated value) of the carbodiimide group contained in the resin component in the pellet and the characteristic evaluation results are described in Table 2.

Example 16

CF-3 obtained in accordance with Reference Example 9 was sizing-treated in accordance with Reference Example 10 using (s)-1 (glycerol triglycidyl ether) as a polyfunctional compound. The obtained continuous carbon fiber bundle was cut to 6.4 mm using a cartridge cutter. Using Twin Screw Extruder Model TEX-30α (screw diameter: 30 mm, L/D=32) manufactured by The Japan Steel Works, Ltd., 3 parts by mass of CDI-PP1 prepared in accordance with Reference Example 1 and Reference Example 4 as a component (a) and 80 parts by mass of PP2 as a component (b) were mixed and supplied from a main hopper. Then, from a side hopper at the downstream of the main hopper, the cut carbon fiber bundle as a component (c) was supplied while the amount thereof was adjusted to 20 parts by mass using a mass feeder, and the carbon fiber bundle was sufficiently kneaded with a rotation number of 150 rpm at a barrel temperature of 220° C., and degassed by a vacuum vent at the downstream. The molten resin was discharged from a die slot (diameter: 5 mm), and the obtained strand was cooled, and then cut into a pellet shape using a cutter.

Next, from the pellet-shaped molding material obtained in the extrusion step, a test piece (molded article) for evaluation of characteristics was molded at a cylinder temperature of 220° C. and a mold temperature of 60° C. using Injection Molding Machine Model J350EIII manufactured by The Japan Steel Works, Ltd.

The flexural strength, the Izod impact strength of the dry sample, the water absorption rate, the Izod impact strength of the water-absorbing sample and the interfacial adhesion of the water-absorbing sample were evaluated in accordance with the above-described methods for evaluation of a molded article using the obtained test piece (molded article) for evaluation of characteristics. The content (calculated value) of the carbodiimide group contained in the resin component in the pellet and the evaluation results are shown in Table 2.

Example 17

A pellet was obtained in the same manner as in Example 1 except that as the component (a), 3 parts by mass of CDI-PP2 prepared in accordance with Reference Example 2 and Reference Example 5 was used in place of CDI-PP1, and molding evaluation was performed. The content (calculated value) of the carbodiimide group contained in the resin component in the pellet and the characteristic evaluation results are described in Table 2.

Example 18

A pellet was obtained in the same manner as in Example 1 except that as the component (a), 3 parts by mass of CDI-PP3 prepared in accordance with Reference Example 3 and Reference Example 6 was used in place of CDI-PP1, and molding evaluation was performed. The content (calculated value) of the carbodiimide group contained in the resin component in the pellet and the characteristic evaluation results are described in Table 2.

Example 19

CF-1 (glass fiber: 240TEX manufactured by Nitto Boseki Co., Ltd., total number of monofilaments: 1600) was sizing-treated in accordance with Reference Example 10 using (s)-1 (glycerol triglycidyl ether) as a polyfunctional compound. The obtained continuous glass fiber bundle was cut to 6.4 mm using a cartridge cutter. Using Twin Screw Extruder Model TEX-30α (screw diameter: 30 mm, L/D=32) manufactured by The Japan Steel Works, Ltd., 10 parts by mass of CDI-PP1 prepared in accordance with Reference Example 1 and Reference Example 4 as a component (a) and 80 parts by mass of PP2 as a component (b) were mixed and supplied from a main hopper. Then, from a side hopper at the downstream of the main hopper, the cut glass fiber bundle as a component (c) was supplied while the amount thereof was adjusted to 20 parts by mass using a mass feeder, and the carbon fiber bundle was sufficiently kneaded with a rotation number of 150 rpm at a barrel temperature of 220° C., and degassed by a vacuum vent at the downstream. The molten resin was discharged from a die slot (diameter: 5 mm), and the obtained strand was cooled, and then cut into a pellet shape using a cutter.

Next, from the pellet-shaped molding material obtained in the extrusion step, a test piece (molded article) for evaluation of characteristics was molded at a cylinder temperature of 220° C. and a mold temperature of 60° C. using Injection Molding Machine Model J350EIII manufactured by The Japan Steel Works, Ltd.

The flexural strength, the Izod impact strength of the dry sample, the water absorption rate, the Izod impact strength of the water-absorbing sample and the interfacial adhesion of the water-absorbing sample were evaluated in accordance with the above-described methods for evaluation of a molded article using the obtained test piece (molded article) for evaluation of characteristics. The content (calculated value) of the carbodiimide group contained in the resin component in the pellet and the evaluation results are shown in Table 2.

Comparative Example 1

A pellet was obtained in the same manner as in Example 1 except that the CF-1 obtained in Reference Example 7 was used as it was without depositing a sizing agent thereon, and molding evaluation was performed. The content (calculated value) of the carbodiimide group contained in the resin component in the pellet and the characteristic evaluation results are described in Table 3.

Comparative Example 2

A pellet was obtained in the same manner as in Example 1 except that (s)'-1 (polybutene) having no functional group was used as a sizing agent in place of the polyfunctional compound (s)-1, and molding evaluation was performed. The content (calculated value) of the carbodiimide group contained in the resin component in the pellet and the characteristic evaluation results are described in Table 3.

Comparative Example 3

A pellet was obtained in the same manner as in Comparative Example 2 except that the content of CDI-PP1 as the component (a) was changed to 10 parts by mass, and molding evaluation was performed. The content (calculated value) of the carbodiimide group contained in the resin component in the pellet and the characteristic evaluation results are described in Table 3.

Comparative Example 4 and Comparative Example 5

A pellet was obtained in the same manner as in Example 1 except that 3 parts by mass or 10 parts by mass of MAH-PP1 prepared in accordance with Reference Example 1 was used in place of CDI-PP1 as the component (a), and molding evaluation was performed. The content (calculated value) of the carbodiimide group contained in the resin component in the pellet and the characteristic evaluation results are described in Table 3.

Comparison of Example 1 to Example 7, Comparative Example 1 and Comparative Example 2

In Example 1 to Example 7 in which polycarbodiimide-modified polypropylene was used and a polyfunctional compound was used as a sizing agent, molded articles being excellent in dynamic characteristics and having water degradation resistance with a low reduction in impact strength even during water absorption could be obtained.

On the other hand, in Comparative Example 1 in which a sizing agent was not used and Comparative Example 2 in which a sizing agent having no functional group was used, molded articles excellent in dynamic characteristics could be obtained, but impact strength was significantly reduced during water absorption, so that molded articles having water degradation resistance could not be obtained, although polycarbodiimide-modified polypropylene was used.

As for the type of sizing agent, the compound having a tri- or higher functional epoxy group as shown in Example 1 and Example 4 and the polyethyleneimine shown in Example 7 tended to particularly improve dynamic characteristics and water degradation resistance.

Comparison of Example 1, Example 13 to Example 16 Comparative Example 2 and Comparative Example 3

Dynamic characteristics tended to be improved as the content of carbodiimide-modified polypropylene as the component (a) increased when the content was in a range of 3 to 10 parts by mass where the total of the component (b) and the component (c) is 100 parts by mass. When the content of the component (a) was in a range of 10 to 40 parts by mass, dynamic characteristics reached the maximum at the content of 10 parts by mass, and tended to decrease as the content increased. This may be due to a decrease in content of fibers in the molded article. As for water degradation resistance, dynamic characteristics during water absorption tended to be improved as the content (parts by weight) of carbodiimide group-containing polypropylene increased in Examples in which a polyfunctional compound was used, while in both Comparative Example 2 and Comparative Example 3 in which a sizing agent having no functional group was used, impact strength was significantly reduced during water absorption, so that molded articles having water degradation resistance could not be obtained.

Comparison of Example 1, Example 8 and Example 16

The dynamic characteristics and water degradation resistance of the obtained molded article tended to be improved as the surface oxygen concentration ratio O/C of carbon fibers to be used increased when the O/C was in a range of 0.01 to 0.12.

Comparison of Example 1, Example 17 and Example 18

In Example 17, CDI-PP2 had a low carbodiimide group content of 0.09 mmol/100 g because the value of Mn/{(100−M)×f/M} of MAH-PP2 as a raw material of CDI-PP2 was as low as 0.09. The obtained molded article was slightly inferior in dynamic characteristics as compared to Example 1, but had water degradation resistance with a low reduction in impact strength during water absorption.

In Example 18, CDI-PP3 was produced by adjusting the amount of carbodiimide group-containing compound while gelation was suppressed as much as possible because the value of Mn/{(100−M)×f/M} of MAH-PP3 as a raw material of CDI-PP3 was as high as 10, but production was difficult due to slight gelation etc. The obtained molded article was slightly inferior in dynamic characteristics as compared to Example 1, but had excellent water degradation resistance with almost no reduction in impact strength during water absorption.

Comparison of Example 1, Example 13, Comparison Example 4 and Comparison Example 5

In Comparative Example 4 and Comparison Example 5 in which a polyfunctional compound was used as a sizing agent, but maleic acid-modified polypropylene was used in place of polycarbodiimide-modified polypropylene, molded articles excellent in dynamic characteristics such as flexural strength and impact strength during drying could be obtained, but impact strength was significantly reduced during water absorption, so that molded articles having water degradation resistance could not be obtained.

As described above, in Example 1 to Example 19, molded articles being excellent in dynamic characteristics and having water degradation resistance with a low reduction in strength even during water absorption could be obtained. On the other hand, in Comparative Examples 1 to 5, molded articles excellent in dynamic characteristics could be obtained, but impact strength was significantly reduced during water absorption, so that molded articles having water degradation resistance could not be obtained.

TABLE 1

| | | | | Example 1 | Example 2 | Example 3 | Example 4 | Example 5 | Example 6 | Example 7 | Example 8 | Example 9 | Example 10 | Example 11 |
|---|---|---|---|---|---|---|---|---|---|---|---|---|---|---|
| Blending formulation | CDI-PP1 | (a) | Carbodiimide-modified PP | Parts by mass | 3 | 3 | 3 | 3 | 3 | 3 | 3 | 3 | 3 | 3 | 3 |
| | CDI-PP2 | | | | | | | | | | | | | | |
| | CDI-PP3 | | | | | | | | | | | | | | |
| | MAH-PP1 | (b) | Maleic acid-modified PP Block PP (J707G) | | 80 | 80 | 80 | 80 | 80 | 80 | 80 | 80 | 80 | 80 | 80 |
| | PP2 | | Blending amount | | 20 | 20 | 20 | 20 | 20 | 20 | 20 | 20 | 20 | 20 | 20 |
| | Reinforcing fiber | (c) | (including sizing agent) Blending amount of sizing agent (calculated value) | | 0.2 | 0.2 | 0.2 | 0.2 | 0.2 | 0.2 | 0.2 | 0.2 | 0.2 | 0.2 | 0.2 |
| | | | Type of reinforcing fiber | | CF-1 | CF-1 | CF-1 | CF-1 | CF-1 | CF-1 | CF-1 | CF-2 | CF-2 | CF-2 | CF-2 |
| | | | Surface functional group concentration (O/C) | | 0.06 | 0.06 | 0.06 | 0.06 | 0.06 | 0.06 | 0.06 | 0.12 | 0.12 | 0.12 | 0.12 |
| | | | Type of sizing agent | | (s)-1 | (s)-2 | (s)-3 | (s)-4 | (s)-5 | (s)-6 | (s)-7 | (s)-1 | (s)-2 | (s)-3 | (s)-4 |
| | | | Number of functional groups in sizing agent | | 3 | 2 | 5 | 5 | 75 | 500 | 28 | 3 | 2 | 5 | 5 |
| | | | Content of carbodiimide group contained in matrix resin component in resin composition (mmol/100 g of matrix resin component) | | 0.97 | 0.97 | 0.97 | 0.97 | 0.97 | 0.97 | 0.97 | 0.97 | 0.97 | 0.97 | 0.97 |
| Properties | Flexural test | | Flexural strength | MPa | 151 | 138 | 142 | 154 | 132 | 124 | 148 | 153 | 145 | 151 | 155 |
| | | | | Assessment | A | B | B | A | B | C | B | A | B | A | A |
| | Impact test | | Notched Izod (dry) | J/m | 211 | 199 | 205 | 218 | 202 | 176 | 209 | 225 | 200 | 212 | 230 |
| | | | | Assessment | B | C | B | B | B | C | B | B | B | B | B |
| | Water absorption test | | Water absorption time | Days | 7 | 7 | 7 | 7 | 7 | 7 | 7 | 7 | 7 | 7 | 7 |
| | | | Notched Izod (water-absorbing) | J/m | 187 | 175 | 182 | 208 | 180 | 152 | 198 | 220 | 183 | 203 | 228 |
| | | | | Assessment | C | C | C | B | C | C | C | B | C | B | B |
| | | | Strength retention rate during water absorption | % | 89 | 88 | 89 | 95 | 89 | 86 | 95 | 98 | 92 | 96 | 99 |
| | | | | Assessment | B | B | B | A | B | B | A | A | A | A | A |
| | | | Water absorption rate | % | 0.35 | 0.24 | 0.22 | 0.34 | 0.33 | 0.48 | 0.38 | 0.38 | 0.26 | 0.23 | 0.37 |
| | | | Evaluation of interfacial adhesion (Water-absorbing sample) | Assessment | B | B | A | A | B | C | A | A | B | A | A |

TABLE 2

| Blending formulation | | | | Parts by mass | Example 12 | Example 13 | Example 14 | Example 15 | Example 16 | Example 17 | Example 18 | Example 19 |
|---|---|---|---|---|---|---|---|---|---|---|---|---|
| | CDI-PP1 | (a) | Carbodiimide-modified PP | | 5 | 10 | 20 | 40 | | | | 10 |
| | CDI-PP2 | | | | | | | | 3 | 3 | | |
| | CDI-PP3 | | | | | | | | | | 3 | |
| | MAH-PP1 | (b) | Maleic acid-modified PP | | | | | | | | | |
| | PP2 | (c) | Block PP (J707G) Blending amount | | 80 | 80 | 80 | 80 | 80 | 80 | 80 | 80 |
| | | | | | 20 | 20 | 20 | 20 | 20 | 20 | 20 | 20 |
| | Reinforcing fiber | | (including sizing agent) Blending amount of sizing agent (calculated value) | | (0.2) | (0.2) | (0.2) | (0.2) | (0.2) | (0.2) | (0.2) | (0.2) |
| | | | Type of reinforcing fiber | | CF-1 | CF-1 | CF-1 | CF-1 | CF-3 | CF-1 | CF-1 | GF-1 |
| | | | Surface functional group concentration (O/C) | | 0.06 | 0.06 | 0.06 | 0.06 | 0.01 | 0.06 | 0.06 | — |
| | | | Type of sizing agent | | (s)-1 | (s)-1 | (s)-1 | (s)-1 | (s)-1 | (s)-1 | (s)-1 | (s)-1 |
| | | | Number of functional groups in sizing agent | | 3 | 3 | 3 | 3 | 3 | 3 | 3 | 3 |
| | Content of carbodiimide group contained in matrix resin component in resin composition (mmol/100 g of matrix resin component) | | | | 1.58 | 2.99 | 5.39 | 8.99 | 0.97 | 0.0032 | 7.93 | 2.99 |
| Properties | Flexural test | | Flexural strength | MPa | 154 | 160 | 157 | 148 | 132 | 108 | 124 | 105 |
| | | | | Assessment | A | A | A | A | B | C | C | C |
| | Impact test | | Notched Izod (dry) | J/m | 219 | 226 | 225 | 205 | 170 | 168 | 170 | 192 |
| | | | | Assessment | B | B | B | B | C | C | C | C |
| | Water absorption test | | Water absorption time | Days | 7 | 7 | 7 | 7 | 7 | 7 | 7 | 7 |
| | | | Notched Izod (water-absorbing) | J/m | 214 | 218 | 221 | 203 | 151 | 150 | 162 | 185 |
| | | | | Assessment | B | B | B | B | C | C | C | C |
| | | | Strength retention rate during water absorption | % | 98 | 97 | 98 | 99 | 89 | 89 | 95 | 96 |
| | | | | Assessment | A | A | A | A | B | B | A | A |
| | | | Water absorption rate | % | 0.36 | 0.35 | 0.36 | 0.35 | 0.33 | 0.34 | 0.32 | 0.28 |
| | | | Evaluation of interfacial adhesion (Water-absorbing sample) | Assessment | A | A | A | A | C | C | C | C |

TABLE 3

|  |  |  |  |  | Comparative Example 1 | Comparative Example 2 | Comparative Example 3 | Comparative Example 4 | Comparative Example 5 |
|---|---|---|---|---|---|---|---|---|---|
| Blending formulation | CDI-PP1 | (a) | Carbodiimide-modified PP | Parts by mass | 3 | 3 | 10 |  |  |
|  | CDI-PP2 |  |  |  |  |  |  |  |  |
|  | CDI-PP3 |  |  |  |  |  |  |  |  |
|  | MAH-PP1 |  | Maleic acid-modified PP |  |  |  |  | 3 | 10 |
|  | PP2 | (b) | Block PP (J707G) |  | 80 | 80 | 80 | 80 | 80 |
|  | Reinforcing fiber | (c) | Blending amount (including sizing agent) |  | 20 | 20 | 20 | 20 | 20 |
|  |  |  | Blending amount of sizing agent (calculated value) |  | 0 | (0.2) | (0.2) | (0.2) | (0.2) |
|  |  |  | Type of reinforcing fiber |  | CF-1 | CF-1 | CF-1 | CF-1 | CF-1 |
|  |  |  | Surface functional group concentration (O/C) |  | 0.06 | 0.06 | 0.06 | 0.06 | 0.06 |
|  |  |  | Type of sizing agent |  | None | (s)'-1 | (s)'-1 | (s)-1 | (s)-1 |
|  |  |  | Number of functional groups in sizing agent |  | — | 0 | 0 | 3 | 3 |
|  | Content of carbodiimide group contained in matrix resin component in resin composition (mmol/100 g of matrix resin component) |  |  |  | 0.98 | 0.97 | 2.99 | 0 | 0 |
| Properties | Flexural test | Flexural strength |  | MPa | 135 | 131 | 134 | 145 | 153 |
|  |  |  |  | Assessment | B | B | B | B | A |
|  | Impact test | Notched Izod (dry) |  | J/m | 192 | 182 | 211 | 205 | 221 |
|  |  |  |  | Assessment | C | C | B | B | B |
|  | Water absorption test | Water absorption time |  | Days | 7 | 7 | 7 | 7 | 7 |
|  |  | Notched Izod (water-absorbing) |  | J/m | 105 | 88 | 92 | 93 | 94 |
|  |  |  |  | Assessment | D | D | D | D | D |
|  |  | Strength retention rate during water absorption |  | % | 55 | 48 | 44 | 45 | 43 |
|  |  |  |  | Assessment | C | D | D | D | D |
|  |  | Water absorption rate |  | % | 0.24 | 0.31 | 0.30 | 0.33 | 0.32 |
|  |  | Evaluation of interfacial adhesion (water-absorbing sample) |  | Assessment | C | C | C | C | C |

(Studies Using Core-Sheath Long Fiber Pellet-Shaped Molding Material)

Example 20

A film of a liquid obtained by heating and melting a terpene resin (d)-1 as a terpene resin (d) was formed on a roll heated to 130° C. A kiss coater was used for forming a film having a constant thickness on the roll. A continuous carbon fiber bundle, in which CF-1 obtained in accordance with Reference Example 7 was sizing-treated using (s)-1 (glycerol triglycidyl ether) as a polyfunctional compound in accordance with Reference Example 10, was caused to pass over the roll while being in contact therewith, so that the component (d)-1 was deposited on the continuous carbon fiber bundle in an amount of 1.0 part by mass where the total of the component (b) and the component (c) is 100 parts by mass. Next, the continuous carbon fiber bundle with the component (d) deposited thereon was caused to pass alternately above and below 10 rolls with a diameter of 50 mm, which were heated to 180° C., freely rotated with a bearing and were arranged on a straight line. By this operation, the terpene resin (d) was impregnated to the inside of the fiber bundle to form a composite.

The continuous composite was caused to pass through an electric wire coverage method coating die placed at the end of Twin Screw Extruder Model TEX-30α (screw diameter: 30 mm, L/D=32) manufactured by The Japan Steel Works, Ltd., and a polypropylene resin mixture (a mixture of 8 parts by mass of CDI-PP1 prepared in accordance with Reference Example 1 and Reference Example 4 as a component (a) and 80 parts by mass of PP2 as a component (b)) melted at 230° C. was discharged from the extruder into the die to be continuously arranged so as to cover the periphery of the composite. At this time, the amount of the propylene resin mixture was adjusted so that the content of the sizing-treated carbon fiber bundle was 20 parts by mass (including a sizing agent) where the total of the component (b) and the component (c) is 100 parts by mass. The obtained molding material was cooled, and then cut with a cutter to form a pellet-shaped molding material.

The content of the carbodiimide group contained in a resin component in the molding material, which was calculated from the composition of the raw materials used, was 2.42 mmol based on 100 g of the matrix resin component.

Next, from the obtained pellet-shaped molding material, a test piece (molded article) for evaluation of characteristics was molded at a cylinder temperature of 220° C. and a mold temperature of 60° C. using Injection Molding Machine Model J350EIII manufactured by The Japan Steel Works, Ltd.

The fiber dispersibility, the flexural strength, the Izod impact strength of the dry sample, the water absorption rate, the Izod impact strength of the water-absorbing sample and the interfacial adhesion of the water-absorbing sample were evaluated in accordance with the above-described methods for evaluation of a molded article using the obtained test piece (molded article) for evaluation of characteristics. The evaluation results are shown in Table 4.

Example 21

A molding material was obtained in the same manner as in Example 20 except that the content of the terpene resin was changed to 3.0 parts by mass, and molding evaluation was performed. The characteristic evaluation results are shown in Table 4.

Example 22

A molding material was obtained in the same manner as in Example 20 except that the content of the terpene resin was changed to 5.0 parts by mass, and molding evaluation was performed. The characteristic evaluation results are shown in Table 4.

Example 23

A molding material was obtained in the same manner as in Example 20 except that the content of the terpene resin was changed to 10.0 parts by mass, and molding evaluation was performed. The characteristic evaluation results are shown in Table 4.

Example 24

A molding material was obtained in the same manner as in Example 22 except that as the terpene resin (d), a hydrogenated terpene resin (d)-2 was used in place of (d)-1, and molding evaluation was performed. The characteristic evaluation results are shown in Table 4.

Example 25

A molding material was obtained in the same manner as in Example 22 except that as a polyfunctional compound, (s)-2 (bisphenol A-type epoxy resin) was used in place of (s)-1, and molding evaluation was performed. The characteristic evaluation results are shown in Table 4.

Example 26

A molding material was obtained in the same manner as in Example 22 except that as a polyfunctional compound, (s)-3 (acid-modified polypropylene) was used in place of (s)-1, and molding evaluation was performed. The characteristic evaluation results are shown in Table 4.

Example 27

A molding material was obtained in the same manner as in Example 22 except that as a polyfunctional compound, (s)-4 (polyglycerol polyglycidyl ether) was used in place of (s)-1, and molding evaluation was performed. The characteristic evaluation results are shown in Table 4.

Example 28

A molding material was obtained in the same manner as in Example 22 except that as a polyfunctional compound, (s)-7 (polyethyleneimine) was used in place of (s)-1, and molding evaluation was performed. The characteristic evaluation results are shown in Table 4.

Example 29

A molding material was obtained in the same manner as in Example 22 except that as reinforcing fibers (c), CF-2 obtained in accordance with Reference Example 8 was used in place of CF-1, and molding evaluation was performed. The characteristic evaluation results are shown in Table 5.

Example 30

A molding material was obtained in the same manner as in Example 22 except that as a polyfunctional compound, (s)-4 was used in place of (s)-1, and as reinforcing fibers (c), CF-2 obtained in accordance with Reference Example 8 was used in place of CF-1, and molding evaluation was performed. The characteristic evaluation results are shown in Table 5.

Example 31

A molding material was obtained in the same manner as in Example 22 except that 10 parts by mass of (e)-1 (ethylene-α-olefin copolymer) as the elastomer (e) was added to a polypropylene resin mixture, and the mixture was discharged to be arranged so as to continuously cover the periphery of a composite. The characteristic evaluation results are shown in Table 5.

Example 32

A molding material was obtained in the same manner as in Example 22 except that 10 parts by mass of (e)-2 (styrene-ethylene-butadiene-styrene copolymer) as the elastomer (e) was added to a polypropylene resin mixture, and the mixture was discharged to be arranged so as to continuously cover the periphery of a composite. The characteristic evaluation results are shown in Table 5.

Example 33

A molding material was obtained in the same manner as in Example 22 except that the content of CDI-PP1 as the component (a) was changed to 4 parts by mass, and molding evaluation was performed. The characteristic evaluation results are shown in Table 5.

Example 34

A molding material was obtained in the same manner as in Example 22 except that the content of CDI-PP1 as the component (a) was changed to 16 parts by mass, and molding evaluation was performed. The characteristic evaluation results are shown in Table 5.

Example 35

A molding material was obtained in the same manner as in Example 22 except that the content of CDI-PP1 as the component (a) was changed to 24 parts by mass, and molding evaluation was performed. The characteristic evaluation results are shown in Table 5.

Example 36

A molding material was obtained in the same manner as in Example 22 except that as reinforcing fibers (c), CF-3 obtained in accordance with Reference Example 9 was used in place of CF-1, and molding evaluation was performed. The characteristic evaluation results are shown in Table 5.

Example 37

A molding material was obtained in the same manner as in Example 22 except that as the component (a), 8 parts by mass of CDI-PP2 prepared in accordance with Reference Example 2 and Reference Example 5 was used in place of CDI-PP1, and molding evaluation was performed. The characteristic evaluation results are shown in Table 6.

Example 38

A molding material was obtained in the same manner as in Example 22 except that as the component (a), 8 parts by mass of CDI-PP3 prepared in accordance with Reference Example 3 and Reference Example 6 was used in place of CDI-PP1, and molding evaluation was performed. The characteristic evaluation results are shown in Table 6.

Example 39

A molding material was obtained in the same manner as in Example 22 except that as reinforcing fibers (c), GF-1 (glass fiber: 240 TEX manufactured by Nitto Boseki Co., Ltd., total number of monofilaments: 1600) was used in place of CF-1, and molding evaluation was performed. The characteristic evaluation results are shown in Table 6.

Example 40

A continuous carbon fiber bundle, in which CF-1 obtained in accordance with Reference Example 7 was sizing-treated using (s)-2 as a polyfunctional compound in accordance with Reference Example 10 without adding a terpene resin, was caused to directly pass through an electric wire coverage method coating die placed at the end of Twin Screw Extruder Model TEX-30α (screw diameter: 30 mm, L/D=32) manufactured by The Japan Steel Works, Ltd., and a polypropylene resin mixture (a mixture of 8 parts by mass of CDI-PP1 prepared in accordance with Reference Example 1 and Reference Example 4 as a component (a) and 80 parts by mass of PP2 as a component (b)) melted at 230° C. was discharged from the extruder into the die to be continuously arranged so as to cover the periphery of the composite. At this time, the amount of the propylene resin mixture was adjusted so that the content of the sizing-treated carbon fiber bundle was 20 parts by mass (including sizing) where the total of the component (b) and the component (c) is 100 parts by mass. The obtained molding material was cooled, and then cut with a cutter to form a pellet-shaped molding material.

Next, from the obtained pellet-shaped molding material, a test piece (molded article) for evaluation of characteristics was molded at a cylinder temperature of 220° C. and a mold temperature of 60° C. using Injection Molding Machine Model J350EIII manufactured by The Japan Steel Works, Ltd.

The content of the carbodiimide group contained in a resin component in the molding material, which was calculated from the composition of the raw materials used, was 2.45 mmol based on 100 g of the matrix resin component.

The fiber dispersibility, the flexural strength, the Izod impact strength of the dry sample, the water absorption rate, the Izod impact strength of the water-absorbing sample and the interfacial adhesion of the water-absorbing sample were evaluated in accordance with the above-described methods for evaluation of a molded article using the obtained test piece (molded article) for evaluation of characteristics. The evaluation results are shown in Table 6.

Comparative Example 6

A molding material was attempted to be produced in the same manner as in Example 22 except that 20 parts by mass of CF-1 obtained in Reference Example 7 was used without depositing a sizing agent, 5.0 parts by mass of (d)-1 was used as the terpene resin (d), 8 parts by mass of CDI-PP1 was used as the component (a) and 80 parts by mass of PP2 was used as the component (b), but carbon fibers became fluffy during preparation of the molding material, so that a pellet-shaped molding material could not be obtained. Molding evaluation was attempted, but feedability into a molding machine was insufficient, so that molded articles could not be obtained with stability.

Comparative Example 7

A molding material was obtained in the same manner as in Example 22 except that (s)'-1 (polybutene) having no functional group was used as a sizing agent in place of the polyfunctional compound (s)-1, and molding evaluation was performed. The characteristic evaluation results are shown in Table 6.

Comparative Example 8

A molding material was obtained in the same manner as in Comparative Example 7 except that the content of CDI-PP1 as the component (a) was changed to 16 parts by mass, and molding evaluation was performed. The characteristic evaluation results are shown in Table 6.

Comparative Example 9

A molding material was obtained in the same manner as in Example 22 except that 8 parts by mass of MAH-PP1 prepared in accordance with Reference Example 1 was used in place of CDI-PP1 as the component (a), and molding evaluation was performed. The characteristic evaluation results are shown in Table 6.

Comparative Example 10

A molding material was obtained in the same manner as in Comparative Example 9 except that the content of MAH-PP1 prepared in accordance with Reference Example 1 was changed to 16 parts by mass, and molding evaluation was performed. The characteristic evaluation results are shown in Table 6.

Comparison of Example 20 to Example 40 and Comparative Example 1

In Example 20 to Example 39 in which polycarbodiimide-modified polypropylene was used, a polyfunctional compound was used as a sizing agent, and a terpene resin was used, the molding material (long fiber pellet) was excellent in handling characteristics, and molded articles being excellent in fiber dispersibility and excellent in dynamic characteristics and having water degradation resistance with a low reduction in impact strength even during water absorption could be obtained by using the molding material. In Example 40, the water degradation resistance of the molded article was high, but fiber dispersibility was low. It may be preferred to use a terpene resin for imparting high fiber dispersibility to a core-sheath long fiber pellet-shaped molding material. On the other hand, in Comparative Example 6, a sizing agent was not deposited on the carbon fiber bundle, and it was impossible to prepare a molding material (long fiber pellet).

Dispersibility of reinforcing fibers was improved as the blending amount of the terpene resin increased when the blending amount was in a range of 1 to 5 parts by mass where the total of the component (b) and the component (c) was 100 parts by mass.

Comparison of Example 22, Example 25 to Example 28, Comparative Example 7 and Comparative Example 8

When comparing the above Examples and Comparative Examples with the blending amount of the terpene resin fixed to 5 parts by mass where the total of the component (b) and the component (c) was 100 parts by mass, molded articles being excellent in fiber dispersibility and dynamic characteristics and having water degradation resistance with a low reduction in impact strength even during water absorption could be obtained in Example 22 and Example 25 to Example 28 in which polycarbodiimide-modified polypropylene was used, and a polyfunctional compound was used as sizing. On the other hand, in Comparative Example 7 and Comparative Example 8 in which a sizing agent having no functional group was used, molded articles excellent in fiber dispersibility and dynamic characteristics could be obtained, but impact strength was significantly reduced during water absorption, so that molded articles having water degradation resistance could not be obtained, although polycarbodiimide-modified polypropylene was used.

As for the type of sizing agent, the compound having a tri- or higher functional epoxy group as shown in Example 22 and Example 27 and the polyethyleneimine shown in Example 28 tended to particularly improve dynamic characteristics and water degradation resistance.

Comparison of Example 22, Example 29 and Example 36

The dynamic characteristics and water degradation resistance of the obtained molded article tended to be improved as the surface oxygen concentration ratio O/C of carbon fibers to be used increased when the O/C was in a range of 0.01 to 0.12.

Comparison of Example 22, Example 37 and Example 38

In Example 37, CDI-PP2 had a low carbodiimide group content of 0.09 mmol/100 g because the value of $Mn/\{(100-M) \times f/M\}$ of MAH-PP2 as a raw material of CDI-PP2 was as low as 0.09. The obtained molded article was slightly inferior in dynamic characteristics as compared to Example 22, but had water degradation resistance with a low reduction in impact strength during water absorption.

In Example 38, CDI-PP3 was produced by adjusting the amount of carbodiimide group-containing compound while gelation was suppressed as much as possible because the value of $Mn/\{(100-M) \times f/M\}$ of MAH-PP3 as a raw material of CDI-PP3 was as high as 10, but production was difficult due to slight gelation etc. The obtained molded article was slightly inferior in dynamic characteristics as compared to Example 22, but had excellent water degradation resistance with almost no reduction in impact strength during water absorption.

Comparison of Example 22, Example 34, Comparative Example 9 and Comparative Example 10

In Comparative Example 9 and Comparison Example 10 in which a polyfunctional compound was used as a sizing agent, but maleic acid-modified polypropylene was used in place of polycarbodiimide-modified polypropylene, molded articles excellent in dynamic characteristics such as fiber dispersibility, flexural strength and impact strength during drying could be obtained, but impact strength was significantly reduced during water absorption, so that molded articles having water degradation resistance could not be obtained.

As described above, in Example 20 to Example 39, the molding material (long fiber pellet) was excellent in handling characteristics, and molded articles being excellent in fiber dispersibility and excellent in dynamic characteristics and having water degradation resistance with a low reduction in impact strength even during water absorption could be obtained by using the molding material.

TABLE 4

| Blending formulation | | | | | Example 20 | Example 21 | Example 22 | Example 23 | Example 24 | Example 25 | Example 26 | Example 27 | Example 28 |
|---|---|---|---|---|---|---|---|---|---|---|---|---|---|
| | Carbodiimide-modified PP | (a) | CDI-PP1 | Parts by mass | 8 | 8 | 8 | 8 | 8 | 8 | 8 | 8 | 8 |
| | | | CDI-PP2 | | | | | | | | | | |
| | | | CDI-PP3 | | | | | | | | | | |
| | Maleic acid-modified PP | | MAH-PP1 | | | | | | | | | | |
| | Unmodified PP | (b) | PP 2 (block PP) | | 80 | 80 | 80 | 80 | 80 | 80 | 80 | 80 | 80 |
| | | | Blending amount (including sizing agent) | | 20 | 20 | 20 | 20 | 20 | 20 | 20 | 20 | 20 |
| | Reinforcing fiber | (c) | Blending amount of sizing agent (calculated value) | | 0.2 | 0.2 | 0.2 | 0.2 | 0.2 | 0.2 | 0.2 | 0.2 | 0.2 |
| | | | Type of reinforcing fiber | | CF-1 | CF-1 | CF-1 | CF-1 | CF-1 | CF-1 | CF-1 | CF-1 | CF-1 |
| | | | Surface functional group concentration (O/C) | | 0.06 | 0.06 | 0.06 | 0.06 | 0.06 | 0.06 | 0.06 | 0.06 | 0.06 |
| | | | Type of sizing agent | | (s)-1 | (s)-1 | (s)-1 | (s)-1 | (s)-1 | (s)-2 | (s)-3 | (s)-4 | (s)-7 |
| | | | Number of functional groups in sizing agent | | 3 | 3 | 3 | 3 | 3 | 2 | 5 | 5 | 28 |
| | | | SP value of sizing agent | | 9.7 | 9.7 | 9.7 | 9.7 | 9.7 | 10.3 | 9 | 10.8 | 8.9 |
| | Terpene resin | (d) | Blending amount | Parts by mass | 1 | 3 | 5 | 10 | 5 | 5 | 5 | 5 | 5 |
| | | | Type | | (d)-1 | (d)-1 | (d)-1 | (d)-1 | (d)-2 | (d)-1 | (d)-1 | (d)-1 | (d)-2 |
| | | | SP value | | 8.8 | 8.8 | 8.8 | 8.8 | 8.3 | 8.8 | 8.8 | 8.8 | 8.3 |
| | | | Tg | °C. | 70 | 70 | 70 | 70 | 40 | 70 | 70 | 70 | 40 |
| | | | Number average molecular weight | | 1500 | 1500 | 1500 | 1500 | 800 | 1500 | 1500 | 1500 | 800 |
| | Elastomer | (e) | Blending amount | Parts by mass | 0.8 | 0.8 | 0.8 | 0.8 | 0.5 | 0.8 | 0.8 | 0.8 | 0.5 |
| | | | Type | | | | | | | | | | |
| | | | SP value | % | | | | | | | | | |

TABLE 4-continued

| | | | Example 20 | Example 21 | Example 22 | Example 23 | Example 24 | Example 25 | Example 26 | Example 27 | Example 28 |
|---|---|---|---|---|---|---|---|---|---|---|---|
| Composite Molding Material | Content of carbodiimide group contained in matrix resin component in molding material (mmol/100 g of resin component) | | 2.42 | 2.37 | 2.32 | 2.2 | 2.32 | 2.32 | 2.32 | 2.32 | 2.32 |
| | Composite void content | Assessment | C | B | A | A | A | A | A | A | A |
| | Form of molding material | | Core-sheath Long fiber pellet 7 mm long | Core-sheath Long fiber pellet 7 mm long | Core-sheath Long fiber pellet 7 mm long | Core-sheath Long fiber pellet 7 mm long | Core-sheath Long fiber pellet 7 mm long | Core-sheath Long fiber pellet 7 mm long | Core-sheath Long fiber pellet 7 mm long | Core-sheath Long fiber pellet 7 mm long | Core-sheath Long fiber pellet 7 mm long |
| Molded article Properties | Fiber dispersibility | Assessment | C | B | A | A | A | A | A | A | A |
| | Flexural test Flexural strength | MPa | 155 | 154 | 158 | 148 | 155 | 143 | 145 | 155 | 152 |
| | | Assessment | A | A | A | B | A | B | B | A | A |
| | Impact test Notched Izod (dry) | J/m | 185 | 232 | 287 | 274 | 287 | 243 | 285 | 281 | 265 |
| | | Assessment | C | B | A | A | A | B | A | A | A |
| | Water absorption test Water absorption time | Days | 7 | 7 | 7 | 7 | 7 | 7 | 7 | 7 | 7 |
| | Notched Izod (water-absorbing) | J/m | 175 | 215 | 265 | 255 | 264 | 213 | 254 | 266 | 252 |
| | | Assessment | C | B | A | A | A | B | A | A | A |
| | Strength retention rate during water absorption | % | 95 | 93 | 92 | 93 | 92 | 88 | 89 | 95 | 95 |
| | | Assessment | A | A | A | A | A | B | B | A | A |
| | Water absorption rate | % | 0.35 | 0.33 | 0.34 | 0.34 | 0.32 | 0.25 | 0.24 | 0.33 | 0.36 |
| | | Assessment | C | B | B | B | A | B | A | A | A |
| | Evaluation of interfacial adhesion (water-absorbing sample) | Assessment | | | | | | | | | |

TABLE 5

| Blending formulation | | | | Example 29 | Example 30 | Example 31 | Example 32 | Example 33 | Example 34 | Example 35 | Example 36 |
|---|---|---|---|---|---|---|---|---|---|---|---|
| Blending formulation | Carbodiimide-modified PP | (a) | CDI-PP1 | Parts by mass | 8 | 8 | 8 | 8 | 4 | 16 | 24 | 8 |
| | | | CDI-PP2 | | | | | | | | | |
| | | | CDI-PP3 | | | | | | | | | |
| | Maleic acid-modified PP | | MAH-PP1 | | | | | | | | | |
| | Unmodified PP | (b) | PP 2 (block PP) Blending amount | | 80 | 80 | 80 | 80 | 80 | 80 | 80 | 80 |
| | Reinforcing fiber | (c) | Blending amount (including sizing agent) | | 20 | 20 | 20 | 20 | 20 | 20 | 20 | 20 |
| | | | Blending amount of sizing agent (calculated value) | | 0.2 | 0.2 | 0.2 | 0.2 | 0.2 | 0.2 | 0.2 | 0.2 |
| | | | Type of reinforcing fiber | | CF-2 | CF-2 | CF-1 | CF-1 | CF-1 | CF-1 | CF-1 | CF-3 |
| | | | Surface functional group concentration (O/C) | | 0.12 | 0.12 | 0.06 | 0.06 | 0.06 | 0.06 | 0.06 | 0.01 |
| | | | Type of sizing agent | | (s)-1 | (s)-4 | (s)-1 | (s)-1 | (s)-1 | (s)-1 | (s)-1 | (s)-1 |
| | | | Number of functional groups in sizing agent | | 3 | 5 | 3 | 3 | 3 | 3 | 3 | 3 |
| | | | SP value of sizing agent | | 9.7 | 10.8 | 9.7 | 9.7 | 9.7 | 9.7 | 9.7 | 9.7 |
| | Terpene resin | (d) | Blending amount | Parts by mass | 5 | 5 | 5 | 5 | 5 | 5 | 5 | 5 |
| | | | Type | | (d)-1 | (d)-1 | (d)-1 | (d)-1 | (d)-1 | (d)-1 | (d)-1 | (d)-1 |
| | | | SP value | | 8.8 | 8.8 | 8.8 | 8.8 | 8.8 | 8.8 | 8.8 | 8.8 |
| | | | Tg | °C. | 70 | 70 | 70 | 70 | 70 | 70 | 70 | 70 |
| | | | Number average molecular weight | | 1500 | 1500 | 1500 | 1500 | 1500 | 1500 | 1500 | 1500 |
| | | | Melt viscosity at 190° C. | | 0.8 | 0.8 | 0.8 | 0.8 | 0.8 | 0.8 | 0.8 | 0.8 |
| | Elastomer | (e) | Blending amount | Parts by mass | | | 10 | 10 | | | | |
| | | | Type | | | | (a)-1 | (a)-2 | | | | |
| | | | SP value | | | | 8.5 | 10.2 | | | | |
| Composite Molding Material | Content of carbodiimide group contained in matrix resin component in molding material (mmol/100 g of resin component) | | | | 2.32 | 2.32 | 2.09 | 2.09 | 1.21 | 4.27 | 5.93 | 2.32 |
| | Composite void content | | | Assessment | A | A | A | A | A | A | A | A |
| | Form of molding material | | | | Core-sheath Long fiber pellet 7 mm long | Core-sheath Long fiber pellet 7 mm long | Core-sheath Long fiber pellet 7 mm long | Core-sheath Long fiber pellet 7 mm long | Core-sheath Long fiber pellet 7 mm long | Core-sheath Long fiber pellet 7 mm long | Core-sheath Long fiber pellet 7 mm long | Core-sheath Long fiber pellet 7 mm long |
| Molded article Properties | Fiber dispersibility | | | Assessment | A | A | B | C | A | A | A | A |
| | Flexural test | Flexural strength | | MPa | 153 | 154 | 136 | 139 | 151 | 155 | 160 | 132 |
| | Impact test | Notched Izod (dry) | | Assessment | A | A | B | B | A | A | A | B |
| | | | | J/m | 282 | 295 | 283 | 235 | 284 | 285 | 299 | 217 |
| | Water absorption test | Water absorption time | | Days | 7 | 7 | 7 | 7 | 7 | 7 | 7 | 7 |
| | | Notched Izod (water-absorbing) | | J/m | 268 | 289 | 250 | 205 | 253 | 279 | 295 | 191 |
| | | Strength retention rate during water absorption | | Assessment | A | A | A | B | A | A | A | C |
| | | Water absorption rate | | % | 95 | 98 | 88 | 87 | 89 | 98 | 99 | 88 |
| | | | | Assessment | A | A | B | B | A | A | A | B |
| | | | | % | 0.37 | 0.35 | 0.32 | 0.33 | 0.34 | 0.34 | 0.33 | 0.32 |
| | Evaluation of interfacial adhesion (water-absorbing sample) | | | Assessment | A | A | A | B | A | A | A | C |

TABLE 6

| | | | Example 37 | Example 38 | Example 39 | Example 40 | Comparative Example 6 | Comparative Example 7 | Comparative Example 8 | Comparative Example 9 | Comparative Example 10 |
|---|---|---|---|---|---|---|---|---|---|---|---|
| Blending formulation | (a) Carbodiimide-modified PP | CDI-PP1 | Parts by mass | 8 | | 8 | 8 | 8 | 8 | 16 | 8 | 16 |
| | | CDI-PP2 | | | 8 | | | | | | | |
| | | CDI-PP3 | | | | | | | | | | |
| | Maleic acid-modified PP | MAH-PP1 | | | | | | | | | | |
| | (b) Unmodified PP | PP 2 (block PP) Blending amount | | 80 | 80 | 80 | 80 | 80 | 80 | 80 | 80 | 80 |
| | (c) Reinforcing fiber | Blending amount (including sizing agent) | | 20 | 20 | 20 | 20 | 20 | 20 | 20 | 20 | 20 |
| | | Blending amount of sizing agent (calculated value) | | 0.2 | 0.2 | 0.2 | 0.2 | 0 | 0.2 | 0.2 | 0.2 | 0.2 |
| | | Type of reinforcing fiber | | CF-1 | CF-1 | CF-1 | CF-1 | CF-1 | CF-1 | CF-1 | CF-1 | CF-1 |
| | | Surface functional group concentration (O/C) | | 0.06 | 0.06 | — | 0.06 | 0.06 | 0.06 | 0.06 | 0.06 | 0.06 |
| | | Type of sizing agent | | (s)-1 | (s)-1 | (s)-1 | (s)-2 | None | (s)-1 | (s)-1 | (s)-1 | (s)-1 |
| | | Number of functional groups in sizing agent | | 3 | 3 | 3 | 2 | — | 0 | 0 | 3 | 3 |
| | | SP value of sizing agent | | 9.7 | 9.7 | 9.7 | 10.3 | — | 8.2 | 8.2 | 9.7 | 9.7 |
| | (d) Terpene resin | Blending amount | Parts by mass | 5 | 5 | 5 | 0 | 5 | 5 | 5 | 5 | 5 |
| | | Type | | (d)-1 | (d)-1 | (d)-1 | — | (d)-1 | (d)-1 | (d)-1 | (d)-1 | (d)-1 |
| | | SP value | | 8.8 | 8.8 | 8.8 | — | 8.8 | 8.8 | 8.8 | 8.8 | 8.8 |
| | | Tg | °C. | 70 | 70 | 70 | — | 70 | 70 | 70 | 70 | 70 |
| | | Number average molecular weight | | 1500 | 1500 | 1500 | — | 1500 | 1500 | 1500 | 1500 | 1500 |
| | (e) Elastomer | Melt viscosity at 190° C. | | | | | | | | | | |
| | | Blending amount | Parts by mass | 0.8 | 0.8 | 0.8 | — | 0.8 | 0.8 | 0.8 | 0.8 | 0.8 |
| | | Type | | | | | | | | | | |
| | | SP value | | | | | | | | | | |

TABLE 6-continued

|  |  |  | Example 37 | Example 38 | Example 39 | Example 40 | Comparative Example 6 | Comparative Example 7 | Comparative Example 8 | Comparative Example 9 | Comparative Example 10 |
|---|---|---|---|---|---|---|---|---|---|---|---|
| Composite Molding Material | Content of carbodiimide group contained in matrix resin component in molding material (mmol/100 g of resin component) | | 0.0077 | 18.88 | 2.32 | 2.45 | 2.32 | 2.32 | 4.27 | — | — |
| | Composite void content | Assessment | A | A | A | D | — | A | A | A | A |
| | Form of molding material | | Core-sheath Long fiber pellet 7 mm long | Core-sheath Long fiber pellet 7 mm long | Core-sheath Long fiber pellet 7 mm long | Core-sheath Long fiber pellet 7 mm long | Long fiber Preparation pellet impossible | Core-sheath Long fiber pellet 7 mm long | Core-sheath Long fiber pellet 7 mm long | Core-sheath Long fiber pellet 7 mm long | Core-sheath Long fiber pellet 7 mm long |
| Molded article Properties | Fiber dispersibility | Assessment | A | A | B | D | — | B | B | A | A |
| | Flexural test Flexural strength | MPa | 109 | 122 | 110 | 127 | — | 136 | 132 | 152 | 157 |
| | | Assessment | C | C | C | C | — | B | B | A | A |
| | Impact test Notched Izod (dry) | J/m | 202 | 183 | 175 | 193 | — | 173 | 178 | 254 | 274 |
| | | Assessment | B | C | C | C | — | C | C | A | A |
| | Water absorption test | Water absorption time Days | 7 | 7 | 7 | 7 | — | 7 | 7 | 7 | 7 |
| | | Notched Izod (water-absorbing) J/m | 179 | 174 | 165 | 169 | — | 82 | 79 | 83 | 87 |
| | | Assessment | C | C | C | C | — | D | D | D | D |
| | | Strength retention rate during water absorption % | 89 | 95 | 94 | 88 | — | 48 | 44 | 33 | 32 |
| | | Assessment | B | A | A | B | — | D | D | D | D |
| | | Water absorption rate % | 0.33 | 0.32 | 0.27 | 0.25 | — | 0.30 | 0.32 | 0.32 | 0.30 |
| | | Evaluation of interfacial adhesion (water-absorbing sample) Assessment | C | C | C | C | — | C | C | C | C |

(Preparation and Evaluation of Discontinuous Fiber Prepreg and Molded Article)

Example 41

In accordance with the method in Reference Example 13, a polyfunctional compound (s)-1 as a sizing agent was added to the base-1 obtained in Reference Example 11. One carbon fiber base provided with a sizing agent and two resin sheets-1 obtained in Reference Example 14 were laminated so as to form a structure of resin sheet/carbon fiber base/ resin sheet, and a pressure of 5 MPa was applied at a temperature of 230° C. for 2 minutes to prepare a 500 mm-wide and 500 mm-long prepreg including a carbon fiber base impregnated with a matrix resin. The use amounts of the carbon fiber base and the resin sheet were adjusted so that the reinforcing fiber mass content was 32.5%. The content of the carbodiimide group contained in a resin component in the prepreg, which was calculated from the composition of the raw materials used, was 2.69 mmol based on 100 g of the matrix resin component.

For the obtained prepreg, the fiber length ratio of reinforcing fibers, the fiber length distribution, the two-dimensional orientation angle, the thickness at 23° C., the resin impregnation rate and the tensile strength σ were evaluated in accordance with the prepreg evaluation methods described above. The evaluation results are shown in Table 7.

Next, the obtained prepreg was press-molded in accordance with <Method for Molding of Molded Article Used in Flexural Test> to obtain a flat plate-shaped molded article. For the obtained molded article, the flexural strength of the dry sample and the flexural strength of the water-absorbing sample were evaluated in accordance with the molded article evaluation methods described above. The evaluation results are shown in Table 7.

Example 42

A prepreg was obtained in the same manner as in Example 41 except that as a polyfunctional compound, (s)-2 (bisphenol A-type epoxy resin) was used in place of (s)-1, and molding evaluation was performed. The characteristic evaluation results are shown in Table 7.

Example 43

A prepreg was obtained in the same manner as in Example 41 except that as a polyfunctional compound, (s)-3 (acid-modified polypropylene) was used in place of (s)-1, and molding evaluation was performed. The characteristic evaluation results are shown in Table 7.

Example 44

A prepreg was obtained in the same manner as in Example 41 except that as a polyfunctional compound, (s)-4 (polyglycerol polyglycidyl ether) was used in place of (s)-1, and molding evaluation was performed. The characteristic evaluation results are shown in Table 7.

Example 45

A prepreg was obtained in the same manner as in Example 41 except that as a polyfunctional compound, (s)-5 (aminoethylated acryl polymer) was used in place of (s)-1, and molding evaluation was performed. The characteristic evaluation results are shown in Table 7.

Example 46

A prepreg was obtained in the same manner as in Example 41 except that as a polyfunctional compound, (s)-6 (polyvinyl alcohol) was used in place of (s)-1, and molding evaluation was performed. The characteristic evaluation results are shown in Table 7.

Example 47

A prepreg was obtained in the same manner as in Example 41 except that as a polyfunctional compound, (s)-7 (polyethyleneimine) was used in place of (s)-1, and molding evaluation was performed. The characteristic evaluation results are shown in Table 7.

Example 48

A prepreg was obtained in the same manner as in Example 41 except that as a resin sheet, the resin sheet-2 prepared in accordance with Reference Example 15 was used in place of the resin sheet-1, and the use amounts of the carbon fiber base and the resin sheet were adjusted so that the reinforcing fiber mass content was 33.7%, and molding evaluation was performed. The content of the carbodiimide group contained in the resin component in the prepreg and the characteristic evaluation results are described in Table 7.

Example 49

A prepreg was obtained in the same manner as in Example 41 except that as a resin sheet, the resin sheet-3 prepared in accordance with Reference Example 16 was used in place of the resin sheet-1, and the use amounts of the carbon fiber base and the resin sheet were adjusted so that the reinforcing fiber mass content was 30.0%, and molding evaluation was performed. The content of the carbodiimide group contained in the resin component in the prepreg and the characteristic evaluation results are described in Table 7.

Example 50

A prepreg was obtained in the same manner as in Example 41 except that as a resin sheet, the resin sheet-4 prepared in accordance with Reference Example 17 was used in place of the resin sheet-1, and the use amounts of the carbon fiber base and the resin sheet were adjusted so that the reinforcing fiber mass content was 27.3%, and molding evaluation was performed. The content of the carbodiimide group contained in the resin component in the prepreg and the characteristic evaluation results are described in Table 7.

Example 51

A prepreg was obtained in the same manner as in Example 41 except that as a resin sheet, the resin sheet-5 prepared in accordance with Reference Example 18 was used in place of the resin sheet-1, and molding evaluation was performed. The content of the carbodiimide group contained in the resin component in the prepreg and the characteristic evaluation results are described in Table 8.

Example 52

A prepreg was obtained in the same manner as in Example 41 except that as a resin sheet, the resin sheet-6 prepared in accordance with Reference Example 19 was used in place of the resin sheet-1, and molding evaluation was performed. The content of the carbodiimide group contained in the resin component in the prepreg and the characteristic evaluation results are described in Table 8.

Example 53

A prepreg was obtained in the same manner as in Example 41 except that as a reinforcing fiber base, the base-2 prepared in accordance with Reference Example 12 was used in place of the resin sheet-1, and molding evaluation was performed. The content of the carbodiimide group contained in the resin component in the prepreg and the characteristic evaluation results are described in Table 8.

Comparative Example 11

A prepreg was obtained in the same manner as in Example 41 except that the base-1 obtained in Reference Example 11 was used as it was without depositing a sizing agent, and the use amounts of the carbon fiber base and the resin sheet were adjusted so that the reinforcing fiber mass content was 32.6%, and molding evaluation was performed. The content of the carbodiimide group contained in the resin component in the prepreg and the characteristic evaluation results are described in Table 8.

Comparative Example 12

A prepreg was obtained in the same manner as in Example 41 except that (s)'-1 (polybutene) having no functional group was used as a sizing agent in place of the polyfunctional compound (s)-1, and molding evaluation was performed. The characteristic evaluation results are shown in Table 8.

Comparative Example 13

A prepreg was obtained in the same manner as in Comparative Example 12 except that as a resin sheet, the resin sheet-3 prepared in accordance with Reference Example 16 was used in place of the resin sheet-1, and the use amounts of the carbon fiber base and the resin sheet were adjusted so that the reinforcing fiber mass content was 30.0%, and molding evaluation was performed. The characteristic evaluation results are shown in Table 8.

Comparative Example 14

A prepreg was obtained in the same manner as in Example 41 except that as a resin sheet, the resin sheet-7 prepared in accordance with Reference Example 20 was used in place of the resin sheet-1, and molding evaluation was performed. The content of the carbodiimide group contained in the resin component in the prepreg and the characteristic evaluation results are described in Table 8.

Comparative Example 15

A prepreg was obtained in the same manner as in Comparative Example 14 except that as a resin sheet, the resin sheet-8 prepared in accordance with Reference Example 21 was used in place of the resin sheet-1, and the use amounts of the carbon fiber base and the resin sheet were adjusted so that the reinforcing fiber mass content was 30.0%, and molding evaluation was performed. The characteristic evaluation results are shown in Table 8.

Comparison of Example 41 to Example 47, Comparative Example 11 and Comparative Example 12

In Example 41 to Example 47 in which polycarbodiimide-modified polypropylene was used and a polyfunctional compound was used as a sizing agent, molded articles being excellent in dynamic characteristics and having water degradation resistance with a low reduction in flexural strength even during water absorption could be obtained. On the other hand, in Comparative Example 11 in which a sizing agent was not used and Comparative Example 12 in which a sizing agent having no functional group was used, molded articles excellent in dynamic characteristics could be obtained, but flexural strength was significantly reduced during water absorption, so that molded articles having water degradation resistance could not be obtained, although polycarbodiimide-modified polypropylene was used.

As for the type of sizing agent, the compound having a tri- or higher functional epoxy group as shown in Example 41 and Example 44 and the polyethyleneimine shown in Example 47 tended to particularly improve dynamic characteristics and water degradation resistance.

Comparison of Example 41, Example 51 and Example 52

In Example 51, CDI-PP2 had a low carbodiimide group content of 0.09 mmol/100 g because the value of $Mn/\{(100-M)\times f/M\}$ of MAH-PP2 as a raw material of CDI-PP2 was as low as 0.09, and the obtained molded article was slightly inferior in dynamic characteristics as compared to Example 41, but had water degradation resistance with a low reduction in flexural strength during water absorption.

In Example 52, CDI-PP3 was produced by adjusting the amount of carbodiimide group-containing compound while gelation was suppressed as much as possible because the value of $Mn/\{(100-M)\times f/M\}$ of MAH-PP3 as a raw material of CDI-PP3 was as high as 10, but production was difficult due to slight gelation etc. The obtained molded article was slightly inferior in dynamic characteristics as compared to Example 41, but had excellent water degradation resistance with almost no reduction in flexural strength during water absorption.

Comparison of Example 41, Example 49, Comparative Example 14 and Comparative Example 15

In Comparative Example 14 and Comparison Example 15 in which a polyfunctional compound was used as a sizing agent, but maleic acid-modified polypropylene was used in place of polycarbodiimide-modified polypropylene, molded articles excellent in dynamic characteristics could be obtained, but flexural strength was significantly reduced during water absorption, so that molded articles having water degradation resistance could not be obtained.

As described above, in Example 41 to Example 53, molded articles being extremely excellent in dynamic characteristics and having water degradation resistance with a low reduction in strength even during water absorption could be obtained. On the other hand, in Comparative Examples 11 to 15, molded articles excellent in dynamic characteristics could be obtained, but flexural strength was significantly reduced during water absorption, so that molded articles having water degradation resistance could not be obtained.

TABLE 7

| | | | | | Example 41 | Example 42 | Example 43 | Example 44 | Example 45 | Example 46 | Example 47 | Example 48 | Example 49 | Example 50 |
|---|---|---|---|---|---|---|---|---|---|---|---|---|---|---|
| Prepreg | Blending formulation | Resin composition | Resin sheet No. | | (1) 7.2 | (1) 7.2 | (1) 7.2 | (1) 7.2 | (1) 7.2 | (1) 7.2 | (1) 7.2 | (2) 3.4 | (3) 16.3 | (4) 27.9 |
| | | (a) | Carbodiimide-modified PP | CDI-PP1 | Parts by mass | | | | | | | | | |
| | | | | CDI-PP2 | Parts by mass | | | | | | | | | |
| | | | | CDI-PP3 | Parts by mass | | | | | | | | | |
| | | | Maleic acid-modified PP | MAH-PP1 | Parts by mass | | | | | | | | | |
| | | (b) | Block PP (J707G) | PP2 | Parts by mass | 65 | 65 | 65 | 65 | 65 | 65 | 65 | 65 | 65 | 65 |
| | Reinforcing fiber base | Base No. | | | (1) | (1) | (1) | (1) | (1) | (1) | (1) | (1) | (1) | (1) |
| | | (c) | Reinforcing fiber | Blending amount | 35 | 35 | 35 | 35 | 35 | 35 | 35 | 35 | 35 | 35 |
| | | | | Type of reinforcing fiber | CF-1 | CF-1 | CF-1 | CF-1 | CF-1 | CF-1 | CF-1 | CF-1 | CF-1 | CF-1 |
| | | (s) | Sizing agent | Blending amount | 0.35 | 0.35 | 0.35 | 0.35 | 0.35 | 0.35 | 0.35 | 0.35 | 0.35 | 0.35 |
| | | | | Type of sizing agent | (s)-1 | (s)-2 | (s)-3 | (s)-4 | (s)-5 | (s)-6 | (s)-7 | (s)-1 | (s)-1 | (s)-1 |
| | | | | Number of functional groups in sizing agent | 3 | 2 | 5 | 5 | 75 | 500 | 28 | 3 | 3 | 3 |
| Characteristics | Content of carbodiimide group contained in matrix resin component in prepreg (mmol/100 g of matrix resin component) | | | | 2.69 | 2.69 | 2.69 | 2.69 | 2.69 | 2.69 | 2.69 | 1.34 | 5.38 | 8.07 |
| | Reinforcing fiber mass content | | | % | 32.5 | 32.5 | 32.5 | 32.5 | 32.5 | 32.5 | 32.5 | 33.7 | 30.0 | 27.3 |
| | Reinforcing fiber length | Fiber length ratio | More than 10 mm | % by mass | 0 | 0 | 0 | 0 | 0 | 0 | 0 | 0 | 0 | 0 |
| | | | 2 to 10 mm | % by mass | 95 | 95 | 95 | 95 | 95 | 95 | 95 | 95 | 95 | 95 |
| | | | less than 2 mm | % by mass | 5 | 5 | 5 | 5 | 5 | 5 | 5 | 5 | 5 | 5 |
| | | Fiber length distribution | Number of peaks | | 1 | 1 | 1 | 1 | 1 | 1 | 1 | 1 | 1 | 1 |
| | Two-dimensional orientation angle of reinforcing fiber | | | ° | 40 | 40 | 40 | 40 | 40 | 40 | 40 | 40 | 40 | 40 |
| | Thickness at 23° C. | | | mm | 0.15 | 0.15 | 0.15 | 0.15 | 0.15 | 0.15 | 0.15 | 0.15 | 0.15 | 0.15 |
| | Resin impregnation rate | | | % | 92 | 92 | 92 | 92 | 92 | 92 | 92 | 90 | 93 | 95 |
| | Tensile strength σ | | | MPa | 140 | 140 | 140 | 140 | 140 | 130 | 140 | 140 | 140 | 130 |
| | σMax | | | MPa | 150 | 145 | 145 | 150 | 145 | 135 | 145 | 145 | 145 | 135 |
| | σMin | | | MPa | 135 | 130 | 130 | 135 | 130 | 120 | 135 | 130 | 130 | 120 |
| Molded article Properties | Flexural test | Flexural strength | | MPa | 311 | 295 | 296 | 315 | 292 | 265 | 312 | 298 | 289 | 275 |
| | | Assessment | | | A | B | B | A | B | C | A | B | B | B |
| | Water absorption test | Water absorption time | Water absorption time | Days | 7 | 7 | 7 | 7 | 7 | 7 | 7 | 7 | 7 | 7 |
| | | Flexural strength (water absorbing) | | MPa | 292 | 268 | 272 | 302 | 268 | 243 | 298 | 280 | 285 | 274 |
| | | Assessment | | | B | C | B | C | B | C | B | B | B | B |
| | | Strength retention rate during water absorption | | % | 94 | 91 | 92 | 96 | 92 | 92 | 96 | 94 | 99 | 100 |
| | | Assessment | | | B | B | B | A | B | B | A | B | A | A |

TABLE 8

| | | | | | Example 51 | Example 52 | Example 53 | Comparative Example 11 |
|---|---|---|---|---|---|---|---|---|
| Prepreg | Blending formulation | Resin composition | Resin sheet No. | | (5) | (6) | (1) | (1) |
| | | | (a) Carbodiimide-modified PP | CDI-PP1 | | | 7.2 | 7.2 |
| | | | | CDI-PP2 | 7.2 | | | |
| | | | | CDI-PP3 | | 7.2 | | |
| | | | (b) Maleic acid-modified PP | MAH-PP1 | | | | |
| | | | | Block PP (J707G) PP2 | 65 | 65 | 65 | 65 |
| | | Reinforcing fiber base | Base No. | | (1) | (1) | (2) | (1) |
| | | | (c) Reinforcing fiber | Blending amount | 35 | 35 | 35 | 35 |
| | | | | Type of reinforcing fiber | CF-1 | CF-1 | CF-1 | CF-1 |
| | | | (s) Sizing agent | Blending amount | 0.35 | 0.35 | 0.35 | 0 |
| | | | | Type of sizing agent | (s)-1 | (s)-1 | (s)-1 | None |
| | | | | Number of functional groups in sizing agent | 3 | 3 | 3 | — |
| | Content of carbodiimide group contained in matrix resin component in prepreg (mmol/100 g of matrix resin component) | | | | 0.0090 | 21.89 | 2.69 | 2.70 |
| | Characteristics | Reinforcing fiber mass content | | % | 32.5 | 32.5 | 32.5 | 32.6 |
| | | Reinforcing fiber Fiber length ratio | More than 10 mm | % by mass | 0 | 0 | 0 | 0 |
| | | | 2 to 10 mm | % by mass | 95 | 95 | 95 | 95 |
| | | Fiber length | less than 2 mm | % by mass | 5 | 5 | 5 | 5 |
| | | | Fiber length distribution | Number of peaks | 1 | 1 | 2 | 1 |
| | | Two-dimensional orientation angle of reinforcing fiber | | ° | 40 | 40 | 40 | 40 |
| | | Thickness at 23° C. | | mm | 0.15 | 0.15 | 0.15 | 0.15 |
| | | Resin impregnation rate | | % | 92 | 92 | 95 | 92 |
| | | Tensile strength σ | σMax | MPa | 130 | 130 | 130 | 130 |
| | | | σMin | MPa | 135 | 135 | 135 | 140 |
| | | Flexural strength | | MPa | 120 | 120 | 120 | 125 |
| Molded article | Properties | Flexural test | Flexural strength | MPa | 263 | 268 | 305 | 290 |
| | | | Assessment | | C | C | A | B |
| | | Water absorption test | Water absorption time | Days | 7 | 7 | 7 | 7 |
| | | | Flexural strength (water absorbing) | MPa | 274 | 263 | 287 | 214 |
| | | | Assessment | | C | C | B | D |
| | | | Strength retention rate during water absorption | % | 94 | 98 | 94 | 74 |
| | | | Assessment | | B | A | B | D |

TABLE 8-continued

| | | | | | Comparative Example 12 | Comparative Example 13 | Comparative Example 14 | Comparative Example 15 |
|---|---|---|---|---|---|---|---|---|
| Prepreg | Blending formulation | Resin composition | Resin sheet No. | | (1) | (2) | (7) | (8) |
| | | (a) | Carbodiimide-modified PP | | 7.2 | 16.3 | 7.2 | 16.3 |
| | | | CDI-PP1 | Parts by mass | | | | |
| | | | CDI-PP2 | Parts by mass | | | | |
| | | | CDI-PP3 | Parts by mass | | | | |
| | | | Maleic acid-modified PP MAH-PP1 | Parts by mass | | | | |
| | | (b) | Block PP (J707G) PP2 | Parts by mass | 65 | 65 | 65 | 65 |
| | Reinforcing fiber base | Base No. | | | (1) | (1) | (1) | (1) |
| | | (c) | Reinforcing fiber | Blending amount | 35 | 35 | 35 | 35 |
| | | | | Type of reinforcing fiber | CF-1 | CF-1 | CF-1 | CF-1 |
| | | (s) | Sizing agent | Blending amount | 0.35 | 0.35 | 0.35 | 0.35 |
| | | | | Type of sizing agent | (s)-1 | (s)-1 | (s)-1 | (s)-1 |
| | | | | Number of functional groups in sizing agent | 0 | 0 | 3 | 3 |
| | Content of carbodiimide group contained in matrix resin component in prepreg (mmol/100 g of matrix resin component) | | | | 2.69 | 5.38 | 0 | 0 |
| | Characteristics | | Reinforcing fiber mass content | % by mass | 32.5 | 30.0 | 32.5 | 30.0 |
| | | | Reinforcing fiber length ratio More than 10 mm fiber | % by mass | 0 | 0 | 0 | 0 |
| | | | 2 to 10 mm | % by mass | 95 | 95 | 95 | 95 |
| | | | Fiber length less than 2 mm | % by mass | 5 | 5 | 5 | 5 |
| | | | Fiber length distribution Number of peaks | | 1 | 1 | 1 | 1 |
| | | | Two-dimensional orientation angle of reinforcing fiber | ° | 40 | 40 | 40 | 40 |
| | | | Thickness at 23° C. | mm | 0.15 | 0.15 | 0.15 | 0.15 |
| | | | Resin impregnation rate | % | 92 | 92 | 92 | 93 |
| | | | Tensile strength σ σMax | MPa | 130 | 130 | 140 | 130 |
| | | | σMin | MPa | 140 | 140 | 150 | 140 |
| Molded article | Properties | Flexural test | Flexural strength | MPa | 125 | 125 | 135 | 125 |
| | | | | MPa | 285 | 283 | 312 | 285 |
| | | Water absorption test | Water absorption time | | B | B | A | B |
| | | | Assessment | Days | 7 | 7 | 7 | 7 |
| | | | Flexural strength (water absorbing) | MPa | 211 | 205 | 213 | 198 |
| | | | Assessment | | D | D | D | D |
| | | | Strength retention rate during water absorption | % | 74 | 72 | 68 | 69 |
| | | | Assessment | | D | D | D | D |

(Preparation and Evaluation of Continuous Fiber Prepreg and Molded Article)

Example 54

A corrugated cross head die, through which a continuous reinforcing fiber bundle could pass, was mounted at the end part of a single screw extruder. Then, a continuous carbon fiber bundle, in which CF-1 obtained in accordance with Reference Example 7 was sizing-treated using (s)-1 (glycerol triglycidyl ether) as a polyfunctional compound in accordance with Reference Example 10, was drawn through a cross head die at a speed of 5 m/minute, while a polypropylene resin mixture (a mixture of 4.7 parts by mass of CDI-PP1 prepared in accordance with Reference Example 1 and Reference Example 4 as a component (a) and 47.1 parts by mass of PP2 as a component (b)) melted at 230° C. was discharged from the extruder into the die to deposit the resin mixture on the continuous fiber bundle, and the continuous fiber bundle was squeezed with a roller while being heated at 230° C., so that the continuous fiber bundle was impregnated with the resin mixture. The melt-impregnated product was cooled with a nip roller at 60° C. and then wound to prepare a tape-shaped prepreg containing continuous fiber bundles aligned in one direction. At this time, the supply amount of the propylene mixture was adjusted so that the mass content of carbon fibers in the prepreg was 50.3%.

The content of the carbodiimide group contained in a resin component in the prepreg, which was calculated from the composition of the raw materials used, was 2.42 mmol based on 100 g of the matrix resin component. For the obtained prepreg, the resin impregnation rate was evaluated. The evaluation results are shown in Table 9.

Next, the obtained tape-shaped prepreg was cut to a length of 30 cm, and laid in a 30 cm×30 cm mold while being aligned such that carbon fibers in the prepreg were arranged in one direction, and the prepreg was press-molded at a temperature of 200° C. and a pressure of 30 MPa for 5 minutes, and cooled to 50° C. while the pressure was maintained, thereby obtaining a flat plate-shaped molded article having a thickness of 3 mm. For the obtained molded article, the flexural strength of the dry sample and the flexural strength of the water-absorbing sample were evaluated in accordance with the molded article evaluation methods described above. The evaluation results are shown in Table 9.

Example 55

A prepreg was obtained in the same manner as in Example 54 except that as a polyfunctional compound, (s)-2 (bisphenol A-type epoxy resin) was used in place of (s)-1, and molding evaluation was performed. The characteristic evaluation results are shown in Table 9.

Example 56

A prepreg was obtained in the same manner as in Example 54 except that as a polyfunctional compound, (s)-3 (acid-modified polypropylene) was used in place of (s)-1, and molding evaluation was performed. The characteristic evaluation results are shown in Table 9.

Example 57

A prepreg was obtained in the same manner as in Example 54 except that as a polyfunctional compound, (s)-4 (polyglycerol polyglycidyl ether) was used in place of (s)-1, and molding evaluation was performed. The characteristic evaluation results are shown in Table 9.

Example 58

A prepreg was obtained in the same manner as in Example 54 except that as a polyfunctional compound, (s)-7 (polyethyleneimine) was used in place of (s)-1, and molding evaluation was performed. The characteristic evaluation results are shown in Table 9.

Example 59

A prepreg was obtained in the same manner as in Example 54 except that the content of CDI-PP1 as the component (a) was changed to 2.4 parts by mass, and the content of PP2 as the component (b) was changed to 48.2 parts by mass, and molding evaluation was performed. The characteristic evaluation results are shown in Table 9.

Example 60

A prepreg was obtained in the same manner as in Example 54 except that the content of CDI-PP1 as the component (a) was changed to 9.0 parts by mass, and the content of PP2 as the component (b) was changed to 44.9 parts by mass, and molding evaluation was performed. The characteristic evaluation results are shown in Table 9.

Example 61

A prepreg was obtained in the same manner as in Example 54 except that as the component (a), 4.7 parts by mass of CDI-PP2 prepared in accordance with Reference Example 2 and Reference Example 5 was used in place of CDI-PP1, and molding evaluation was performed. The characteristic evaluation results are shown in Table 9.

Example 62

A prepreg was obtained in the same manner as in Example 54 except that as the component (a), 4.7 parts by mass of CDI-PP3 prepared in accordance with Reference Example 3 and Reference Example 6 was used in place of CDI-PP1, and molding evaluation was performed. The characteristic evaluation results are shown in Table 9.

Comparative Example 16

A prepreg was obtained in the same manner as in Example 54 except that CF-1 obtained in Reference Example 7 was used as it was without depositing a sizing agent, 4.7 parts by mass of CDI-PP1 was used as the component (a) and 47.3 parts by mass of PP2 was used as the component (b), and molding evaluation was performed. The characteristic evaluation results are shown in Table 10.

Comparative Example 17

A prepreg was obtained in the same manner as in Example 54 except that (s)'-1 (polybutene) having no functional group was used as a sizing agent in place of the polyfunctional compound (s)-1, and molding evaluation was performed. The characteristic evaluation results are shown in Table 10.

Comparative Example 18

A prepreg was obtained in the same manner as in Comparative Example 17 except that the content of CDI-PP1 as the component (a) was changed to 9.0 parts by mass, and the content of PP2 as the component (b) was changed to 44.9 parts by mass, and molding evaluation was performed. The characteristic evaluation results are shown in Table 10.

Comparative Example 19

A prepreg was obtained in the same manner as in Example 54 except that 4.7 parts by mass of MAH-PP1 prepared in accordance with Reference Example 1 was used in place of CDI-PP1 as the component (a), and molding evaluation was performed. The characteristic evaluation results are shown in Table 10.

Comparative Example 20

A prepreg was obtained in the same manner as in Comparative Example 19 except that the content of MAH-PP1 was changed to 9.0 parts by mass, and the content of PP2 as the component (b) was changed to 44.9 parts by mass, and molding evaluation was performed. The characteristic evaluation results are shown in Table 10.

Comparison of Example 54 to Example 58, Comparative Example 16 and Comparative Example 17

In Example 54 to Example 58 in which polycarbodiimide-modified polypropylene was used and a polyfunctional compound was used as a sizing agent, molded articles being extremely excellent in dynamic characteristics and having water degradation resistance with a low reduction in flexural strength even during water absorption could be obtained. On the other hand, in Comparative Example 16 in which a sizing agent was not used and Comparative Example 17 in which a sizing agent having no functional group was used, molded articles excellent in dynamic characteristics could be obtained, but flexural strength was significantly reduced during water absorption, so that molded articles having water degradation resistance could not be obtained, although polycarbodiimide-modified polypropylene was used.

As for the type of sizing agent, the compound having a tri- or higher functional epoxy group as shown in Example 54 and Example 57 and the polyethyleneimine shown in Example 58 tended to particularly improve dynamic characteristics and water degradation resistance.

Comparison of Example 54, Example 61 and Example 62

In Example 61, CDI-PP2 had a low carbodiimide group content of 0.09 mmol/100 g because the value of Mn/{(100−M)×f/M} of MAH-PP2 as a raw material of CDI-PP2 was as low as 0.09, and the obtained molded article was slightly inferior in dynamic characteristics as compared to Example 54, but had water degradation resistance with a low reduction in flexural strength during water absorption.

In Example 62, CDI-PP3 was produced by adjusting the amount of carbodiimide group-containing compound while gelation was suppressed as much as possible because the value of Mn/{(100−M)×f/M} of MAH-PP3 as a raw material of CDI-PP3 was as high as 10, but production was difficult due to slight gelation etc. The obtained molded article was slightly inferior in dynamic characteristics as compared to Example 54, but had excellent water degradation resistance with almost no reduction in flexural strength during water absorption.

Comparison of Example 54, Example 60, Comparative Example 19 and Comparative Example 20

In Comparative Example 19 and Comparison Example 20 in which a polyfunctional compound was used as a sizing agent, but maleic acid-modified polypropylene was used in place of polycarbodiimide-modified polypropylene, molded articles excellent in dynamic characteristics could be obtained, but flexural strength was significantly reduced during water absorption, so that molded articles having water degradation resistance could not be obtained.

As described above, in Example 54 to Example 62, molded articles being extremely excellent in dynamic characteristics and having water degradation resistance with a low reduction in strength even during water absorption could be obtained. On the other hand, in Comparative Examples 16 to 20, molded articles excellent in dynamic characteristics could be obtained, but flexural strength was significantly reduced during water absorption, so that molded articles having water degradation resistance could not be obtained.

TABLE 9

| | | | | | | Example 54 | Example 55 | Example 56 |
|---|---|---|---|---|---|---|---|---|
| Prepreg | (a) | Carbodiimide-modified PP | | CDI-PP1 | Parts by mass | 4.7 | 4.7 | 4.7 |
| | | | | CDI-PP2 | Parts by mass | | | |
| | | | | CDI-PP3 | Parts by mass | | | |
| | | Maleic acid-modified PP | | MAH-PP1 | Parts by mass | | | |
| | (b) | Block PP (J707G) | | PP2 | Parts by mass | 47.1 | 47.1 | 47.1 |
| | (c) | Reinforcing fiber | | Blending amount | Parts by mass | 52.9 | 52.9 | 52.9 |
| | | | | Type of reinforcing fiber | | CF-1 | CF-1 | CF-1 |
| | (s) | Sizing agent | | Blending amount | Parts by mass | 0.53 | 0.53 | 0.53 |
| | | | | Type of sizing agent | | (s)-1 | (s)-2 | (s)-3 |
| | | | | Number of functional groups in sizing agent | | 3 | 2 | 5 |
| | Reinforcing fiber mass content | | | | % | 50.3 | 50.3 | 50.3 |
| | Resin impregnation rate | | | | % | 99 | 99 | 99 |
| | Content of carbodiimide group contained in matrix resin component in prepreg (mmol/100 g of matrix resin component) | | | | | 2.42 | 2.42 | 2.42 |
| Molded Properties | Flexural test article | 0° Flexural strength | | | MPa | 1270 | 1230 | 1240 |
| | | | | Assessment | | A | B | B |
| | | Water absorption test | Water absorption time | Water absorption time | Days | 7 | 7 | 7 |
| | | | | 0° Flexural strength (water absorbing) | MPa | 1190 | 1160 | 1150 |
| | | | | Assessment | | B | B | B |

TABLE 9-continued

|  |  |  |  |  |  |  |
|---|---|---|---|---|---|---|
|  |  | Strength retention rate during water absorption | % | 94 | 94 | 93 |
|  |  | Assessment |  | B | B | B |

|  |  |  |  |  | Example 57 | Example 58 | Example 59 |
|---|---|---|---|---|---|---|---|
| Prepreg | (a) | Carbodiimide-modified PP | CDI-PP1 | Parts by mass | 4.7 | 4.7 | 2.4 |
|  |  |  | CDI-PP2 | Parts by mass |  |  |  |
|  |  |  | CDI-PP3 | Parts by mass |  |  |  |
|  |  | Maleic acid-modified PP | MAH-PP1 | Parts by mass |  |  |  |
|  | (b) | Block PP (J707G) | PP2 | Parts by mass | 47.1 | 47.1 | 48.2 |
|  | (c) | Reinforcing fiber | Blending amount | Parts by mass | 52.9 | 52.9 | 51.8 |
|  |  |  | Type of reinforcing fiber |  | CF-1 | CF-1 | CF-1 |
|  | (s) | Sizing agent | Blending amount | Parts by mass | 0.53 | 0.53 | 0.52 |
|  |  |  | Type of sizing agent |  | (s)-4 | (s)-7 | (s)-1 |
|  |  |  | Number of functional groups in sizing agent |  | 5 | 28 | 3 |
|  | Reinforcing fiber mass content |  |  | % | 50.3 | 50.3 | 50.3 |
|  | Resin impregnation rate |  |  | % | 99 | 99 | 99 |
|  | Content of carbodiimide group contained in matrix resin component in prepreg (mmol/100 g of matrix resin component) |  |  |  | 2.42 | 2.42 | 1.27 |
| Molded article | Properties | Flexural test | 0° Flexural strength |  MPa | 1280 | 1270 | 1250 |
|  |  |  | Assessment |  | A | A | A |
|  |  | Water absorption test | Water absorption time | Days | 7 | 7 | 7 |
|  |  |  | 0° Flexural strength (water absorbing) | MPa | 1230 | 1210 | 1180 |
|  |  |  | Assessment |  | B | B | B |
|  |  |  | Strength retention rate during water absorption | % | 96 | 95 | 94 |
|  |  |  | Assessment |  | A | A | B |

|  |  |  |  |  | Example 60 | Example 61 | Example 62 |
|---|---|---|---|---|---|---|---|
| Prepreg | (a) | Carbodiimide-modified PP | CDI-PP1 | Parts by mass | 9.0 |  |  |
|  |  |  | CDI-PP2 | Parts by mass |  | 4.7 |  |
|  |  |  | CDI-PP3 | Parts by mass |  |  | 4.7 |
|  |  | Maleic acid-modified PP | MAH-PP1 | Parts by mass |  |  |  |
|  | (b) | Block PP (J707G) | PP2 | Parts by mass | 44.9 | 47.1 | 47.1 |
|  | (c) | Reinforcing fiber | Blending amount | Parts by mass | 55.1 | 52.9 | 52.9 |
|  |  |  | Type of reinforcing fiber |  | CF-1 | CF-1 | CF-1 |
|  | (s) | Sizing agent | Blending amount | Parts by mass | 0.55 | 0.53 | 0.53 |
|  |  |  | Type of sizing agent |  | (s)-1 | (s)-1 | (s)-1 |
|  |  |  | Number of functional groups in sizing agent |  | 3 | 3 | 3 |
|  | Reinforcing fiber mass content |  |  | % | 50.3 | 50.3 | 50.3 |
|  | Resin impregnation rate |  |  | % | 99 | 99 | 99 |
|  | Content of carbodiimide group contained in matrix resin component in prepreg (mmol/100 g of matrix resin component) |  |  |  | 4.46 | 0.008 | 19.76 |
| Molded article | Properties | Flexural test | 0° Flexural strength | MPa | 1280 | 1130 | 1140 |
|  |  |  | Assessment |  | A | C | C |
|  |  | Water absorption test | Water absorption time | Days | 7 | 7 | 7 |
|  |  |  | 0° Flexural strength (water absorbing) | MPa | 1270 | 1050 | 1120 |
|  |  |  | Assessment |  | A | C | C |
|  |  |  | Strength retention rate during water absorption | % | 99 | 93 | 98 |
|  |  |  | Assessment |  | A | B | A |

TABLE 10

|  |  |  |  |  | Comparative Example 16 | Comparative Example 17 | Comparative Example 18 |
|---|---|---|---|---|---|---|---|
| Prepreg | (a) | Carbodiimide-modified PP | CDI-PP1 | Parts by mass | 4.7 | 4.7 | 9.0 |
|  |  |  | CDI-PP2 | Parts by mass |  |  |  |
|  |  |  | CDI-PP3 | Parts by mass |  |  |  |
|  |  | Maleic acid-modified PP | MAH-PP1 | Parts by mass |  |  |  |
|  | (b) | Block PP (J707G) | PP2 | Parts by mass | 47.3 | 47.1 | 44.9 |
|  | (C) | Reinforcing fiber | Blending amount | Parts by mass | 52.7 | 52.9 | 55.1 |
|  |  |  | Type of reinforcing fiber |  | CF-1 | CF-1 | CF-1 |

TABLE 10-continued

|  |  |  |  |  |  |  |  |  |
|---|---|---|---|---|---|---|---|---|
|  | (s) | Sizing agent |  | Blending amount | Parts by mass | 0 | 0.53 | 0.55 |
|  |  |  |  | Type of sizing agent |  | None | (s)'-1 | (s)'-1 |
|  |  |  |  | Number of functional groups in sizing agent |  | — | 0 | 0 |
|  | Reinforcing fiber mass content |  |  |  | % | 50.3 | 50.3 | 50.3 |
|  | Resin impregnation rate |  |  |  | % | 99 | 99 | 99 |
|  | Content of carbodiimide group contained in matrix resin component in prepreg (mmol/100 g of matrix resin component) |  |  |  |  | 2.44 | 2.42 | 4.46 |
| Molded Properties | Flexural test article | 0° Flexural strength |  |  | MPa | 1220 | 1190 | 1200 |
|  |  |  | Assessment |  |  | B | B | B |
|  |  | Water absorption test | Water absorption time | Water absorption time | Days | 7 | 7 | 7 |
|  |  |  | 0° Flexural strength (water absorbing) |  | MPa | 940 | 920 | 930 |
|  |  |  | Assessment |  |  | D | D | D |
|  |  |  | Strength retention rate during water absorption |  | % | 77 | 77 | 78 |
|  |  |  | Assessment |  |  | D | D | D |

|  |  |  |  |  |  | Comparative Example 19 | Comparative Example 20 |
|---|---|---|---|---|---|---|---|
| Prepreg | (a) | Carbodiimide-modified PP |  | CDI-PP1 | Parts by mass |  |  |
|  |  |  |  | CDI-PP2 | Parts by mass |  |  |
|  |  |  |  | CDI-PP3 | Parts by mass |  |  |
|  |  | Maleic acid-modified PP |  | MAH-PP1 | Parts by mass | 4.7 | 9.0 |
|  | (b) | Block PP (J707G) |  | PP2 | Parts by mass | 47.1 | 44.9 |
|  | (C) | Reinforcing fiber |  | Blending amount | Parts by mass | 52.9 | 55.1 |
|  |  |  |  | Type of reinforcing fiber |  | CF-1 | CF-1 |
|  | (s) | Sizing agent |  | Blending amount | Parts by mass | 0.5 | 0.5 |
|  |  |  |  | Type of sizing agent |  | (s)-1 | (s)-1 |
|  |  |  |  | Number of functional groups in sizing agent |  | 3 | 3 |
|  | Reinforcing fiber mass content |  |  |  | % | 50.3 | 50.3 |
|  | Resin impregnation rate |  |  |  | % | 99 | 99 |
|  | Content of carbodiimide group contained in matrix resin component in prepreg (mmol/100 g of matrix resin component) |  |  |  |  | 0 | 0 |
| Molded Properties | Flexural test article | 0° Flexural strength |  |  | MPa | 1270 | 1280 |
|  |  |  | Assessment |  |  | A | A |
|  |  | Water absorption test | Water absorption time | Water absorption time | Days | 7 | 7 |
|  |  |  | 0° Flexural strength (water absorbing) |  | MPa | 920 | 920 |
|  |  |  | Assessment |  |  | D | D |
|  |  |  | Strength retention rate during water absorption |  | % | 72 | 72 |
|  |  |  | Assessment |  |  | D | D |

INDUSTRIAL APPLICABILITY

The fiber-reinforced polypropylene resin composition of the present invention is excellent in moldability and has good interfacial adhesion between reinforcing fibers and a propylene resin, so that a fiber-reinforced resin thermoplastic molded article being excellent in flexural strength and impact resistance and having a low reduction in impact strength even during water absorption can be obtained. The molding material of the present invention is excellent in fiber dispersibility during molding in addition to the above-mentioned flexural characteristics, impact resistance and water degradation resistance. Further, the first form of the prepreg of the present invention not only ensures high dynamic characteristics and water degradation resistance of the molded article, but also can be molded into a complex shape such as a three-dimensional shape at the time of press molding because reinforcing fibers are discontinuous fibers. The second form of the prepreg of the present invention is extremely excellent in dynamic characteristics such as flexural characteristics in addition to water degradation resistance of the molded article because reinforcing fibers are substantially continuous fibers.

The resin composition, the molding material and the prepreg of the present invention include a propylene resin, so that a molded article excellent in lightness can be obtained. By using these components alone or in combination as necessary, a complex-shaped member excellent in water degradation resistance can be designed and produced in accordance with required performance. The resin composition, the molding material and the prepreg of the present invention can be applied in a wide range of industrial fields including components and internal members of electric/electronic equipment, OA equipment, household electrical appliances, robots, two-wheeled vehicles or automobiles, and members, components and housings of aircrafts, etc.

DESCRIPTION OF REFERENCE SIGNS

1: Reinforcing fiber (c) sizing-treated with polyfunctional compound (s)

2: Terpene resin (d)

3: Composite including reinforcing fibers (c) sizing-treated with polyfunctional compound (s) and terpene resin (d)
4: Polypropylene resin component including carbodiimide-modified polyolefin (a) and polypropylene resin (b)
5: Reinforcing fiber monofilament (i)
6: Reinforcing fiber monofilament (j)
7: Reinforcing fiber monofilament (j)
8: Reinforcing fiber monofilament (j)
9: Reinforcing fiber monofilament (j)
10: Reinforcing fiber monofilament (j)
11: Reinforcing fiber monofilament (j)
12: Two-dimensional orientation angle
13: Stainless steel mesh
14: Prepreg
15: Reinforcing fiber base
16: Dispersion medium
17: Stirrer
18: Chopped reinforcing fiber
19: Dispersion tank
20: Opening cock
21: Sheet-making tank
22: Mesh conveyor
23: Conveyor
24: Reinforcing fiber base
t: Prepreg thickness direction
*1: Burnout of resin
*2: Suction

The invention claimed is:

1. A fiber-reinforced polypropylene resin composition comprising a carbodiimide-modified polyolefin (a), a polypropylene resin (b) and reinforcing fibers (c), the reinforcing fibers (c) sizing-treated with a polyfunctional aliphatic epoxy resin(s), wherein the fiber-reinforced polypropylene resin composition satisfies the requirement (I) or (II):
(I) the content of the carbodiimide group contained in a matrix resin component in the fiber-reinforced polypropylene resin composition is 0.0005 to 140 mmol based on 100 g of the matrix resin component; or
(II) the fiber-reinforced polypropylene resin composition contains 0.01 to 50 parts by mass of the component (a), 20 to 99 parts by mass of the component (b) and 1 to 80 parts by mass of the component (c) where the total of the component (b) and the component (c) is 100 parts by mass; and when a mold-notched Izod impact test is conducted in accordance with ASTM D256 (1983) using test pieces which are a dry sample and a water-absorbing sample prepared by immersing the dry test sample in a constant-temperature water bath at 85° for 1 week, strength retention rate (%) calculated from a ratio of the impact strength of the water-absorbing sample to the impact strength of the dry sample is 95% or more and 99% or less.

2. The fiber-reinforced polypropylene resin composition according to claim 1, wherein the content of the carbodiimide group contained in 100 g of the carbodiimide-modified polyolefin (a) is 1 to 200 mmol.

3. The fiber-reinforced polypropylene resin composition according to claim 1, wherein the reinforcing fibers (c) are carbon fibers.

4. The fiber-reinforced polypropylene resin composition according to claim 3, wherein a surface oxygen concentration ratio O/C of the carbon fiber is 0.05 to 0.5 as measured by X-ray photoelectron spectroscopy.

5. The fiber-reinforced polypropylene resin composition according to claim 3, wherein the carbon fiber has a surface oxygen concentration (O/C) of 0.1 to 0.3.

6. The fiber-reinforced polypropylene resin composition according to claim 1, wherein the content of the carbodiimide group contained in the matrix resin component in the fiber-reinforced polypropylene resin composition is 1.58 to 140 mmol based on 100 g of the matrix resin component.

7. A molding material comprising the fiber-reinforced polypropylene resin composition according to claim 1, wherein the molding material contains a terpene resin (d) in addition to the component (a), the component (b), the component (c) and the component (s), a polypropylene resin component containing the component (a) and the component (b) is bonded to a composite containing the component (c) and the component (d), an SP value of the component (d) is 6.5 to 9, and an SP value of the component (d) is lower than the SP value of the component (s).

8. The molding material according to claim 7, wherein the component (d) is a resin selected from a polymer containing a monomer unit selected from α-pinene, β-pinene, dipentene and d-limonene and a hydrogenated terpene resin obtained by subjecting the polymer to a hydrogenation treatment.

9. The molding material according to claim 8, wherein the molding material has a core-sheath structure with the composite forming a core structure and a periphery of the composite being covered with a polypropylene resin component containing at least the component (a) and the component (b).

10. A prepreg comprising the fiber-reinforced polypropylene resin composition according to claim 1, wherein the reinforcing fibers (c) form a reinforcing fiber base.

11. The prepreg according to claim 10, wherein the prepreg is sheet-shaped, and reinforcing fibers that form the reinforcing fiber base are discontinuous fibers.

12. The prepreg according to claim 11, wherein the reinforcing fiber base comprises 0 to 50% by mass of reinforcing fibers having a fiber length of more than 10 mm, 50 to 100% by mass of reinforcing fibers having a fiber length of 2 to 10 mm, and 0 to 50% by mass of reinforcing fibers having a fiber length of less than 2 mm, and an average value of two-dimensional orientation angles of the reinforcing fibers that form the reinforcing fiber base is 10 to 80 degrees.

13. The prepreg according to claim 10, wherein the reinforcing fibers that form the reinforcing fiber base are substantially discontinuous fibers.

14. The prepreg according to claim 13, wherein reinforcing fibers that form the reinforcing fiber base are aligned in one direction.

* * * * *